United States Patent
Sheng

(10) Patent No.: US 12,542,195 B2
(45) Date of Patent: Feb. 3, 2026

(54) DIGITAL PCR DETECTION APPARATUS, DIGITAL PCR QUANTITATIVE DETECTION METHOD, MULTI-VOLUME DIGITAL PCR QUANTITATIVE ANALYSIS METHOD, DIGITAL PCR DETECTION METHOD, NUCLEIC ACID DETECTION MICROSPHERE, PREPARATION METHOD OF NUCLEIC ACID DETECTION MICROSPHERE, NUCLEIC ACID DETECTION MICROSPHERE KIT AND HIGH-THROUGHPUT NUCLEIC ACID DETECTION METHOD

(71) Applicant: Sniper (Suzhou) Life Technology Co., Ltd., Suzhou SIP (CN)

(72) Inventor: Guang-Ji Sheng, Beijing (CN)

(73) Assignee: Sniper (Suzhou) Life Technology Co., Ltd., Suzhou SIP (CN)

( * ) Notice: Subject to any disclaimer, the term of this patent is extended or adjusted under 35 U.S.C. 154(b) by 1173 days.

(21) Appl. No.: 16/964,183

(22) PCT Filed: Jan. 24, 2019

(86) PCT No.: PCT/CN2019/072974
§ 371 (c)(1),
(2) Date: Jul. 22, 2020

(87) PCT Pub. No.: WO2019/144907
PCT Pub. Date: Aug. 1, 2019

(65) Prior Publication Data
US 2021/0032680 A1 Feb. 4, 2021

(30) Foreign Application Priority Data

Jan. 24, 2018 (CN) .......................... 201810070377.2
Aug. 16, 2018 (CN) .......................... 201810932950.6
Nov. 21, 2018 (CN) .......................... 201811392278.2

(51) Int. Cl.
*G16B 25/00* (2019.01)
*B01J 2/02* (2006.01)
(Continued)

(52) U.S. Cl.
CPC ................ *G16B 25/00* (2019.02); *B01J 2/02* (2013.01); *C12Q 1/6851* (2013.01); *G01N 21/6428* (2013.01); *C12Q 3/00* (2013.01)

(58) Field of Classification Search
None
See application file for complete search history.

(56) References Cited

U.S. PATENT DOCUMENTS 5,665,428 A 9/1997 Cha et al.
6,551,557 B1 4/2003 Rose et al.
(Continued)

FOREIGN PATENT DOCUMENTS

CN 1858201 A 11/2006
CN 1986229 6/2007
(Continued)

OTHER PUBLICATIONS

Sundberg, Scott O., et al. "Spinning disk platform for microfluidic digital polymerase chain reaction." Analytical chemistry 82.4 (2010): 1546-1550. (Year: 2010).*

(Continued)

*Primary Examiner* — Kaitlyn L Minchella
*Assistant Examiner* — Noah A. Auger
(74) *Attorney, Agent, or Firm* — Cherskov Flaynik & Gurda, LLC

(57) ABSTRACT

The present application provides a digital PCR detection apparatus, a digital PCR quantitative detection method, a multi-volume digital PCR quantitative analysis method, a digital PCR detection method, a nucleic acid detection microsphere, a preparation method of the nucleic acid detection microsphere, a kit, and a high-throughput nucleic acid detection method.

13 Claims, 15 Drawing Sheets

(51) Int. Cl.
*C12Q 1/6851* (2018.01)
*C12Q 3/00* (2006.01)
*G01N 21/64* (2006.01)

(56) References Cited

U.S. PATENT DOCUMENTS

| | | | |
|---|---|---|---|
| 2003/0175719 | A1 | 9/2003 | Qiao et al. |
| 2007/0157628 | A1 | 7/2007 | Onoun |
| 2009/0117560 | A1 | 5/2009 | Fujikawa et al. |
| 2012/0304929 | A1 | 12/2012 | Ivri |
| 2014/0272982 | A1 | 9/2014 | Yamana et al. |
| 2015/0062824 | A1 | 3/2015 | Hyun et al. |
| 2015/0375239 | A1 | 12/2015 | Herre et al. |
| 2017/0088879 | A1* | 3/2017 | Keys ............... C12Q 1/686 |
| 2017/0253915 | A1 | 9/2017 | Du et al. |
| 2017/0356036 | A1 | 12/2017 | Davies et al. |
| 2019/0352698 | A1 | 11/2019 | Chang et al. |
| 2021/0032680 | A1 | 2/2021 | Sheng |

FOREIGN PATENT DOCUMENTS

| | | |
|---|---|---|
| CN | 101368943 | 2/2009 |
| CN | 101974421 A | 2/2011 |
| CN | 102206357 | 10/2011 |
| CN | 102232114 | 11/2011 |
| CN | 202195997 U | 4/2012 |
| CN | 103434272 A | 12/2013 |
| CN | 103717308 | 4/2014 |
| CN | 104107734 A | 10/2014 |
| CN | 104324769 A | 2/2015 |
| CN | 104388307 | 3/2015 |
| CN | 104450891 A | 3/2015 |
| CN | 105498869 A | 4/2016 |
| CN | 105688765 | 6/2016 |
| CN | 105784664 | 7/2016 |
| CN | 105854965 A | 8/2016 |
| CN | 205501281 U | 8/2016 |
| CN | 105925572 | 9/2016 |
| CN | 106520524 | 3/2017 |
| CN | 106596489 | 4/2017 |
| CN | 106662374 A | 5/2017 |
| CN | 106754341 A | 5/2017 |
| CN | 106755345 A | 5/2017 |
| CN | 104450891 | 6/2017 |
| CN | 106854618 A | 6/2017 |
| CN | 107349882 A | 11/2017 |
| CN | 107478629 | 12/2017 |
| CN | 107513495 | 12/2017 |
| CN | 107586700 A | 1/2018 |
| CN | 107622185 | 1/2018 |
| CN | 207596826 U | 7/2018 |
| CN | 108373971 A | 8/2018 |
| CN | 108660191 | 10/2018 |
| CN | 208131057 | 11/2018 |
| CN | 109112176 | 1/2019 |
| CN | 208378891 | 1/2019 |
| CN | 208494266 | 2/2019 |
| CN | 110066857 A | 7/2019 |
| DE | 102015011970 | 3/2017 |
| EP | 2848698 | 3/2015 |
| EP | 3236269 | 10/2017 |
| JP | 1997139525 A | 5/1997 |
| JP | 2972877 B1 | 11/1999 |
| JP | 2003170425 | 6/2003 |
| JP | 2003170425 A | 6/2003 |
| JP | 2003174203 A | 6/2003 |
| JP | 2004279340 A | 10/2004 |
| JP | 2007257014 | 10/2007 |
| JP | 4323528 B2 | 9/2009 |
| JP | 2017013011 A | 1/2017 |
| JP | 2017063779 A | 4/2017 |
| KR | 20100128518 A | 12/2010 |
| WO | WO2002006450 A1 | 1/2002 |
| WO | WO-2010036352 A1 * | 4/2010 | .......... B01F 13/0059 |
| WO | WO2013049443 | 4/2013 |
| WO | WO2013072069 | 5/2013 |
| WO | WO2013130857 | 9/2013 |
| WO | WO2014/025924 | 2/2014 |
| WO | WO-2015157369 A1 * | 10/2015 | .......... C12Q 1/6816 |
| WO | WO2016/014976 | 1/2016 |
| WO | WO2016/133783 | 8/2016 |
| WO | WO2017007954 A1 | 1/2017 |
| WO | WO2018094081 A | 5/2018 |

OTHER PUBLICATIONS

Sundberg Supplemental. "Spinning disk platform for microfluidic digital polymerase chain reaction." Analytical chemistry 82.4 (2010): 1546-1550. (Year: 2010).*
Hauschild, T., & Jentschel, M. (2001). Comparison of maximum likelihood estimation and chi-square statistics applied to counting experiments. Nuclear Instruments and Methods in Physics Research Section A: Accelerators, Spectrometers, Detectors and Associated Equipment, 457(1-2), 384-401. (Year: 2001).*
Spata, M. O., Castagna, M. E., & Conoci, S. (2015). Image data analysis in qPCR: A method for smart analysis of DNA amplification. Sensing and bio-sensing research, 6, 79-84. (Year: 2015).*
Britannica, T. Editors of Encyclopaedia (Aug. 4, 2022). point estimation. Encyclopedia Britannica. https://www.britannica.com/science/point-estimation (Year: 2022).*
Bartholomew, R. A., Hutchison, J. R., Straub, T. M., & Call, D. R. (2016). PCR, Real-Time PCR, Digital PCR, and Isothermal Amplification. Manual of Environmental Microbiology, 2-3. (Year: 2016).*
Singh, J., Birbian, N., Sinha, S., & Goswami, A. (2014). A critical review on PCR, its types and applications. Int. J. Adv. Res. Biol. Sci, 1(7), 65-80. (Year: 2014).*
Lorenz, T. C. (2012). Polymerase chain reaction: basic protocol plus troubleshooting and optimization strategies. JoVE (Journal of Visualized Experiments), (63), e3998. (Year: 2012).*
Basu, A. S. (2017). Digital assays part I: partitioning statistics and digital PCR. SLAS Technology: Translating Life Sciences Innovation, 22(4), 369-386. (Year: 2017).*
Hindson, C. M., Chevillet, J. R., Briggs, H. A., Gallichotte, E. N., Ruf, I. K., Hindson, B. J., . . . & Tewari, M. (2013). Absolute quantification by droplet digital PCR versus analog real-time PCR. Nature methods, 10(10), 1003-1005. (Year: 2013).*
Zeileis, A. (Jun. 23, 2022). The Poisson distribution: From basic probability theory to regression models. Achim Zeileis. https://www.zeileis.org/news/poisson/ (Year: 2022).*
Witte, A. K., Fister, S., Mester, P., Schoder, D., & Rossmanith, P. (2016). Evaluation of the performance of quantitative detection of the Listeria monocytogenes prfA locus with droplet digital PCR. Analytical and Bioanalytical Chemistry, 408, 7583-7593. (Year: 2016).*
Heid, C. A., Stevens, J., Livak, K. J., & Williams, P. M. (1996). Real time quantitative PCR. Genome research, 6(10), 986-994. (Year: 1996).*
Majumdar, N., Banerjee, S., Pallas, M., Wessel, T., & Hegerich, P. (2017). Poisson plus quantification for digital PCR systems. Scientific Reports, 7(1), 1-10. (Year: 2017).*
Deng, X., Custer, B. S., Busch, M. P., Bakkour, S., & Lee, T. H. (2017). Simultaneous estimation of detection sensitivity and absolute copy number from digital PCR serial dilution. Computational Biology and Chemistry, 68, 1-5. (Year: 2017).*
Garton, E. (Apr. 13, 2014). Simple Random Sampling. Www.webpages.uidaho.edu. https://www.webpages.uidaho.edu/population_ecology/Simple_random_sampling.htm (Year: 2014).*

(56) References Cited

OTHER PUBLICATIONS

Denman, S. E., & McSweeney, C. S. (2005). Quantitative (real-time) PCR. In Methods in gut microbial ecology for ruminants (pp. 105-115). Dordrecht: Springer Netherlands. (Year: 2005).*

Bharuthram, A., Paximadis, M., Picton, A. C., & Tiemessen, C. T. (2014). Comparison of a quantitative Real-Time PCR assay and droplet digital PCR for copy number analysis of the CCL4L genes. Infection, Genetics and Evolution, 25, 28-35. (Year: 2014).*

Statistics Techs. "Frequency Distribution." Statistics Techs, statisticstechs.weebly.com/desciptive-statistics/frequency-distribution-and-data-presentation. Accessed Jul. 9, 2017. (Year: 2017).*

International Search Report of PCT/CN2019/072974.

«Scientific Reports» 2017-08-29 Nivedita Majumdar etc. Poission Plus Quantification for Digital PCR Systems. pp. 1-10.

Sofronova J.K. et al. "Detection of Mutations in Mitochondrial DNA by Droplet Digital PCR" Biochemistry (Moscow), vol. 81, No. 10, Oct. 31, 2016(Oct. 31, 2016), pp. 1031-1037.

OA1 for Chinese Application No. 201810070368.3 dated May 7, 2022 (8 pages).

OA1 for Chinese Application No. 201811392278.2 dated May 18, 2022 (9 pages).

Jason E. Kreutz et al.: " Theoretical Design and Analysis of Multivolume Digital Assays with Wide Dynamic Range Validated Experimentally with Microfluidic Digital PCR", (Anal. Chem.) ,Oct. 7, 2011, pp. 8158-8168.

Lievens A. et al: "Measuring Digital PCR Quality: Performance Parameters and Their Optimization" vol. 11, No. 5, Jun. 5, 2016, p. 3-p. 16.

Scott O. Sundberg et al:"Spining Disk Platform for Microfluidic Digital Polymerease Chain Reaction" Analytical Chemistry, vol. 82, No. 4, Feb. 15, 2010, pp. 1546-1550.

Phenix-Lan Quan et al: "dPRC : A Technology Review" Sensors, vol. 18, No. 4, Apr. 20, 2018, pp. 1271.

Kevin A Heyries et al:"Megapixel digital PCR" Mature Methods, vol. 8, No. 8, Jul. 3, 2011, pp. 649-651.

International Search Report of PCT/CN2019/072926.

Philip J Wilson et al. "Extending digital PRC analysis by modelling quantification cycle data", «BMC Bioinformatics» Oct. 12, 2016.

Mitra Mojtahedi et al. "Direct elicitation of template concentration from quantification cyale(Cq) distributions in digital PCR", «Nucleic Acids Res» , Aug. 7, 2014.

Shufang Zhou et al. "A highly integrated real-time digital PCR device for accurate DNA quantitative analysis", «Biosens Bioelectron» , Jan. 11, 2019, pp. 151-158.

Chen Chao, "New Technology and Precise Medical Science", «Shanghai Jiao Tong University Press» , Dec. 31, 2017, pp. 150-151.

International Search Report of PCT/CN2019/072969.

* cited by examiner

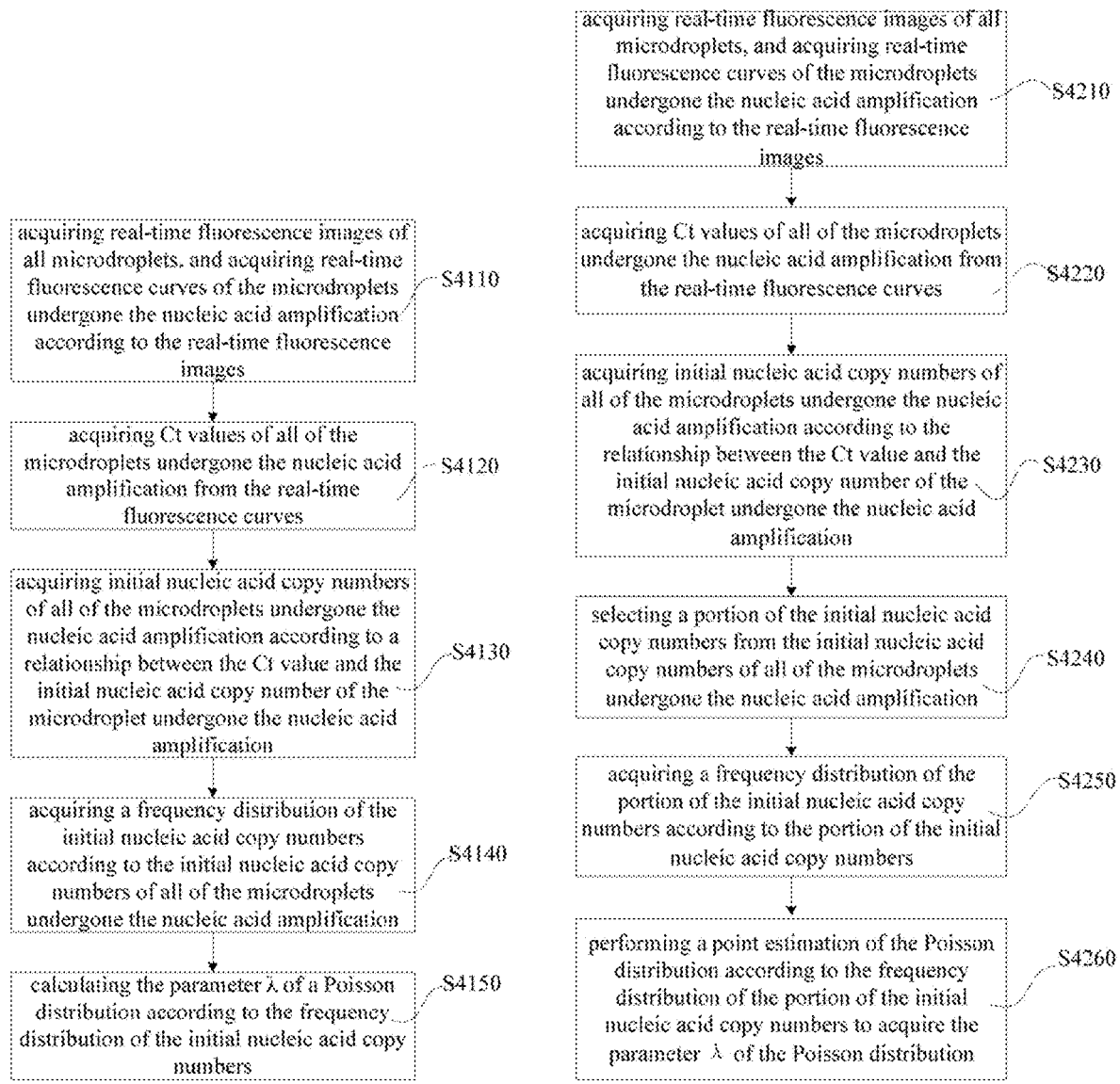

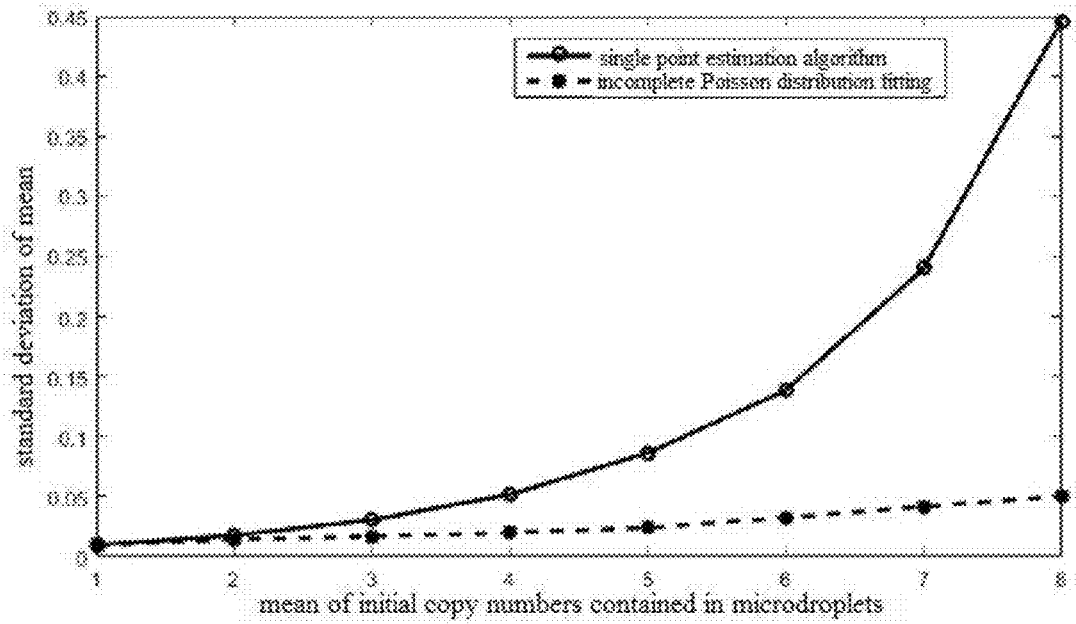

FIG. 17

```
acquiring volumes $v_1, v_2, \ldots, v_m$ of all microdroplets, numbers $n_1, n_2, \ldots, n_m$ of
microdroplets respectively having the volumes $v_1, v_2, \ldots, v_m$, and numbers $b_1, b_2, \ldots, b_m$      ─ S4310
of negative microdroplets in the microdroplets respectively having the volumes $v_1, v_2, \ldots,$
                          $v_m$ after the nucleic acid amplification
```

```
constructing a joint binomial distribution function $f(c)$ for a concentration $c$ of
a sample solution according to the relevant parameters $v_1, v_2, \ldots, v_m, n_1, n_2, \ldots, n_m$ and $b_1,$   ─ S4320
    $b_2, \ldots, b_m$ of all of the microdroplets after the nucleic acid amplification
```

```
calculating the value of $c$ allowing the joint binomial distribution function $f(c)$ to have an   ─ S4330
               extremum according to the joint binomial distribution function $f(c)$
```

```
converting the joint binomial distribution function $f(c)$ into another joint binomial
distribution function $F(\lambda)$ of $\ln(c)$, and acquiring a standard deviation and a confidence    ─ S4340
                              interval of $\ln(c)$
```

```
Acquiring a standard deviation and a confidence interval of the concentration $c$ of the    ─ S4350
sample solution according to the standard deviation and the confidence interval of $\ln(c)$
```

FIG. 18

DIGITAL PCR DETECTION APPARATUS, DIGITAL PCR QUANTITATIVE DETECTION METHOD, MULTI-VOLUME DIGITAL PCR QUANTITATIVE ANALYSIS METHOD, DIGITAL PCR DETECTION METHOD, NUCLEIC ACID DETECTION MICROSPHERE, PREPARATION METHOD OF NUCLEIC ACID DETECTION MICROSPHERE, NUCLEIC ACID DETECTION MICROSPHERE KIT AND HIGH-THROUGHPUT NUCLEIC ACID DETECTION METHOD

CROSS-REFERENCE TO RELATED APPLICATIONS

This application claims the benefits of priorities from China patent application No. 201810070377.2, entitled "DIGITAL PCR QUANTITATIVE DETECTION METHOD", filed on Jan. 24, 2018, China patent application No. 201810932950.6, entitled "DIGITAL PCR DETECTION METHOD", filed on Aug. 16, 2018, and China patent application No. 201811392278.2, entitled "NUCLEIC ACID DETECTION MICRO SPHERE, PREPARATION METHOD, KIT, AND HIGH-THROUGHPUT NUCLEIC ACID DETECTION METHOD", filed on Nov. 21, 2018, the entire contents of which are hereby incorporated by reference. This application is a 35 U.S.C. § 371 national application of international patent application No. PCT/CN2019/072974 filed on Jan. 24, 2019, the content of which is also hereby incorporated by reference.

TECHNICAL FIELD

The present application relates to the field of nucleic acid detection and analysis, in particular to a digital PCR detection apparatus, a digital PCR quantitative detection method, a multi-volume digital PCR quantitative analysis method, a digital PCR detection method, a nucleic acid detection microsphere, a preparation method of the nucleic acid detection microsphere, a nucleic acid detection microsphere kit, and a high-throughput nucleic acid detection method.

BACKGROUND

The digital PCR (dPCR) is a technique for absolute quantification of nucleic acid molecules. Compared with the qPCR, the number of DNA molecules can be counted directly in the digital PCR which is the absolute quantification for the initial copy number of a sample. The quantitative PCR measures the amount of nucleic acids by using a standard curve or a reference gene, while the number of DNA molecules can be counted directly through the digital PCR.

Currently, the digital PCR includes a droplet-type PCR detection method and a chip-type detection method. In the chip-type detection method, one single chip generally has thousands of effective reaction chambers, far less than the droplet-type. Therefore, the dynamic range of the chip-type digital PCR is narrower than the droplet-type. In the droplet-type PCR detection method, the sample is dispersed to form a plurality of reaction units in the form of water-in-oil, and then a real-time fluorescence analysis or an end-point fluorescence analysis is performed on each reaction unit. However, the conventional digital PCR apparatus has a small number of effective reaction chambers, causing a relatively narrow dynamic range and a low working efficiency of the current digital PCR. The end-point detection method in the conventional droplet-type digital PCR has some limitations and a low detection accuracy. In the digital PCR detection and analysis, for an array of tens of thousands of microdroplets at the nano-liter scale, if multiple types of target sequences are to be detected by using the conventional digital PCR detection method, multiple types of primers shall be designed, and the detections shall be performed successively. The repeating of the detection increases the workload and is time consuming and less efficient. Moreover, only a limited number of target sequences can be detected by the conventional digital PCR detection method. If a dozen or more, or hundreds of types of target sequences are to be detected by the PCR detection, the detection must be repeated multiple times, thereby increasing the workload, consuming a large number of samples, and having low time and working efficiencies.

SUMMARY

In view of the above, the present application provides a digital PCR detection apparatus including a microdroplet generating device, a temperature controlling device, a fluorescence signal detecting device, and a quantitative analysis device. The microdroplet generating device is configured to microdropletize a nucleic acid amplification reaction liquid into a plurality of microdroplets. The temperature controlling device is connected to the microdroplet generating device via a rail, so that the plurality of microdroplets can be transferred to the temperature controlling device to undergo a temperature cycling to achieve a nucleic acid amplification. The fluorescence signal detecting device is disposed opposite to the temperature controlling device and configured to photographically detect the plurality of microdroplets after the nucleic acid amplification. The fluorescence signal detecting device can perform a multiple-fluorescence-channel imaging and a bright field and dark field imaging for the microdroplets. The multiple-fluorescence-channel imaging is configured to detect reaction signals of the microdroplets. The bright field and dark field imaging is configured to detect dimensional information of the microdroplets and to monitor a status of the microdroplets during the reaction. The quantitative analysis device is in communication with the fluorescence signal detecting device via a data cable to realize transmission of fluorescence information of the plurality of microdroplets, and perform a quantitative analysis. A controller is respectively connected to the microdroplet generating device, the temperature controlling device, the fluorescence signal detecting device, and the quantitative analysis device, so as to control the microdroplet generating device, the temperature controlling device, the fluorescence signal detecting device, and the quantitative analysis device. The digital PCR detection apparatus integrates the microdroplet generating device, the temperature controlling device, the fluorescence signal detecting device, and the quantitative analysis device, so that an operator can implement automatic operations via the integrated digital PCR detection apparatus, thereby increasing the working efficiency of the digital PCR detection apparatus.

In view of the above, the present application provides a digital PCR quantitative detection method including steps of: S4110, acquiring real-time fluorescence images of all microdroplets and acquiring real-time fluorescence curves of microdroplets that have undergone a nucleic acid amplification from the real-time fluorescence images; S4120, acquiring Ct values of all of the microdroplets that have undergone the nucleic acid amplification according to the real-time fluorescence curves; S4130, acquiring initial nucleic acid copy numbers of all of the microdroplets that have undergone the nucleic acid amplification according to a relationship between the Ct value and the initial nucleic acid copy number of the microdroplet that have undergone the nucleic acid amplification; S4140, acquiring a frequency distribution of the initial nucleic acid copy numbers according to the initial nucleic acid copy numbers of all of the microdroplets that have undergone the nucleic acid amplification; and S4150, calculating a parameter λ of a Poisson distribution according to the frequency distribution of the initial nucleic acid copy numbers. The dynamic tracking of the plurality of microdroplets can be achieved by the digital PCR quantitative detection method, and the specific location of each microdroplet in the temperature cycling process of the plurality of microdroplets can be located, so that the whole process of the nucleic acid amplification can be monitored. By using the digital PCR quantitative detection method, the dependency on the standard curve is avoided; the problem of uncertain quantitative result caused by the standard curve is solved; the limitation of the droplet-type digital PCR end-point detection method is removed; and the limitation of the parameter estimation for complete samples to be detected by using only one data of p(x=0) is eliminated. Moreover, the accuracy of the digital PCR quantitative detection is increased by processing the fluorescence curves of the plurality of microdroplets and by statistically correcting without depending on the assumption of uniformity.

In view of the above, the present application provides a multi-volume digital PCR quantitative analysis method. A standard deviation σ and a confidence interval of ln (c) can be acquired via the multi-volume digital PCR quantitative analysis method. A nucleic acid concentration c in the nucleic acid amplification reaction liquid to be detected can be obtained according to the standard deviation σ and the confidence interval of ln (c). Thus, the initial copy number of DNA contained in the nucleic acid amplification reaction liquid to be detected can be further obtained. The multi-volume digital PCR quantitative analysis method can achieve a dynamic detection range of 5 orders of magnitude by using less than 200 microdroplets, thereby widening the dynamic detection range of the digital PCR detection apparatus, and its performance is comparable with the single-volume digital PCR having 12000 microdroplets, thereby saving the costs of the apparatus and the consumable materials.

In view of the above, the present application provides a digital PCR detection method including: S10, preparing a nucleic acid amplification reaction liquid to be detected; S20, microdropletizing the nucleic acid amplification reaction liquid to be detected to form a microdroplet array; S30, carrying out a polymerase chain reaction for the microdroplet array, acquiring a fluorescence curve of each microdroplet in the microdroplet array, and acquiring a dissociation curve of each microdroplet in the microdroplet array; and S40, analyzing the microdroplet array according to the fluorescence curve and the dissociation curve of each microdroplet in the microdroplet array to obtain information of a nucleic acid to be detected. In the digital PCR detection method provided in the present application, the nucleic acid amplification reaction liquid to be detected containing only one type of fluorescent dye can be used to achieve genotyping, mutation scanning, methylation study, and so on. The method has high resolution and sensitivity and decreases the cost of the detection. Moreover, in the digital PCR detection method, both the polymerase chain reaction of the microdroplet array and the dissociation curve analysis of the PCR products after the PCR amplification of the microdroplet array are performed by the same highly integrated digital PCR detection apparatus. In addition, both the fluorescence curves and the dissociation curves of the microdroplet array can be obtained via the digital PCR detection method, so that the dissociation curve analysis of the PCR products can uninterruptedly follow the real-time monitoring of the entire PCR amplification process. The genotyping or classifying based on different shapes of dissociation curves can be achieved via the fluorescence curves and the dissociation curves of the microdroplet array, so that the qualitative and quantitative analyses for the microdroplet array can be achieved, and the digital PCR detection can be performed more comprehensively, conveniently, and effectively.

In view of the above, the present application provides a nucleic acid detection microsphere, a preparation method thereof, a kit, and a high-throughput nucleic acid detection method. The nucleic acid detection microsphere is formed by coating a core with a coating layer whose matrix is a water-containing polymer gel formed in a hydrophobic oil. The water-containing polymer gel is non-flowable, and its shape and volume are substantially unchangeable. The water-containing polymer gel is in a gel state at room temperature and is molten at a temperature higher than the room temperature, thereby not affecting the diffusions and activities of the enzyme and the reaction liquid. Moreover, the target nucleic acid can be identified and qualitatively analyzed via a primer dispersed in the matrix. The core is a thermostable material and has a specific marking function. Moreover, each core corresponds to one type of primer, and such correspondence is exclusive, so that the nucleic acid detection microsphere can be marked via the core, so as to perform the tracking and the detection. In the PCR detection, a plurality of nucleic acid detection microspheres in different types are mixed with the nucleic acid amplification reaction liquid to be detected to obtain a nucleic acid detection liquid. The nucleic acid detection liquid can be formed into a plurality of microdroplets. The PCR reaction can be carried out in the plurality of microdroplets. In the process of the PCR reaction, a double-stranded DNA is denatured at 90° C. to 95° C., then cooled rapidly to 50° C. to 60° C., at which the primer is annealed and bound to a target sequence, and then heated rapidly to 70° C. to 75° C., at which a strand of the primer extends along the template under an action of Taq DNA polymerase, and the nucleic acid is amplified in the appropriate temperature range. In the PCR temperature controlling process of the plurality of microdroplets, the coating layer is molten and decomposed to release the primer provided in the coating layer into the corresponding microdroplet to react with the target nucleic acid molecule contained in the microdroplet. Finally, the core can be located, tracked, and identified, and the target nucleic acid molecule can be identified via the primer corresponding to the core, thereby achieving the high-throughput PCR detection. In practical application, different types of nucleic acid detection microspheres can be batch prepared, mixed in a certain proportion according to practical needs of the target nucleic acid detection, and further mixed with the nucleic acid amplification reaction liquid to be detected to form the nucleic acid detection liquid. Multiple types of target nucleic acid molecules can be detected at one time by using the nucleic acid detection liquid, without repeating the detection for multiple times, reducing the workload and time, and increasing the sensitivity.

BRIEF DESCRIPTION OF THE DRAWINGS

The drawings to be used in the description of the embodiments or prior art are described briefly as follows, to more clearly describe the technical solutions according to the embodiments of the present application or according to prior art. It is apparent that the drawings in the following description are only some embodiments of the present application. Other drawings may be obtained by those skilled in the art according to these drawings without any creative work.

FIG. 15 is a flowchart of a digital PCR quantitative detection method using complete samples, provided by the present application.

FIG. 16 is a flowchart of a digital PCR quantitative detection method using partial samples, provided by the present application.

FIG. 17 is a graph comparing a standard deviation of CPD obtained by the digital PCR quantitative detection method using partial samples with a standard deviation of CPD obtained by another method.

FIG. 18 is a flowchart of a multi-volume digital PCR quantitative analysis method.

DETAILED DESCRIPTION

The technical solutions according to the embodiments of the present application are described clearly and completely as follows with reference to the drawings of the embodiments of the present application. It is obvious that the described embodiments are only some but not entire of embodiments of the present application. Other embodiments obtained based on the embodiments of the present application by those skilled in the art without any creative work are all belonged to the protection scope of the present application.

For a clear understanding of the objects, technical solutions, and advantages of the present application, specific embodiments of the present application will now be described in detail with reference to the accompanying drawings. It is to be understood that the following description is merely exemplary embodiment of the present application, and is not intended to limit the scope of the present application.

An embodiment of a digital PCR detection apparatus is provided to solve the problems in the conventional digital PCR apparatus, such as few effective reaction units, high cost of consumable materials, relatively narrow dynamic range, low working efficiency, and low degree of integration.

Figure 1:
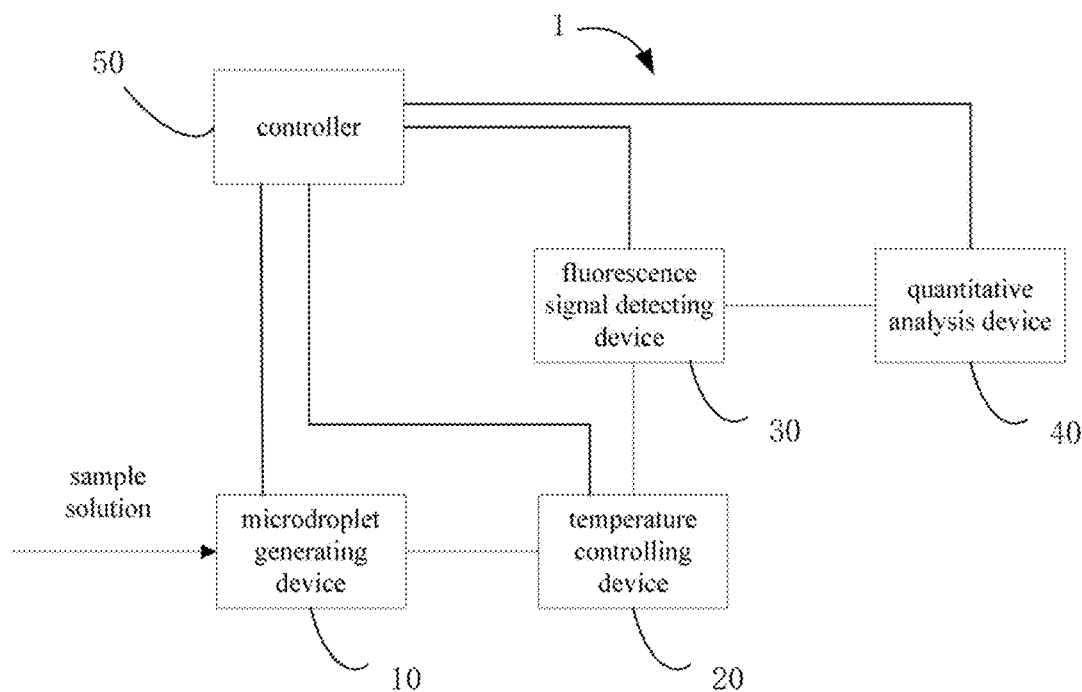
FIG. 1 is an overall schematic structural view of a digital PCR detection apparatus provided in the present application.

Referring to FIG. 1, an embodiment of a digital PCR detection apparatus 1 is provided in the present application. The digital PCR detection apparatus 1 includes a microdroplet generating device 10, a temperature controlling device 20, a fluorescence signal detecting device 30, a quantitative analysis device 40, and a controller 50. The microdroplet generating device 10 is configured to microdropletize a nucleic acid amplification reaction liquid into a plurality of microdroplets. The microdroplet generating device 10 is connected to the temperature controlling device 20 via a rail, so that the plurality of microdroplets can be transferred to the temperature controlling device 20 to undergo a temperature cycling to achieve a nucleic acid amplification. The fluorescence signal detecting device 30 is disposed opposite to the temperature controlling device 20 to photographically detect the plurality of microdroplets after the nucleic acid amplification. The quantitative analysis device 40 communicates with the fluorescence signal detecting device 30 via a data cable to realize transmission of fluorescence information of the plurality of microdroplets and perform a quantitative analysis. The controller 50 is respectively connected to the microdroplet generating device 10, the temperature controlling device 20, the fluorescence signal detecting device 30, and the quantitative analysis device 40, so as to control the microdroplet generating device 10, the temperature controlling device 20, the fluorescence signal detecting device 30, and the quantitative analysis device 40.

The digital PCR detection apparatus 1 can integrate the microdroplet generating device 10, the temperature controlling device 20, the fluorescence signal detecting device 30, and the quantitative analysis device 40, thereby allowing an operator to implement automatic operations. The digital PCR detection apparatus 1 has relatively high working efficiency.

In operation of the digital PCR detection apparatus 1, the microdroplet generating device 10 can form the nucleic acid amplification reaction liquid to be detected into the plurality of microdroplets. The temperature controlling device 20 can amplify the nucleic acids in the plurality of microdroplets. The fluorescence signal detecting device 30 takes images in real-time, the images showing variations in fluorescence of the plurality of microdroplets. Fluorescence variation curves of the plurality of microdroplets can be obtained from the images showing variations in fluorescence of the plurality of microdroplets. Ct values of the plurality of microdroplets can be obtained according to the fluorescence variation curves. In addition, a quantitative analysis can be performed to obtain an initial DNA concentration according to the relationship between the Ct value and an initial copy number. The Ct value refers to the number of the temperature cycles that each microdroplet has undergone when its fluorescence signal reaches a preset threshold.

The nucleic acid amplification reactions for the plurality of microdroplets are carried out in the temperature controlling device 20; and the signals, such as the fluorescence signals, ultraviolet absorption signals, turbidity signals, and so on, of reaction products in the plurality of microdroplets after the nucleic acid amplification reactions are collected by the fluorescence signal detecting device 30. The number of the microdroplets in which amplifications of target sequences are achieved can be analyzed by comparing a composition difference between the amplified and non-amplified microdroplets, so that the quantitative analysis of the nucleic acid molecules can be finally achieved. The detection result, obtained by observing in real-time the images showing variations in fluorescence of the plurality of microdroplets, is direct, so that the problems of false positive results and false negative results in the plurality of microdroplets can be solved.

The digital PCR detection apparatus 1 integrates the microdroplet generating device 10, the temperature controlling device 20, the fluorescence signal detecting device 30, and the quantitative analysis device 40, allowing the operator to implement automatic operations, so that not only the working efficiency is increased, but also the advantages of rapid reaction, good repeatability, high sensitivity, excellent specificity, and clear result are achieved.

In an embodiment, a microdroplet generating method and a microdroplet generating device for rapidly generating microdroplets having a uniform volume size are provided.

Figure 2:
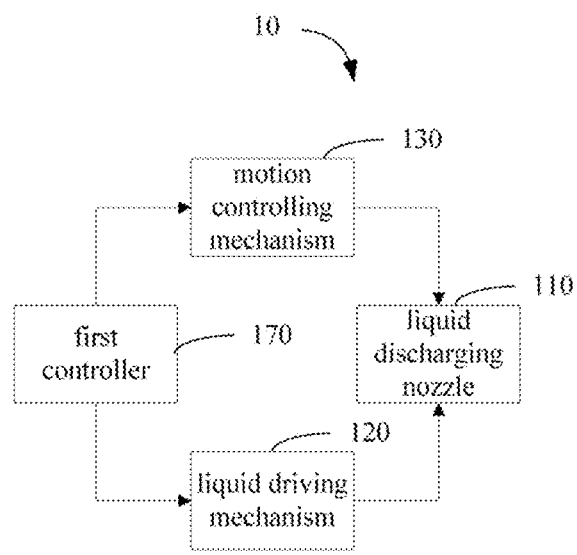
FIG. 2 shows a microdroplet generating device of the digital PCR detection apparatus provided in the present application.

Referring to FIG. 2, the microdroplet generating device 10 in an embodiment includes a liquid discharging nozzle 110, a fluid driving mechanism 120, a motion controlling mechanism 130, and a first controller 170. The liquid discharging nozzle 110 has an inlet end and an outlet end, and is configured to store a first liquid. The microdroplet generating device 10 can be used in combination with a microdroplet container containing a second liquid therein. The outlet end of the liquid discharging nozzle 110 is inserted below a liquid surface of the second liquid.

The first liquid and the second liquid are immiscible with each other or have an interfacial reaction therebetween. The first liquid and the second liquid can be any two immiscible liquids. In an embodiment of the present application, the first liquid is an aqueous solution, and the second liquid is an oil liquid that is immiscible with water, such as a mineral oil (including n-tetradecane, etc.), a vegetable oil, a silicone oil, a perfluoroalkane oil, and so on; and the generated droplets are aqueous solution droplets. Alternatively, the first liquid is a mineral oil, for example, an organic phase such as tetradecane and n-hexane, and the second liquid is a perfluoroalkane oil that is immiscible with the mineral oil. The first liquid and the second liquid can be two immiscible aqueous phases. In another embodiment of the present application, the first liquid is an aqueous solution, and the second liquid is an aqueous liquid that is immiscible with water. For example, the first liquid is a dextran solution, the second liquid is a polyethylene glycol (PEG) aqueous solution, and the generated droplets are dextran solution droplets.

The first liquid and the second liquid can also be two liquids having an interfacial reaction therebetween. In an embodiment of the present application, the first liquid is a sodium alginate aqueous solution, the second liquid is a calcium oxide aqueous solution with a mass concentration of, for example, 1%. An interfacial reaction exists between the sodium alginate aqueous solution and the calcium oxide aqueous solution, and the generated droplets are calcium alginate gel microspheres. In the present application, a plurality of droplets having different compositions and volumes can be generated in sequence in an open vessel by replacing the liquid discharging nozzle or by changing the composition of the first liquid flowing from the liquid discharging nozzle, so that not only a large batch and high-throughput micro-volume screening can be achieved, but also a multi-step, ultramicro-amount biochemical reaction and detection can be achieved, having a broad prospect of application.

The fluid driving mechanism 120 is connected to the inlet end of the liquid discharging nozzle 110, configured to discharge the first liquid stored in the liquid discharging nozzle 110 from the outlet end of the liquid discharging nozzle 110. The motion controlling mechanism 130 is configured to control the outlet end of the liquid discharging nozzle 110 to move relative to the second liquid in a preset trajectory, or at a preset speed, or with a preset acceleration, so that the first liquid discharged from the outlet end of the liquid discharging nozzle 110 can overcome the surface tension and overcome the adhesion force of the liquid discharging nozzle 110 on the first liquid to form the microdroplet. The first controller 170 is respectively connected to the fluid driving mechanism 120 and the motion controlling mechanism 130 to control the fluid driving mechanism 120 and the motion controlling mechanism 130 to operate cooperatively.

In an embodiment, a microdroplet generating method which can stably generate microdroplets is provided.

Figure 3:
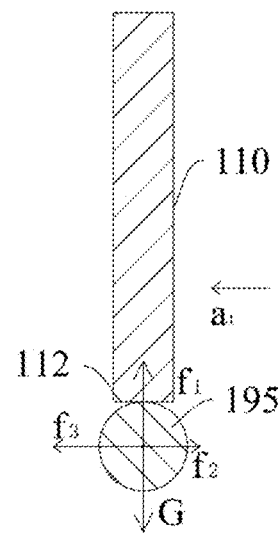
FIG. 3 is a schematic view showing forces exerted on a droplet when an outlet end of a liquid discharging nozzle provided in an embodiment of the present application is moving.

Referring to FIG. 3, in an embodiment of the present application, the motion controlling mechanism 130 can drive the outlet end 112 of the liquid discharging nozzle 110 to move with an instantaneous accelerated motion below the liquid surface of the second liquid, wherein an acceleration value is $a_1$. The first liquid discharged from the outlet end 112 of the liquid discharging nozzle 110 forms a droplet 195 attached to the outlet end 112 of the liquid discharging nozzle 110. The droplet 195 is detached from the outlet end 112 of the liquid discharging nozzle 110 and forms the microdroplet at the moment the outlet end 112 of the liquid discharging nozzle 110 instantaneously accelerates. The forces exerted upon the microdroplet before the microdroplet is detached from the outlet end 112 of the liquid discharging nozzle 110 are respectively the gravity G, a buoyancy $f_1$ from the second liquid, a viscous resistance $f_2$ from the second liquid, and a maximum adhesion force $f_3$ between the outlet end 112 of the liquid discharging nozzle 110 and the droplet 195. A mass of the microdroplet before being detached from the outlet end 112 of the liquid discharging nozzle 110 is m. The acceleration value of the microdroplet is $a_2$. $m\vec{a}_2 = \vec{G} + \vec{f}_1 + \vec{f}_2 + \vec{f}_3$ is obtained according to Newton's second law of motion.

The maximum adhesion force $f_3$ between the outlet end 112 of the liquid discharging nozzle 110 and the droplet 195 is related to the surface free energy of the liquid discharging nozzle 110, the surface tension of the droplet 195, and the geometric dimension of the liquid discharging nozzle 110. When the outlet end 112 of the liquid discharging nozzle 110 instantaneously accelerates, a direction of the adhesion force of the outlet end 112 of the liquid discharging nozzle 110 on the droplet 195 is the same as a direction of the acceleration. The droplet 195 attached to the outlet end 112 of the liquid discharging nozzle 110 is simplified as a sphere. According to the Stokes formula, the viscous resistance $f_2$ exerted upon the droplet 195 moving in the second liquid satisfies $f_2 = 6\pi\eta r v$, wherein $\eta$ denotes a viscous coefficient of the second liquid, r denotes a radius of the droplet 195, and v denotes a moving speed of the droplet 195. The speed of the droplet 195 is zero before the outlet end 112 of the liquid discharging nozzle 110 instantaneously accelerates, and thus the viscous resistance $f_2$ exerted upon the droplet 195 by the second liquid at the moment the outlet end 112 of the liquid discharging nozzle 110 instantaneously accelerates is zero or extremely small. In the generation process of the microdroplet, a volume of the droplet 195 is generally in a range from the picoliter magnitude order to the microliter magnitude order, and the buoyancy $f_1$ from the second liquid has a direction opposite to that of the gravity G of the droplet 195; therefore, a vector sum of the buoyancy $f_1$ from the second liquid and the gravity G of the droplet 195 is approximately zero. The viscous resistance $f_2$ is zero or extremely small, and the vector sum of the buoyancy $f_1$ and the gravity G is approximately zero, therefore $\vec{G} + \vec{f}_1 + \vec{f}_2 + \vec{f}_3 \approx \vec{f}_3$. According to Newton's second law of motion, when the outlet end 112 of the liquid discharging nozzle 110 instantaneously accelerates, the maximum acceleration value achievable by the droplet 195 in the second liquid is $a_2 \approx \vec{f}_3/m$, wherein m is the mass of the droplet 195. When the acceleration value $a_2$ of the droplet 195 is smaller than the acceleration value $a_1$ of the outlet end 112 of the liquid discharging nozzle 110, the droplet 195 drops from the outlet end 112 of the liquid discharging nozzle 110 and forms the microdroplet. Thus, the condition for detaching the droplet 195 from the outlet end 112 of the liquid discharging nozzle 110 (i.e. for generating one microdroplet) is roughly $a_2 \approx (f_3/m) < a_1$.

The motion controlling mechanism 130 can accurately control a magnitude of the instantaneous acceleration of the outlet end 112 of the liquid discharging nozzle 110. Therefore, the droplet 195 can be effectively generated from the instantaneous accelerated motion of the outlet end 112 of the liquid discharging nozzle 110 by controlling the outlet end 112 of the liquid discharging nozzle 110 to have a relatively large value of every instantaneous acceleration.

In view of the above, a microdroplet generating method is further provided in the present application. The method includes steps of:

(a) providing the liquid discharging nozzle 110 having the outlet end 112, wherein the first liquid is stored in the liquid discharging nozzle 110; providing a microdroplet container containing the second liquid therein and having an opening, wherein the first liquid and the second liquid are any two immiscible liquids or any two liquids having the interfacial reaction therebetween;

(b) inserting the outlet end 112 of the liquid discharging nozzle 110 below the liquid surface of the second liquid through the opening of the microdroplet container;

(c) controlling the outlet end 112 of the liquid discharging nozzle 110 to move with the motion including the instantaneous accelerated motion below the liquid surface of the second liquid, while discharging the first liquid from the outlet end 112 of the liquid discharging nozzle 110, so that the first liquid discharged from the outlet end 112 of the liquid discharging nozzle 110 forms the droplet 195 attached to the outlet end 112 of the liquid discharging nozzle 110, and the droplet 195 is detached from the outlet end 112 of the liquid discharging nozzle 110 during the instantaneous accelerated motion of the outlet end 112 of the liquid discharging nozzle 110, thereby forming the microdroplet below the liquid surface of the second liquid.

In an embodiment of the present application, in the step (c), the outlet end 112 of the liquid discharging nozzle 110 makes a periodic motion including the instantaneous accelerated motion below the liquid surface of the second liquid. When the outlet end 112 of the liquid discharging nozzle 110 periodically moves below the liquid surface of the second liquid, the displacement, the velocity, and the acceleration of the outlet end 112 of the liquid discharging nozzle 110 are periodically changed. The microdroplets can be generated at equal time intervals from the periodic motion including the instantaneous accelerated motions in combination with the discharge of the first liquid from the outlet end 112 of the liquid discharging nozzle 110 at a constant flow rate. Alternatively, the first liquid is discharged from the outlet end 112 of the liquid discharging nozzle 110 at a varied flow rate, while the volume of the first liquid discharged from the outlet end 112 of the liquid discharging nozzle 110 is constant in every motion period of the outlet end 112 of the liquid discharging nozzle 110, so as to ensure that, before the outlet end 112 of the liquid discharging nozzle 110 instantly accelerates each time, the droplet 195 has the same volume, thereby generating microdroplets with an uniform volume.

The surface free energy of the liquid discharging nozzle 110, the geometric dimension of the liquid discharging nozzle 110, and the surface tension of the droplet 195, as factors which affect the maximum adhesion force $f_3$ between the outlet end 112 of the liquid discharging nozzle 110 and the droplet 195, are determined if the liquid discharging nozzle 110 and the first liquid are not changed. Therefore, the maximum value $f_3$ of the adhesion force between the outlet end 112 of the liquid discharging nozzle 110 and the droplet 195 is fixed if the liquid discharging nozzle 110 and the first liquid are not changed. The fluid driving mechanism 120 can drive the first liquid to be continuously discharged from the outlet end 112 of the liquid discharging nozzle 110 at a uniform flow rate. The motion controlling mechanism 130 can accurately control the moment, at which the outlet end 112 of the liquid discharging nozzle 110 makes an accelerated motion with the instantaneous acceleration value $a_1$ and can accurately control the magnitude of the instantaneous acceleration value $a_1$. Under the cooperation of the fluid driving mechanism 120 and the motion controlling mechanism 130, it is easy to drive the outlet end 112 of the liquid discharging nozzle 110 to instantaneously accelerate with the acceleration value $a_1$ at the moment the volume of the droplet 195 reaches the set value, so as to generate the microdroplets with the uniform volume. If the first liquid is evenly and continuously discharged from the outlet end 112 of the liquid discharging nozzle 110 under the control of the fluid driving mechanism 120, the microdroplets with the uniform volume can be generated by only driving the outlet end 112 of the liquid discharging nozzle 110 to make the instantaneous accelerated motions with the equal time intervals via the motion controlling mechanism 130.

The surface free energy of the liquid discharging nozzle 110 and the geometric dimension of the liquid discharging nozzle 110, as two factors which affect the maximum adhesion force $f_3$ between the outlet end 112 of the liquid discharging nozzle 110 and the droplet 195, are varied if multiple liquid discharging nozzles 110 are used to generate the microdroplets simultaneously or in sequence. However, the variation of the surface free energy of liquid discharging nozzles 110 and the geometric dimensions of the liquid discharging nozzles 110 can be controlled within a certain range via batch processing. The surface tension of the droplet 195, as another factor that affects the maximum adhesion force $f_3$ between the outlet end 112 of the liquid discharging nozzle 110 and the droplet 195, is also varied within a very small range. Therefore, the maximum value $f_3$ of the adhesion force between the outlet end 112 of the liquid discharging nozzle 110 and the droplet 195 fluctuates within a very small range. The fluid driving mechanism 120 can drive the first liquid to be continuously discharged from the outlet end 112 of the liquid discharging nozzle 110 at a uniform flow rate. The motion controlling mechanism 130 can accurately control the moment, at which the outlet end 112 of the liquid discharging nozzle 110 accelerates with the instantaneous acceleration value $a_1$, and accurately control the magnitude of the instantaneous acceleration value $a_1$. Under the cooperation of the fluid driving mechanism 120 and the motion controlling mechanism 130, it is easy to drive the outlet end 112 of the liquid discharging nozzle 110 to make the instantaneous accelerated motions with the acceleration value $a_1$ at the moments the volumes of the droplets 195 reach the set value, so as to generate the microdroplets with the uniform volume. If the first liquid is evenly and continuously discharged from the outlet end 112 of the liquid discharging nozzle 110 under the control of the fluid driving mechanism 120, the microdroplets with the uniform volume can be generated by only driving the outlet end 112 of the liquid discharging nozzle 110 to make the instantaneous accelerated motions at the equal time intervals via the motion controlling mechanism 130.

While the fluid driving mechanism 120 discharges the first liquid evenly from the outlet end 112 of the liquid discharging nozzle 110, the motion controlling mechanism 130 cooperatively drives the outlet end 112 to make the instantaneous accelerated motion with a relatively large acceleration value at the moment the volume of the droplet 195 reaches the set value. The microdroplet generating method provided in the present application can ensure not only a volume uniformity of the microdroplets generated by using the same liquid discharging nozzle 110, but also a volume uniformity of the microdroplets generated simultaneously or in sequence by using a plurality of the liquid discharging nozzles 110. The microdroplet generating method provided in this embodiment can increase the generating efficiency by using a plurality of the liquid discharging nozzles 110 to generate the microdroplets at the same time while ensuring the uniformity of the volumes of the microdroplets.

In an embodiment, under the control of the motion controlling mechanism 130, one period of motion of the outlet end 112 of the liquid discharging nozzle 110 includes multiple instantaneous accelerated motions with the same acceleration value; and the one period of motion of the outlet end 112 of the liquid discharging nozzle 110 is equally divided by the multiple instantaneous accelerated motions. Due to the multiple instantaneous accelerated motions included in one period of motion of the outlet end 112 of the liquid discharging nozzle 110, a plurality of microdroplets can be generated in the same period of motion of the outlet end 112 of the liquid discharging nozzle 110. Optionally, in the step (c), the moving trajectory of the outlet end 112 of the liquid discharging nozzle 110 below the liquid surface of the second liquid includes one of or a combination of various trajectories such as a straight line segment, an arc-shaped line segment, or a polygon. As an implementation manner, when one period of motion of the outlet end 112 of the liquid discharging nozzle 110 includes two instantaneous accelerated motions, the moving trajectory of liquid discharging nozzle 110 is a straight line or an arc. When one period of motion of the outlet end 112 of the liquid discharging nozzle 110 includes more than two instantaneous accelerated motions, the moving trajectory of the outlet end 112 of the liquid discharging nozzle 110 in the second liquid is a regular polygon such as a regular triangle, a square, a regular pentagon, a regular hexagon, and so on.

Figure 4:
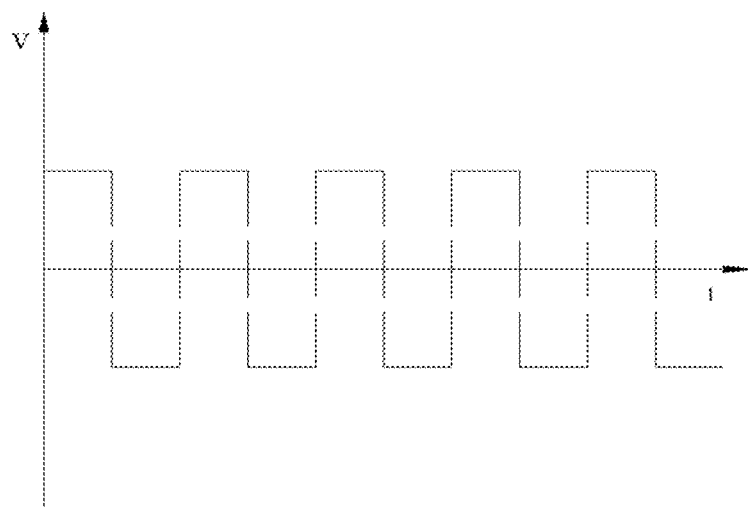
FIG. 4 is a schematic view showing a velocity variation of the outlet end of the liquid discharging nozzle provided in an embodiment of the present application.

As an implementation manner, in the step (c), during the periodic motion of the outlet end 112 of the liquid discharging nozzle 110 below the liquid surface of the second liquid, the speed of the outlet end 112 of the liquid discharging nozzle 110 varies in the form of a rectangular wave. Since the outlet end 112 of the liquid discharging nozzle 110 has its speed varied in the form of the rectangular wave, it enters into a constant speed phase immediately after the acceleration phase, which is favorable for the motion controlling mechanism 130 to accurately control the motion state of the outlet end 112 of the liquid discharging nozzle 110. Optionally, in the rectangular wave indicating the variation of the moving speed of the outlet end 112 of the liquid discharging nozzle 110, the time period of the high level of the wave and the time period of the low level of the wave can be the identical or different. Furthermore, in the step (c), during the periodic motion of the outlet end 112 of the liquid discharging nozzle 110 below the liquid surface of the second liquid, the speed of the outlet end 112 of the liquid discharging nozzle 110 varies in the form of a square wave. In the square wave indicating the variation of the moving speed of the outlet end 112 of the liquid discharging nozzle 110, the time period of the high level of the wave and the time period of the low level of the wave are identical. At the low level of the rectangular wave indicating the variation of the moving speed of the outlet end 112 of the liquid discharging nozzle 110, the speed of the outlet end 112 of the liquid discharging nozzle 110 is zero, or the velocity has a direction opposite to the direction of the velocity at the high level. Referring to FIG. 4, in an embodiment, the velocities of the outlet end 112 of the liquid discharging nozzle 110 in the first half and in the second half of the period of motion of the outlet end 112 of the liquid discharging nozzle 110 have the same magnitude but opposite directions. There are two instantaneous accelerated motions in opposite directions in one period of motion of the outlet end 112 of the liquid discharging nozzle 110.

In an embodiment, the moving trajectory of the outlet end 112 of the liquid discharging nozzle 110 below the liquid surface of the second liquid is a straight line segment. The outlet end 112 of the liquid discharging nozzle 110 makes one instantaneous accelerated motion at one endpoint of the straight line segment and makes another instantaneous accelerated motion in the opposite direction at the other endpoint of the straight line segment. The acceleration values of the two instantaneous accelerated motions are both $a_1$. In another embodiment, the moving trajectory of the outlet end 112 of the liquid discharging nozzle 110 below the liquid surface of the second liquid is an arc or a polygon. In an embodiment, in the step (c), the outlet end 112 of the liquid discharging nozzle 110 periodically moves below the liquid surface of the second liquid with a frequency between 0.1 Hz to 200 Hz, which is easy to realize in practice.

Figure 5:
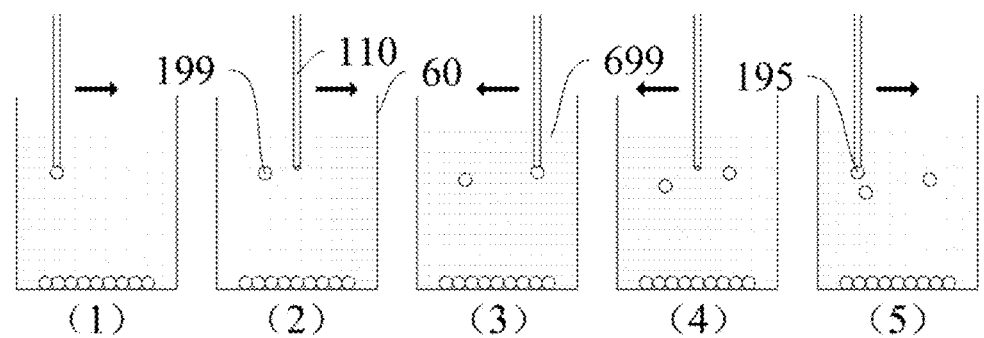
FIG. 5 is a schematic view showing a generating process of microdroplets when the outlet end of the liquid discharging nozzle provided in an embodiment of the present application is moving.

Referring to FIGS. 4 and 5, in a specific embodiment of the present application, the first liquid is discharged from the outlet end 112 of the liquid discharging nozzle 110 at a constant flow rate under the control of the fluid driving mechanism 120. The outlet end of the liquid discharging nozzle 110 periodically moves along a moving trajectory of a straight line and at a speed varying in the form of a square wave under the control of the motion controlling mechanism 130. The instantaneous acceleration of the outlet end 112 of the liquid discharging nozzle 110 reaches its maximum value at the moment the direction of the velocity of the outlet end 112 of the liquid discharging nozzle 110 changes. The droplet 195 attached to the outlet end 112 of the liquid discharging nozzle 110 is detached from the outlet end 112 of the liquid discharging nozzle 110 to form the microdroplet 199 at the moment the instantaneous acceleration of the outlet end 112 of the liquid discharging nozzle 110 reaches its maximum value. Since the first liquid is discharged from the outlet end 112 of the liquid discharging nozzle 110 at the constant flow rate, at the moment the droplet 195 is detached from the outlet end 112 of the liquid discharging nozzle 110, a new droplet 195 enters a generation state. When the outlet end 112 of the liquid discharging nozzle 110 accelerates again in the opposite direction, the newly generated droplet 195 drops from the outlet end 112 of the liquid discharging nozzle 110, forming a new microdroplet 199.

In this embodiment, two microdroplets 199 can be generated in one period of motion of the outlet end 112 of the liquid discharging nozzle 110, and the square wave is easy to be achieved in practice. In another embodiment, one microdroplet 199 is generated in one period of motion of the outlet end 112 of the liquid discharging nozzle 110. Optionally, in an embodiment, the outlet end 112 of the liquid discharging nozzle 110 moves along a straight line trajectory in any direction at a speed varying in a square wave form in the second liquid 699, for example, the outlet end 112 moves at a speed varying in the square wave form along a straight line trajectory in a plane perpendicular to an extending direction of the liquid discharging nozzle 110, moves at a speed varying in the square wave form along a straight line trajectory in any plane angularly disposed relative to the extending direction of the liquid discharging nozzle 110, or moves at a speed varying in the square wave form along a straight line trajectory in the extending direction of the liquid discharging nozzle 110, etc. In other embodiments of the present application, when the moving trajectory of the outlet end 112 of the liquid discharging nozzle 110 is an arc or a polygon, the outlet end 112 of the liquid discharging nozzle 110 moves at a speed varying in the square wave form along an arc-shaped trajectory or a polygonal trajectory in any direction in the second liquid 699, for example, the outlet end 112 moves at a speed varying in the square wave form along an arc-shaped trajectory or a polygonal trajectory in a plane perpendicular to the extending direction of the liquid discharging nozzle 110, or moves at a speed varying in the square wave form along an arc-shaped trajectory or a polygonal trajectory in any plane angularly disposed relative to the extending direction of the liquid discharging nozzle 110, or moves at a speed varying in the square wave form along an arc-shaped trajectory or a polygonal trajectory in the extending direction of the liquid discharging nozzle 110, etc.

In an embodiment, the microdroplet 199 is a nucleic acid amplification reaction liquid to be detected. The microdroplet generating device 10 microdropletizes the nucleic acid amplification reaction liquid to be detected into a plurality of microdroplets so as to be detected via the digital PCR detection apparatus 1. By transforming the nucleic acid amplification reaction liquid into the plurality of microdroplets 199 via the microdroplet generating device 10 of the integrated digital PCR detection apparatus 1, detecting fragments in the sample to be detected can be separated from plentiful complex backgrounds and placed into the microdroplet container 60 for the detection. A plurality of microdroplets 199 with a uniform size can be generated via the microdroplet generating device 10. Each microdroplet 199 has a size at a micrometer scale and can be regarded as an independent reactor functioning as a test tube commonly used in a biochemical reaction. It is convenient to observe and detect the plurality of microdroplets 199 placed in the microdroplet container 60. Moreover, a plurality of microdroplets 199 having different volumes can also be generated via the microdroplet generating device 10 to be subjected to a medical and clinical test. The plurality of microdroplets are small in volume and large in quantity, thereby possessing many advantages over the conventional test tubes. A large number of microdroplets 199 can be generated via the microdroplet generating device 10, so that the digital PCR detection apparatus 1 has advantages of high throughput, low cost of consumables, and low background noise, thereby having a broad industrialization prospect.

In an embodiment, a temperature controlling device having high temperature increasing and decreasing rates and a long service life is provided.

Figure 7:
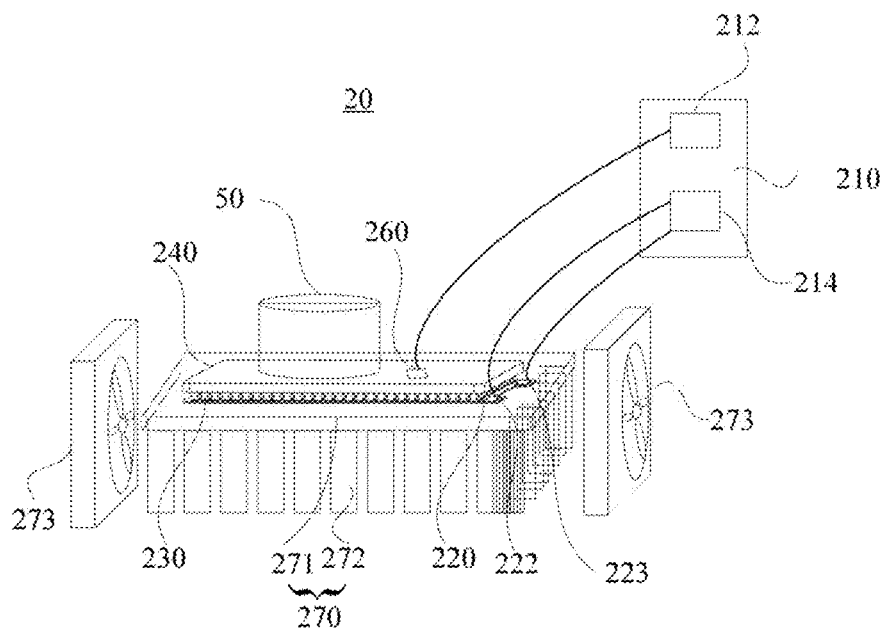
FIG. 7 is a schematic structural view of a temperature controlling device of the present application.
Figure 8:
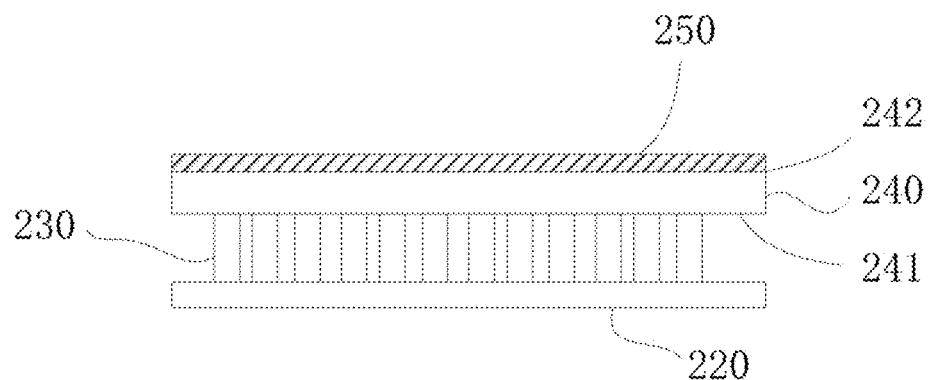
FIG. 8 is a schematic structural sectional view of the temperature controlling device of the present application.

Referring to FIGS. 7 and 8, a temperature controlling device 20 is provided in the present application. The temperature controlling device 20 includes a flexible circuit board 220, a heating substrate 240 spaced from the flexible circuit board 220, and a plurality of semiconductor electric couples 230. The heating substrate 240 includes a first surface 241 and a second surface 242 opposite to each other. The plurality of semiconductor electric couples 230 are disposed between the flexible circuit board 220 and the first surface 241. The plurality of semiconductor electric couples 230 are connected to each other in series, in parallel, or in combination of the series and parallel connections.

The temperature controlling device 20 is generally used in a high-low temperature cycling environment whose temperature needs to be increased and decreased rapidly and thus having a high standard requirement to the temperature controlling device 20. The flexible circuit board 220 is used in the temperature controlling device 20 to meet the application requirement of the temperature controlling device 20. The flexible circuit board 220 has characteristics of high wiring density, light weight, small thickness, and good flexibility. The flexible circuit board 220 counteracts the thermal stress with its own deformation during the heating and cooling processes. Since the thermal stress generated in the heating and cooling processes can be reduced by the flexible circuit board 220, the service life of the temperature controlling device 20 is prolonged. Moreover, the problem of non-uniform temperature distribution is solved by using the flexible circuit board 220. When the nucleic acids in the plurality of microdroplets are amplified in different temperature ranges, the temperature ranges can be rapidly switched within a few seconds via the flexible circuit board 220, the heating substrate 240, and the plurality of semiconductor electric couples 230. The temperature can be increased and decreased instantaneously via the temperature controlling device 20, thereby accelerating the temperature increasing and decreasing processes to achieve a high-low temperature cycling, reducing the detection time of the digital PCR detection apparatus 1, and increasing the detection efficiency.

The flexible circuit board 220 (namely the flexible printed circuit, FPC) can be a flexible printed circuit board with high reliability and excellent performance, having a polyimide film or a polyester film as a substrate. The flexible circuit board has characteristics of high wiring density, light weight, small thickness, and good flexibility. Since the flexible circuit board is light in weight and thin in thickness, the product size can be effectively decreased. The semiconductor cooler (namely the thermoelectric cooler, TEC) is based on the Peltier effect of a semiconductor. The Peltier effect refers to a phenomenon that, when a direct current flows through an electric couple composed by two semiconductor materials, one end of the couple absorbs heat and the other end of the couple releases heat. By replacing one substrate of the conventional semiconductor cooler with the flexible circuit board 220, the semiconductor cooler can have a relatively good thermal conductivity.

An object generates a stress in response to a temperature change if the object cannot expand or contract completely or freely due to external constraints and constraints between internal portions. The stress caused by the temperature change is the thermal stress. The thermal stress equilibrates with zero external load and is the self-equilibrium stress caused by the constraint on the thermal deformation. The compression occurs at the higher temperature, and the tension occurs at the lower temperature. A mechanical property and a service life of a component can be improved by reasonably distributing the stress under certain conditions, thereby turning the harm into a benefit.

In an embodiment, the heating substrate 240 can be a superconducting aluminum substrate circuit.

The aluminum substrate is a metal-based copper clad laminate. Generally, a single sided board is formed by three layers, which are a circuit layer (copper foil), an insulating layer, and a metal substrate layer. The superconducting aluminum substrate circuit has a circuit board made of aluminum alloy and capable of conducting heat rapidly. The aluminum substrate can minimize the thermal resistance, thereby having an excellent thermal conductivity. In addition, the aluminum substrate has an excellent mechanical property as compared to a thick film ceramic circuit.

Figure 9:
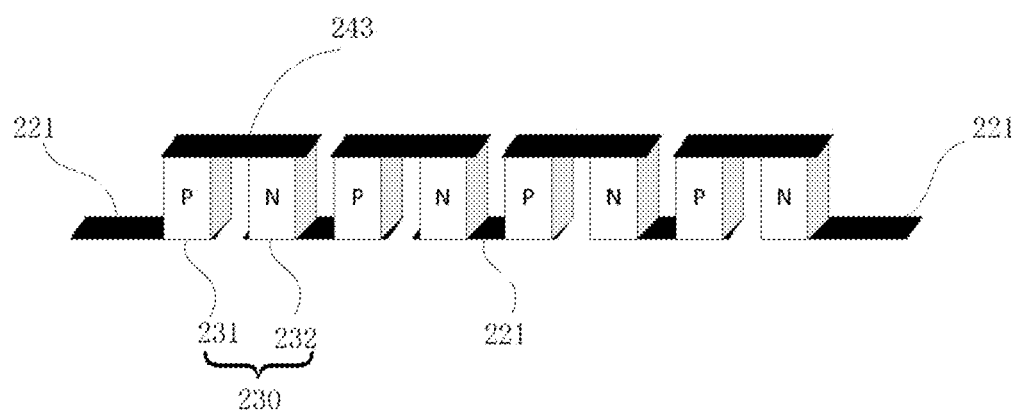
FIG. 9 is a schematic structural view showing a connection between semiconductor electric couples and electrodes in the temperature controlling device of the present application.

As shown in FIG. 9, in an embodiment, the semiconductor electric couple 230 includes a P-type couple component 231 and a N-type couple component 232 spaced from the P-type couple component 231.

The P-type couple component 231 and N-type couple component 232 are welded between the flexible circuit board 220 and the substrate 240. The semiconductor electric couple 230 includes a pair of couple components which are the P-type couple component 231 and the N-type couple component 232. The plurality of semiconductor electric couples 230 are connected to each other via electrodes, and are sandwiched between the flexible circuit board 220 and the first surface 241, forming a "hot" side and a "cold" side when a current flows therethrough. Cooling or heating, and the cooling (or heating) rate are determined by a direction and a magnitude of the current flowing through the semiconductor electric couples 230. Considering that the thermoelectric effect produced by one semiconductor electric couple 230 is weak, hundreds of semiconductor electric couples 230 are connected in series in practical application to enhance the produced thermoelectric effect.

In an embodiment, the first surface 241 is provided with a plurality of first electrode plates 243 spaced from each other. One first electrode plate 243 corresponds to one semiconductor electric couple 230. The P-type couple component 231 and the N-type couple component 232 of the semiconductor electric couple 230 are connected in series via the first electrode plate 243.

In an embodiment, the flexible circuit board 220 includes a plurality of second electrode plates 221 spaced from each other and connected in series. Two adjacent semiconductor electric couples 230 are connected in series via one second electrode plate 221.

When a current is flowing through the semiconductor electric couple 230 composed of the P-type couple component 231 and the N-type couple component 232, the heat is transported from one end to the other end to produce a heat transport between the two ends, thereby obtaining a temperature difference and forming a hot end and a cold end. However, the P-type couple component 231 and the N-type couple component 232 have their own electrical resistances. When the electric current flows therethrough, the P-type couple component 231 and the N-type couple component 232 generate heat, which affects the heat transport. In addition, the heat can be further reversely transported between the flexible circuit board 220 and the heating substrate 240 via air and the P-type couple component 231 and the N-type couple component 232 themselves. When a certain temperature difference is reached between the hot end and the cold end, and these two types of heat transports are equivalent in amount, an equilibrium is achieved, and the forward heat transport and the reverse heat transport are offset with each other. In this case, the temperatures of the hot end and cold end will not further change. To further decrease the temperature of the cold end, the temperature of the hot end can be further decreased by methods such as heat dissipation.

In an embodiment, the temperature controlling device 20 further includes a thermal conduction enhancing layer 250 disposed on the second surface 242.

The thermal conduction enhancing layer 250 has excellent strength, flexibility, electrical conductivity, thermal conductivity, and optical property. The thermal conduction enhancing layer 250 can directly contact the microdroplet container 60 to uniformly heat the plurality of microdroplets, so that the nucleic acid amplification can be achieved by controlling the temperature. The thermal conduction enhancing layer 250 can be a graphite thermal conducting layer or a silicone grease thermal conducting layer, which facilitates the thermal conduction and improves the temperature uniformity of the second surface 242 of the heating substrate 24, thereby ensuring the temperature uniformity of the surface in proximity to the microdroplet container 60. The plurality of microdroplets are thereby heated uniformly to have the nucleic acid amplification, so that the detection efficiency is increased and time is saved.

In an embodiment, a material of the thermal conduction enhancing layer 250 includes graphite. Graphite is a planar film, has an excellent thermal conductivity, and can uniformly conduct heat in the transverse direction.

In an embodiment, the temperature controlling device 20 further includes a second controller 210 electrically connected to the flexible circuit board 220 to control a magnitude of the electric current.

In an embodiment, the temperature controlling device 20 further includes a temperature sensor 260 disposed on the second surface 242 and electrically connected to the second controller 210 to detect the temperature of the second surface 242 and transmit the temperature to the second controller 210.

The temperature sensor 260 is disposed on the second surface 242 of the thermal conduction enhancing layer 250 to detect in real time the temperature of the second surface 242 and feed the temperature information to the second controller 210, so that the control of the heating temperature of the plurality of microdroplets can be achieved. The temperature sensor 260 is configured to measure the temperature of the microdroplet container 60 by detecting a variation of an electrical resistance of a metal, so as to monitor the temperature variation of the plurality of microdroplets during the nucleic acid amplification in real time, and to feed the temperature information to the second controller 210. A controlling circuit is thereby controlled to regulate the temperature. The nucleic acid amplification can be well performed due to the temperature control.

In an embodiment, the second controller 210 includes a temperature controlling unit 212 and a controlling circuit 214. The temperature controlling unit 212 is connected to the temperature sensor 260 to detect the temperature of the second surface 242 in real time. The controlling circuit 214 is connected to the flexible circuit board 220 to regulate the temperature variation of the semiconductor electric couples 230.

The temperature controlling unit 212 and the controlling circuit 214 are arranged on the same circuit board. The temperature controlling unit 212 is connected with the controlling circuit 214 in a manner to perform a logical operation under an internal algorithm. A Packet Identifier closed-loop control algorithm, i.e., a PID closed-loop control algorithm can be used. The temperature detected by the temperature controlling unit 212, as a temperature feedback from the nucleic acid amplification, is an input to the internal algorithm. The calculated result from the controlling circuit 214 is an output of the internal algorithm. Thus, a closed-loop is formed. The temperature feedback is a temperature value transformed from the electrical signal collected from a platinum resistor by a sampling circuit. The temperature value is transmitted to an input port of the controlling circuit. The temperature sensor 260 is connected to the temperature controlling unit 212 via a standard platinum resistor three-wire system.

In an embodiment, the flexible circuit board 220 is provided with a first electrode 222 and a second electrode 223. The plurality of second electrode plates 221 connected in series are further connected to the first electrode 222 and the second electrode 223 in series. The first electrode 222 and the second electrode 223 are respectively connected to the controlling circuit.

The controlling circuit 214 is connected to the flexible circuit board 220 via two wires respectively connected to the first electrode 222 and the second electrode 223.

In an embodiment, the temperature controlling device 20 further includes a heat dissipating device 270 including a substrate 271 and heat dissipating sheets 272 connected to the substrate 271. The flexible circuit board 220 is disposed on a surface of the substrate 271.

The heat dissipating sheets 272 disposed on a surface of the substrate 271 increase the heat-exchange area without decreasing the area of the substrate 271, increase a time period for a cold wind applied on the surface of the substrate 271, and form multiple heat dissipating channels which further facilitate the heat exchange, thereby carrying more heat from the surface of the substrate 271 and thus achieving a better heat dissipating effect.

In an embodiment, the temperature controlling device 20 further includes a fan 273 disposed around the heat dissipating sheets 272.

The fan 273 can assist the heat dissipating device 270 to dissipate heat. A number of fans 273 can be disposed around the heat dissipating sheets 272 to achieve a better heat dissipating effect and allow the temperature controlling device 20 to increase or decrease the temperature more rapidly.

In an embodiment, an alternating electric current is conducted to the temperature controlling device 20, and the magnitude of the current is regulated by the second controller 210. The second controller 210 controls the temperature controlling device 20 to perform the cooling function or the heating function, and controls the cooling and heating rates. At the same time, the heating temperature of the microdroplet container is detected in real time by the temperature sensor 260. The temperature information is fed back to the temperature controlling unit 212. The temperature controlling unit 212 feeds the temperature variation information back to the controlling circuit 214 to control the temperature of the plurality of microdroplets. The nucleic acid amplification can be performed on the plurality of microdroplets via the temperature controlling device 20. Three temperature points of the denaturation, annealing, and extension are set on the basis of the PCR principle. The three-temperature-point method is used in a standard reaction process. More specifically, double-stranded DNAs are denatured at 90° C. to 95° C.; and then the temperature is rapidly decreased to 40° C. to 60° C., at which primers are annealed and bound to target sequences; and then the temperature is rapidly increased to 70° C. to 75° C., at which primer strands extend along templates under the action of Taq DNA polymerase. The nucleic acid amplification can be performed in an appropriate temperature range. While the nucleic acids are amplified, a bottom plate of the microdroplet container 60 closely contacts the temperature controlling device 20 with no gap therebetween to increase the accuracy of the digital PCR detection apparatus 1.

Figure 10:
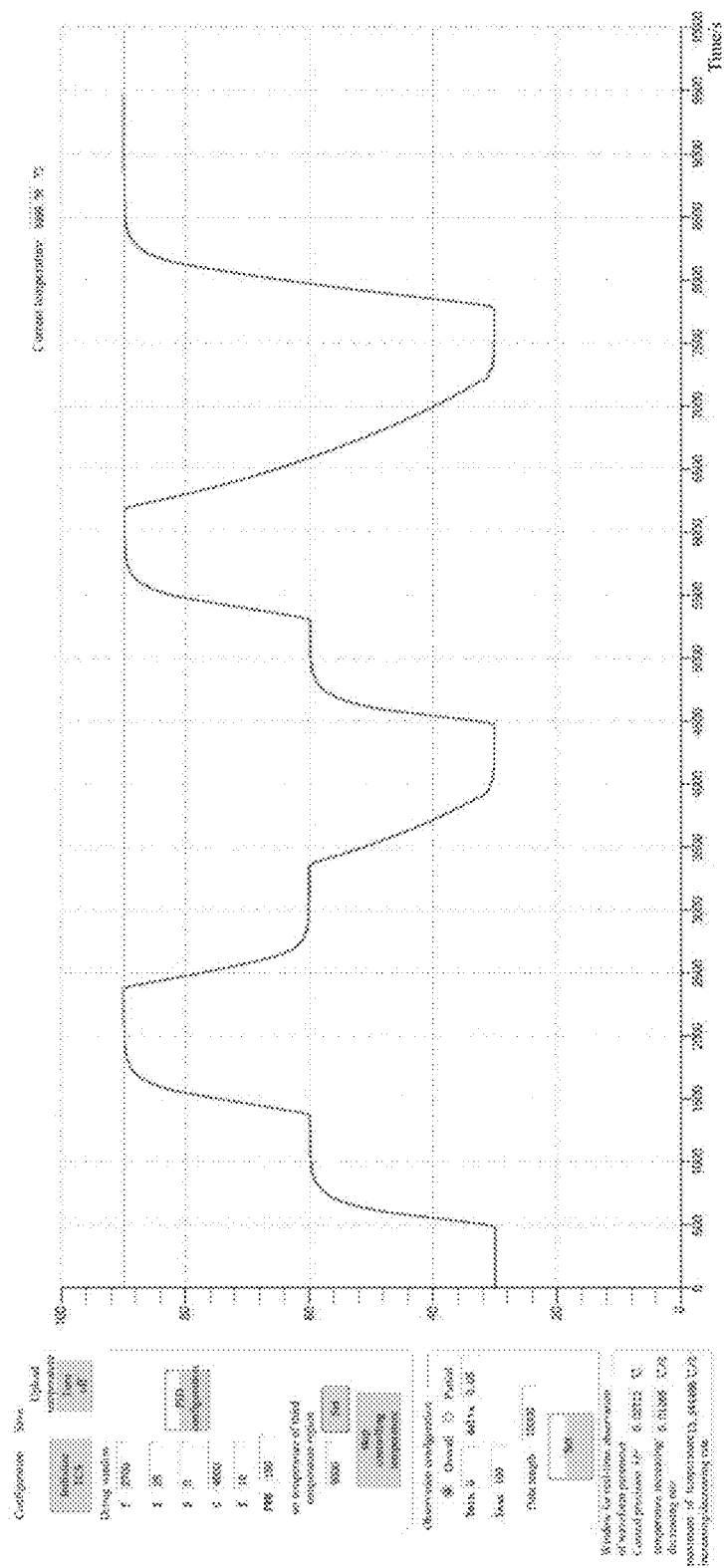
FIG. 10 is a graph showing an instantaneous state performance of the temperature controlling device of the present application.

Referring to FIG. 10, generally, there are two main indexes for testing the temperature controlling performance of the temperature controlling device 20. The temperature increasing and decreasing situations of the temperature controlling device 20 in an instantaneous state and in a stable state are observed. By monitoring the heating process of the plurality of microdroplets, it is found that when increasing or decreasing the temperature of the plurality of microdroplets via the temperature controlling device 20, a maximum temperature increasing or decreasing rate can reach 13.34448° C./s, and the control accuracy is 0.02722° C. Moreover, sometimes the fastest rate for increasing the temperature to the stable state by the temperature controlling device 20 can reach 18.953894° C./s. Therefore, the temperature controlling device 20 has a good instantaneous response, and the instantaneous increase and instantaneous decrease of the temperature can be achieved via the temperature controlling device 20, so as to save the time and increase the detection efficiency.

Figure 11:
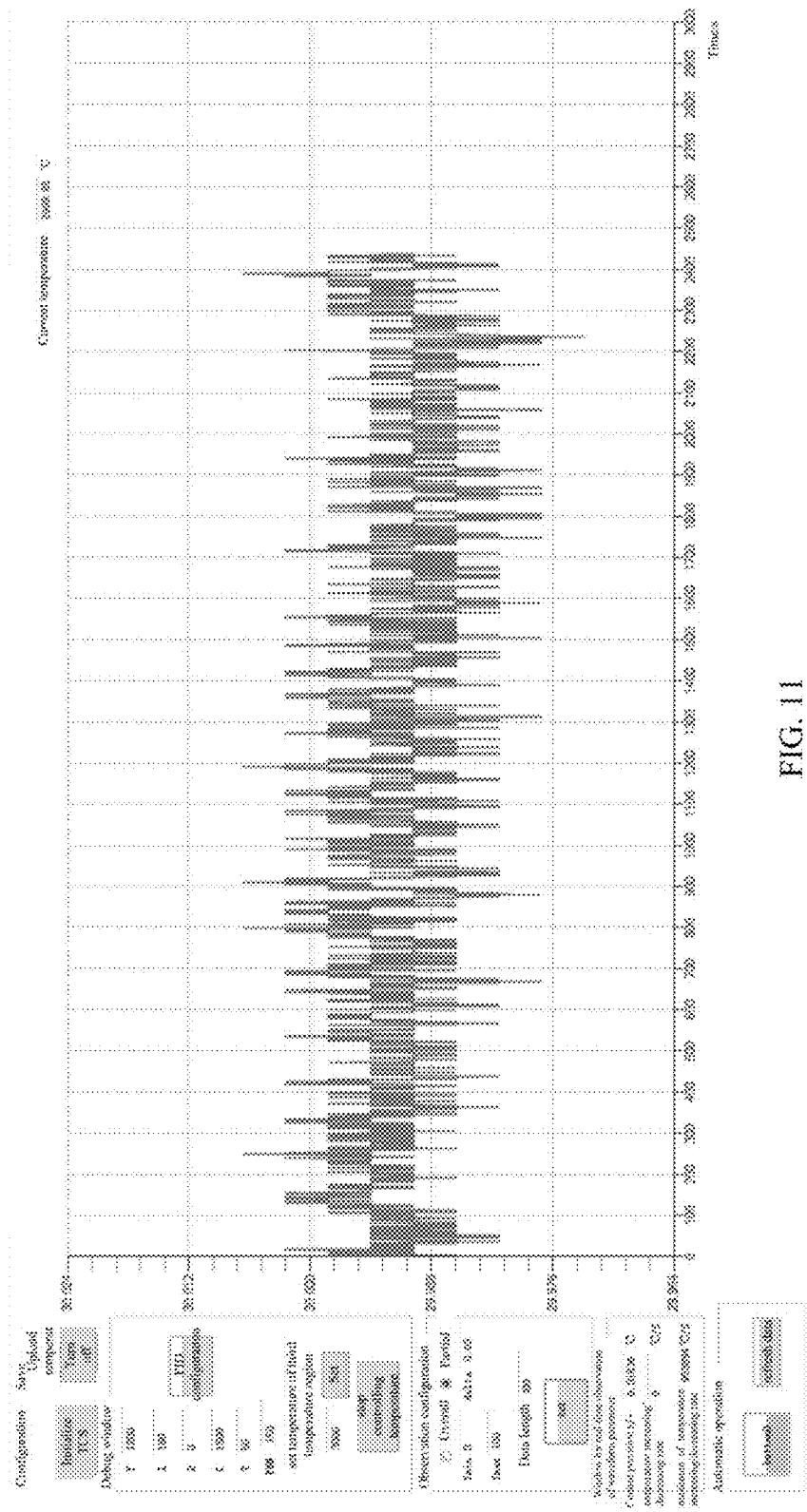
FIG. 11 is a graph showing a steady state performance of the temperature controlling device of the present application.

Referring to FIG. 11, when the temperature controlling device 20 is in the stable state, the temperature has a fluctuation after it reaches the stable state. When the temperature controlling device 20 is in the stable state, the temperature variation is relatively stable and the temperature fluctuation is relatively small. Therefore, not only a temperature increase-decrease cycling can be rapidly achieved by the temperature controlling device 20, but also the temperature can fluctuate in a relatively small range in the stable state, so that the time of the digital PCR detection of the solution sample is saved and the working efficiency is increased. Such temperature increasing and decreasing rates reduce the time for completing the nucleic acid amplification, increase the efficiency of the nucleic acid amplification, and increase the accuracy of the digital PCR detection system.

Figure 6:
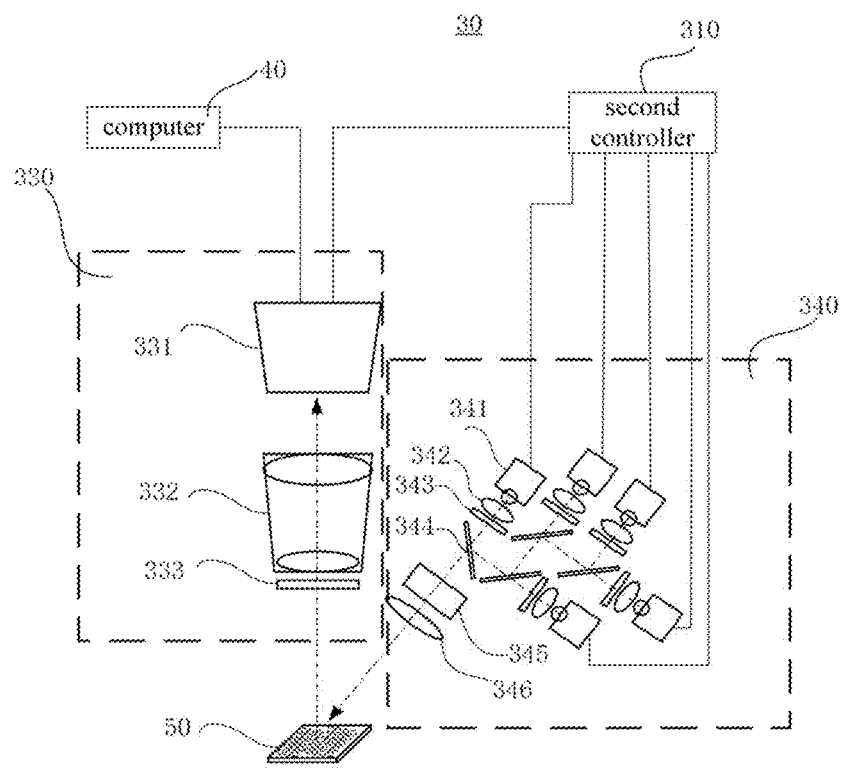
FIG. 6 is a schematic structural view of a fluorescence signal detecting device of the present application.

Referring to FIG. 6, in an embodiment, the fluorescence signal detecting device 30 includes an exciting light source 340, a fluorescence detecting assembly 330, and a third controller 310. The exciting light source 340 is disposed above a detection area of the microdroplet container 60, and irradiates the detection area of the microdroplet container 60 with an oblique angle to form an oblique light path. The fluorescence detecting assembly 330 is disposed right above the detection area of the microdroplet container 60 to acquire a fluorescence image of the plurality of microdroplets. The third controller 310 is respectively connected to the exciting light source 340 and the fluorescence detecting assembly 330 to control the exciting light source 340 and the fluorescence detecting assembly 330. The fluorescence signal detecting device can perform a multiple-fluorescence-channel imaging and a bright field and dark field imaging for the microdroplets. The multiple-fluorescence-channel imaging is configured to detect the reaction signals of the microdroplets, and the bright field and dark field imaging is configured to detect the dimensional information of the generated microdroplets and to monitor the status of the microdroplets during the reaction.

In an embodiment, the third controller 310 can control the exciting light source 340 to move while the fluorescence detecting assembly 330 and the microdroplet container 60 are immobile. That is, in this case, the plurality of microdroplets are fluorescence detected by moving the exciting light source 340. Alternatively, the third controller 310 can control the fluorescence detecting assembly 330 to move while the microdroplet container 60 and the exciting light source 340 are immobile to perform the fluorescence detection for the plurality of microdroplets. Yet alternatively, the third controller 310 can control the microdroplet container 60 to move while the fluorescence detecting assembly 330 and the exciting light source 340 are immobile to perform the fluorescence detection for the plurality of microdroplets. The positions of the exciting light source 340, the fluorescence detecting assembly 330, and the microdroplet container 60 can be shifted via the third controller 310 to form a relative movement therebetween, so that the fluorescence detecting assembly 330 is aligned with the detection area of the microdroplet container 60 to take the image, after which the entire fluorescence detection process is completed.

The light path emitted by the exciting light source 340 obliquely irradiates the plurality of microdroplets in the microdroplet container 60 to cause the microdroplets which contain fluorescent substances to produce fluorescence. The fluorescence information of the microdroplets containing the fluorescent substances is collected by the fluorescence detecting assembly 330 and transmitted to the quantitative analysis device 40 in the form of the fluorescence image to receive the quantitative analysis.

The microdroplet container 60 is irradiated at the oblique angle from the above of the microdroplet container 60. The fluorescence signal detecting device 30 is used to periodically scan the plurality of microdroplets in two dimensions and to take the image in real-time. The oblique light path can effectively reduce the scattering background of the exciting lights and increase the sensitivity of the fluorescence detection. The plurality of microdroplets in the microdroplet container 60 are excited to generate fluorescence. The fluorescence image of the plurality of microdroplets is captured by the fluorescence detecting assembly 330.

The exciting light source 340 provides the plurality of microdroplets with the energy for evaporation, atomization, and excitation. The exciting light source 340 has characteristics of narrow spectral bandwidth, high spectrum purity, good stability in wavelength, high efficiency, long service life, good reliability, good quality of light beam, and so on, thereby ensuring the accuracy and the stability of the detection results.

In an embodiment, the exciting light source 340 includes a plurality of different colored LED light sources 341, a dichroic mirror 344, a fly's eye lens 345, and a focusing lens 346. A collimator 342 and a first light filter 343 are arranged in sequence in front of each LED light source 341. The dichroic mirror 344 is obliquely disposed in front of the first light filter 343 to refract the lights emitted from each LED light source 341 to form a light path. The fly's eye lens 345 is configured to increase the uniformity of the refracted light path. The focusing lens 346 is disposed in front of the fly's eye lens 345 for focusing and imaging.

The plurality of different colored LED light sources 341, as the exciting light source 340, can be used to produce fluorescence with different colors to expand the detecting channels, so as to achieve detections for different types of the microdroplets. The collimator 342 and the first light filter 343 are arranged in sequence in front of each LED light source 341. The collimator 342 can be used to maintain the collimation of the light beam between a laser resonant cavity and an optical focusing element in a light beam transmitting system. In addition, lights within a required wave band emitted from the LED light source 341 can be separated as exciting lights via the first light filter 343. The exciting lights can be transformed into a beam of parallel lights or a beam of convergent lights by using optical lenses such as the dichroic mirror 344, the fly's eye lens 345, and the focusing lens 346, and then irradiate the region of a chip provided with the microdroplets to form an exciting region. The plurality of microdroplets in the microdroplet container 60 will be excited by the exciting lights.

In an embodiment, the exciting light source 340 and the fluorescence detecting assembly 330 are integrated or separated.

While the fluorescence signal detecting device 30 obliquely irradiates the microdroplet container 60, the fluorescence detecting assembly 330 can periodically two-dimensional scan the plurality of microdroplets and take the image in real-time. By obliquely irradiating the microdroplet container 60 via the fluorescence signal detecting device 30, the scattering background of the exciting lights can be effectively reduced to increase the sensitivity of the fluorescence detection. The fluorescence excited from interiors of the plurality of microdroplets in the microdroplet container 60 passes through a second light filter 333 and is collected by an objective lens 332 located above the second light filter 333, and then is entered into a camera 331 which acquires the fluorescence image of the plurality of microdroplets.

In an embodiment, the third controller 310 can synchronously actuate the plurality of different colored LED light sources 341 and the camera 331.

The first light filter 343 is an optical element configured to select the required wave band for the irradiation. The first light filter 343 is a plastic or glass sheet in which a specific dye is further added. A red light filter allows only red lights to pass therethrough, and so on. The glass sheet initially has a light transmittance substantially the same as that of air, can allow all colored lights to pass therethrough, and thus is transparent. However, after the addition of the dye, its molecular structure and refractive index are changed, which will change the transmittance for some colored lights. For example, when a beam of white lights passes through a blue light filter, most of green and red components are absorbed, so that a beam of blue lights with little green and red components is emitted. The dichroic mirror 344 is obliquely disposed in front of the first light filter 343 to refract the lights emitted from each LED light source 341 to form the light path. The fly's eye lens 345 is used to increase the uniformity of the refracted light path. The focusing lens 346 is disposed in front of the fly's eye lens 345 for focusing and imaging. The focusing lens 346 has gradient refractive indexes and a cylindrical shape, characterized by surface focusing and imaging, and thus can be applied to various micro-optical systems.

The switch among the plurality of LED light sources 341 with different colored lights can be controlled by the third controller 310 to form different fluorescence detecting channels. The plurality of LED light sources 341 with the different colored lights can work alternately without further disposing a rotating wheel.

The collimator 342 is classified into a reflective collimator and a transmissive collimator which both can be used in the light beam transmitting system to maintain the collimation of the light beam between the laser resonant cavity and the optical focusing element. Generally, the reflective collimator is a copper total reflector, and the transmissive collimator is a transmissive zinc selenide lens.

In an embodiment, the fluorescence detecting assembly 330 includes the objective lens 332, the camera 331, and the second light filter 333. The objective lens 332 is located between the camera 331 and the second light filter 333.

The second light filter 333 can be a multiple-bandpass filter which allows lights of multiple wave bands to simultaneously pass therethrough. Each wave band corresponds to one dye. Spectrums with specific bands of the exciting light and the emitted fluorescence of the substance can be selected and separated in a biomedical fluorescence detection and analysis system. Molecules absorb the excitation spectrum in the absorption band and then emit radiation spectrum with longer wavelength in the emission band, thereby forming the fluorescence spectrum.

The fluorescence image of the plurality of microdroplets is generated by the camera 331 which can transform an optical image into digital signals. In the camera 331, multiple orderly arranged capacitances are capable of sensing lights and transforming the optical image into the digital signals. Under the control of an external circuit, each capacitance can transfer charges carried therein to an adjacent capacitance. The camera 331 collects the fluorescence of the plurality of microdroplets and provides the direct and visible fluorescence image, thereby increasing the speed of the fluorescence detection and the accuracy of the detection result.

The fluorescence imaging for the plurality of microdroplets can be achieved by the fluorescence signal detecting device 30. A number of fluorescence images showing the plurality of microdroplets can be photographed at one time. An image processing technique can be used to automatically identify the fluorescence of the microdroplets from the images to obtain the fluorescence information of the microdroplets.

The plurality of microdroplets in the microdroplet container 60 are excited to generate fluorescence. The fluorescence passes through the second light filter 333, and is collected by the objective lens 332 located above the second light filter 333, and then is entered into the camera 331 which captures the fluorescence image of the plurality of microdroplets.

In an embodiment, the actuation of the LED light source 341 and the imaging of the camera 331 are synchronized via a computer to prevent the fluorescence photobleaching caused by a continuous irradiation. The LED light source 341 is turned off at the non-imaging state.

The dichroic mirror 344 is obliquely disposed in front of the first light filter 343 to refract the lights emitted from the each LED light source 341 to form the light path. The principle of the dichroic mirror 344 is that a colorless calcite (e.g. an iceland spar) is disposed in the dichroic mirror 344 and separates the lights into two light beams which oscillate vertically. The colors of the two light beams can be observed through the dichroic mirror.

The fly's eye lens 345 is configured to increase the uniformity of the refracted light path. The fly's eye lens 345 is composed of a series of lenslets. Two fly's eye lens arrays can be applied in the irradiation system to obtain a high utilization rate of light energy and a large and uniform irradiation area. By arranging the two fly's eye lens arrays, the uniform irradiation can be achieved, the uniformity and irradiation brightness of the plurality of different colored LED light sources 341 are improved, and their locations and distances with respect to the observed object can be effectively calculated, so that the obtained fluorescence image is more precise. In order to achieve the uniform irradiation, the two fly's eye lens arrays are parallel arranged. The focus of each lenslet in the first fly's eye lens array coincides with the center of the corresponding lenslet in the second fly's eye lens array. The optical axes of the two fly's eye lenses are parallel to each other. The focusing lens is disposed behind the second fly's eye lens. The uniform irradiation system is formed by arranging the irradiation plane on the focal plane of the focusing lens.

The uniform irradiation is achieved by the fly's eye lenses according to the following principle. The light beam parallel to the optical axis is passed through the first lens and focused at the center of the second lens. A plurality of images of the light source are formed by the first fly's eye lens for the irradiation. The overlapped images of the lenslets in the first fly's eye lens are formed on the irradiation plane through the corresponding lenslets in the second fly's eye lens. Since the first fly's eye lens splits the broad light beam into multiple narrow light beams to for the irradiation, and the non-uniformity of the narrow light beams is compensated due to the overlapping among the narrow light beams located symmetrically, the light energy can be utilized effectively and uniformly. The lights emitted from the second fly's eye lens are passed through the focusing lens and focused on the irradiation plane. As such, everywhere of the light spot on the irradiation plane is irradiated by the lights emitted from almost all luminous points of the light source, while lights emitted from almost all luminous points of the light source are converged and overlapped within the same field of the irradiation light spot, thereby obtaining a uniform square light spot.

Referring to FIG. 6, in an embodiment, the exciting light source 340 includes five different colored LED light sources 341, five collimators 342, five first light filters 343, four dichroic mirrors 344, one fly's eye lens 345, and one focusing lens 346. The five different colored LED light sources 341 can emit lights with different colors to irradiate the plurality of microdroplets. By selecting among the five different colored LED light sources 341, irradiations for generating different colored fluorescence can be achieved. The five different colored LED light sources 341 can work alternately. The collimator, the first light filter 343, and the dichroic mirror 344 are arranged in sequence in right ahead of the light path emitted by each LED light source. The collimator 342 and the first light filter 343 are perpendicularly disposed (i.e. at an angle of 90°) with respect to the light path. The dichroic mirror 344 is obliquely disposed with respect to the light path at an angle of 0° to 45°. The fly's eye lens 345 and the focusing lens 346 are arranged in sequence in right ahead of the light path passed through the dichroic mirror 344. The fly's eye lens 345 and the focusing lens 346 are perpendicularly disposed (i.e. at an angle of 90°) with respect to the light path.

The light path passed through the focusing lens 346 obliquely irradiates the plurality of microdroplets in the microdroplet container 60 to cause the microdroplets containing fluorescent substances to produce fluorescence. The fluorescence information of the microdroplets containing the fluorescent substances is collected by the fluorescence detecting assembly 330 and transmitted to a computer in the form of the fluorescence image to receive the quantitative analysis.

In an embodiment, the numbers of the LED light sources 341, the collimators 342, the first light filters 343, the dichroic mirrors 344, the fly's eye lenses 345, and the focusing lenses 346 in the exciting light source 340 are not limited.

The exciting light source 340 obliquely irradiates the microdroplet container 60 to irradiate the plurality of microdroplets. The oblique light path formed from the exciting light source 340 can effectively reduce the scattering background of the exciting lights. Moreover, a height of a side wall of the microdroplet container 60 can be reduced to eliminate the shadow caused by the irradiation of the exciting lights from the side, so that the fluorescence information of all microdroplets can be captured by the camera 331, and thus, the sensitivity of the fluorescence signal detecting device 30 is increased.

In an embodiment, the quantitative analysis device 40 is a computer. The image containing the fluorescence information of the plurality of microdroplets can be obtained by the fluorescence signal detecting device 30. The computer is provided with an analysis software, such as Matlab®, microsoft Office®, Origin®, or Microsoft Studio® Visual C++, for quantitatively analyzing the obtained fluorescence information of the plurality of microdroplets.

In an embodiment, the controller 50 is respectively connected to the first controller 170, the second controller 210, and the third controller 310 to control the operations of the microdroplet generating device 10, the temperature controlling device 20, the fluorescence signal detecting device 30, and the quantitative analysis device 40.

The microdroplet generating device 10 microdropletizes the nucleic acid amplification reaction liquid to be detected into the plurality of microdroplets. Then, the plurality of microdroplets are heated by the temperature controlling device 20, during which the images showing variations in fluorescence of the plurality of microdroplets are photographically detected in real time by the fluorescence signal detecting device 30. The Ct values of the plurality of microdroplets are obtained by analyzing the images showing variations in fluorescence of the plurality of microdroplets by using the quantitative analysis device 40. An initial concentration of nucleic acids is analyzed quantitatively according to the relationship between the Ct value and the initial copy number.

The digital PCR detection apparatus 1 integrates the microdroplet generating device 10, the temperature controlling device 20, the fluorescence signal detecting device 30, and the quantitative analysis device 40, allowing an operator to implement automatic operations via the integrated digital PCR detection apparatus 1, thereby improving the working efficiency of the digital PCR detection apparatus 1.

The microdroplet generating device 10 forms the nucleic acid amplification reaction liquid to be detected into the plurality of microdroplets. Then, the temperature controlling device 20 amplifies the nucleic acids in the plurality of microdroplets, while the fluorescence signal detecting device 30 takes images in real time, the images showing variations in fluorescence of the plurality of microdroplets. Fluorescence variation curves of the plurality of microdroplets are obtained from the images showing variations in fluorescence of the plurality of microdroplets. Ct values of the plurality of microdroplets can be obtained according to the fluorescence variation curves. In addition, a quantitative analysis can be performed to obtain an initial concentration of DNA according to the relationship between the Ct value and the initial copy number. The Ct value refers to the number of the temperature cycles that each microdroplet has undergone when its fluorescence signal reaches a preset threshold.

The microdroplets having a uniform size are generated by the microdroplet generating device 10. The nucleic acid amplification reactions for the plurality of microdroplets are carried out in the temperature controlling device 20; and the signals, such as the fluorescence signals, ultraviolet absorption signals, turbidity signals, and so on, of reaction products are collected by the fluorescence signal detecting device 30.

The number of microdroplets in which amplifications of target sequences are achieved is analyzed by comparing a composition difference between the amplified and non-amplified microdroplets, so that the quantitative analysis of the nucleic acid molecules can be finally achieved. The detection result, obtained by observing the images showing variations in fluorescence of the plurality of microdroplets in real time, is direct, so that the problems of false positive results and false negative results in the plurality of microdroplets can be solved.

In an embodiment, the microdroplet generating device 10 forms the nucleic acid amplification reaction liquid to be detected into the plurality of microdroplets having a uniform size. Then, the temperature controlling device 20 amplifies the nucleic acids in the plurality of microdroplets, while the fluorescence signal detecting device 30 takes images in real time, the images showing variations in fluorescence of the plurality of microdroplets. Fluorescence variation curves of the plurality of microdroplets are obtained from the images showing variations in fluorescence of the plurality of microdroplets. Ct values of the plurality of microdroplets can be obtained according to the fluorescence variation curves. In addition, a quantitative analysis can be performed to obtain an initial concentration of the nucleic acids according to the relationship between the Ct value and an initial copy number.

C in the Ct value denotes the term "cycle", t in the Ct value denotes the term "threshold". In a real-time fluorescence PCR, the Ct value refers to the number of the temperature cycles that each microdroplet has undergone when its fluorescence signal reaches a preset threshold.

Once the cycle number of the PCR cycling reaches the Ct value, a real exponential amplification phase (i.e., the logarithmic phase) has just begun. At this time point, any slight error has not been amplified, so that the Ct value has an excellent reproducibility. That is, for the same nucleic acid template, the Ct values obtained in the amplifications performed at different times or the Ct values obtained in different microdroplet containers at the same time are the same. If the fluorescence curve corresponding to one microdroplet is an amplification curve, it can be determined that this microdroplet contains the target gene component. If the fluorescence curve corresponding to one microdroplet is a straight line, it can be determined that this microdroplet contains no target gene component. The Ct value can be obtained from the acquired real-time fluorescence curve. The Ct value of each microdroplet can be obtained by calculating derivatives along the real-time fluorescence curve. The cycle number at an initial point of a fluorescence curve section having a constant slope is the Ct value.

Figure 12:
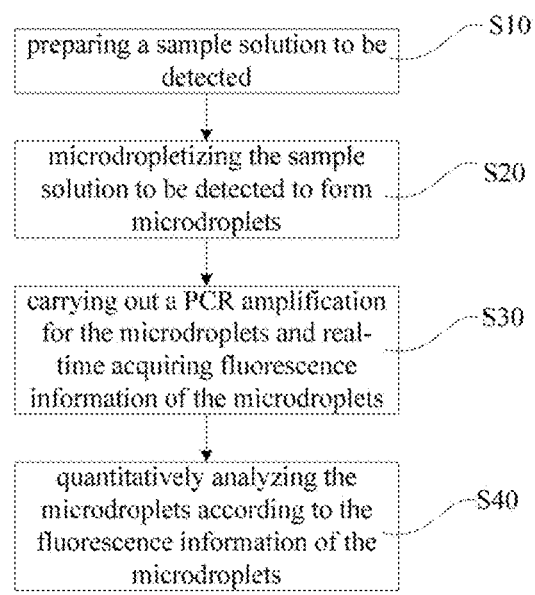
FIG. 12 shows a flowchart of an analysis method using the digital PCR detection apparatus of the present application.

The detection process of the digital PCR detection apparatus 1 mainly includes five parts: the preparation of the nucleic acid amplification reaction liquid to be detected, the microdropletization of the nucleic acid amplification reaction liquid, the amplification of the nucleic acids, the collection of the fluorescence information, and the quantitative analysis. Referring to FIG. 12, in an embodiment, an analysis method using the digital PCR detection apparatus includes steps of: S10, preparing the nucleic acid amplification reaction liquid to be detected; S20, microdropletizing the nucleic acid amplification reaction liquid into the plurality of microdroplets; S30, amplifying the nucleic acids in the plurality of microdroplets and collecting the fluorescence information of the plurality of microdroplets in real time; and S40, quantitatively analyzing the plurality of microdroplets according to the fluorescence information of the plurality of microdroplets. In an embodiment, the step S10 includes: preparing the nucleic acid amplification reaction liquid which needs to be detected. The nucleic acid amplification reaction liquid can include a nucleic acid template to be detected, a reaction buffer aqueous solution, deoxyribonucleoside triphosphate, primers, a polymerase, a product marker, and so on.

The nucleic acid amplification reaction liquid can be a nucleic acid amplification reaction liquid (also referred to as DNA amplification reaction liquid) with desoxyribonucleic acid (DNA) as the template, a reverse transcription nucleic acid amplification reaction liquid (also referred to as RNA reverse transcription reaction liquid) with ribonucleic acid (RNA) as the template, or any other nucleic acid amplification reaction liquid such as a loop-mediated isothermal amplification (LAMP) reaction liquid. The characteristic of the DNA amplification reaction liquid is that the reaction liquid includes dNTP, a buffer solution, inorganic salt ions, a polymerase, primers, a DNA template to be detected, a fluorescent dye or a fluorescent probe, etc., which are necessary for the DNA amplification. The fluorescent dye or the fluorescent probe in the reaction liquid can indicate the nucleic acid amplification, and can be a fluorescent dye capable of binding to the DNA. The fluorescent dye can be such as SYBR® Green, or can be an oligonucleotide probe containing a fluorescent moiety and a quenching moiety, such as a TaqMan® fluorescent probe and so on.

In an embodiment, a set of reagent(s) and solution(s) specifically for the digital PCR is prepared to reduce or avoid a potential contamination to the template DNA sample caused by an exogenous DNA. All of the apparatus and consumable materials should be sterilized and dried at a high temperature. The components of the nucleic acid amplification reaction liquid to be detected can include the template DNA to be amplified, specific oligonucleotide primers for amplifying the template, a thermostable DNA polymerase, four deoxyribonucleotide triphosphate substrates, a divalent metal cation such as Mg', a TaqMan® probe or fluorescent dye, a PCR buffer solution, and so on.

In an embodiment, in the preparation of the nucleic acid amplification reaction liquid, the TaqMan® probe is adopted to label the nucleic acid amplification reaction liquid. In an embodiment, in the preparation of the nucleic acid amplification reaction liquid, the SYBR® fluorescent dye is adopted to label the nucleic acid amplification reaction liquid. In an embodiment, in the step S20 of microdropletizing the nucleic acid amplification reaction liquid to be detected into the plurality of microdroplets, two microdroplet generating methods can be adopted to form the plurality of microdroplets: the microdroplet generating method with the instantaneous accelerated motion, and the microdroplet generating method with the periodical changing speed. A large number of microdroplets can be obtained by microdropletizing the nucleic acid amplification reaction liquid to be detected by the microdroplet generating device 10, and can be used in the detection operation of the digital PCR detection apparatus 1. A driving liquid is a liquid immiscible and having no mutual influence with the nucleic acid amplification reaction liquid to be detected. The first liquid 190 is the nucleic acid amplification reaction liquid to be detected. The second liquid 699 is an oil phase composition.

A large number of microdroplets can be obtained from the prepared nucleic acid amplification reaction liquid via the microdroplet generating device. In the preparation of the plurality of microdroplets, the plurality of microdroplets are placed into the microdroplet container for conveniently detecting the plurality of microdroplets. In an embodiment, a large number of microdroplets are generated in the second liquid via the microdroplet generating device 10 to prevent the fusion between the plurality of microdroplets.

In an embodiment, the step S30 includes S310, spreading the plurality of microdroplets in the microdroplet container; S320, amplifying the nucleic acids in the plurality of microdroplets after the spreading; and S330, photographically detecting the plurality of microdroplets in real time during the amplification of the nucleic acids in the plurality of microdroplets.

Figure 13:
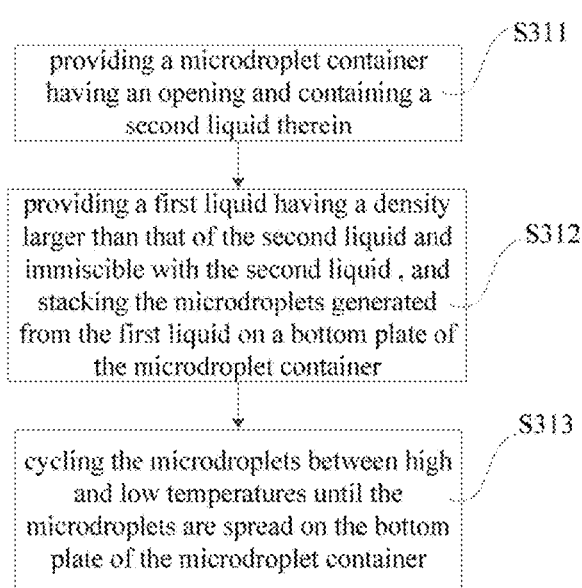
FIG. 13 shows a flowchart of a method for spreading microdroplets of the present application.

Referring to FIG. 13, in an embodiment, the step S310 includes a method for spreading the microdroplets. The method for spreading the microdroplets includes: S311, providing the microdroplet container 60 having an opening 631 and containing the second liquid 699 therein; S312, providing the first liquid 190 having a density larger than that of the second liquid 699 and immiscible with the second liquid 699, and stacking the plurality of microdroplets generated from the first liquid 190 on a bottom plate 610 of the microdroplet container 60; and S313, temperature cycling the plurality of microdroplets between high and low temperatures until the plurality of microdroplets are spread on the bottom plate 610 of the microdroplet container 60.

The plurality of microdroplets are generated in the microdroplet container 60, settled onto the bottom plate 610 of the microdroplet container 60, and disorderly stacked together. The large number of microdroplets settled onto the container bottom plate 610 form multiple layers of microdroplets on the container bottom plate 610. Moreover, during the downward settlement process, the plurality of microdroplets are aggregated at a central portion of the microdroplet container and gathered together, which is inconvenient for the observation.

Figure 14:
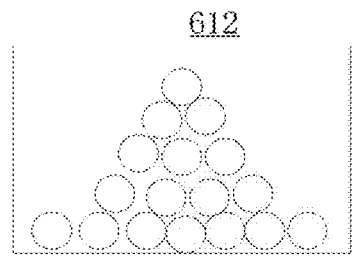
FIG. 14 is a schematic view showing microdroplets stacked on a bottom plate of a microdroplet container of the present application.

Referring to FIG. 14, in the step S10, when the plurality of microdroplets are dropped in the microdroplet container 60, the plurality of microdroplets are stacked on the bottom plate 610 of the microdroplet container, i.e., the plurality of microdroplets form the multiple layers of microdroplets on the bottom plate 610 of the microdroplet container. In the fluorescence signal detecting process, and during taking images of the plurality of microdroplets, the photographic detection of the plurality of microdroplets is affected by the multiple layers. Hence, the microdroplet container 60 containing the plurality of microdroplets is subjected to the high-low temperature cycling. The plurality of microdroplets can be subjected to the high-low temperature cycling for several times until the plurality of microdroplets are spread on the bottom plate 610 of the microdroplet container, so that the large number of microdroplets are spread in the reaction unit 612, which is convenient for a large-scale and parallel observation and detection for a tremendous number of microdroplets.

The spreading operation adopts the phenomenon of thermal expansion and contraction in the high-low temperature cycling performed by the temperature controlling device 20. An object undergoes a thermal expansion due to the increased kinetic energy of molecules and the increased mean free path of molecules when the temperature is increased. Similarly, the object undergoes a thermal contraction due to the decreased kinetic energy of molecules and the decreased mean free path of molecules when the temperature is decreased. As the temperature changes, a viscosity of a sample droplet is reduced and a volume of the sample droplet is contracted when the temperature is increased. The higher the temperature, the lower the viscosity. The sample droplets have the most variable shape (the shape is substantially a hexagon) at the temperature about 60° C.; however, the sample droplets are less variable at other temperatures and thus are difficult to be spread in the microdroplet container.

In an embodiment, the steps of the high-low temperature cycling performed by the temperature controlling device 20 includes: firstly, increasing the temperature of the plurality of microdroplets to 90° C. to 95° C. by heating and then keep heating for 5 minutes (min) to 10 min; secondly, decreasing the temperature of the plurality of microdroplets to 40° C. to 60° C., annealing and extending for 30 s to 60 s; finally, cycling the above steps for several times, then decreasing the temperature to 0° C. to 10° C., and storing the plurality of microdroplets.

In an embodiment, the steps of the high-low temperature cycling performed by the temperature controlling device 20 includes: firstly, increasing the temperature of the plurality of microdroplets to 95° C. by heating and then keep heating for 10 min to thermally activate enzymes in the plurality of microdroplets; secondly, denaturing the plurality of microdroplets for 30 s after the thermal activation of the enzymes in the plurality of microdroplets; thirdly, decreasing the temperature of the plurality of microdroplets to 55° C. after the denaturation, annealing and extending for 45 s, and photographing the plurality of microdroplets. The above steps are cycled for 45 times. Finally, after the 45 cycles, the temperature is decreased to 4° C. store the plurality of microdroplets for a long time.

The plurality of microdroplets are formed from the nucleic acid amplification reaction liquid via the microdroplet generating device 10 for the detection. It is not conducive to observation if the plurality of microdroplets generated via the microdroplet generating device 10 are aggregated and gathered together at the central portion of the microdroplet container 60 in the downward settlement process. By spreading the plurality of microdroplets in the microdroplet container to form a monolayer, the mutual influence between multilayers of microdroplets is avoided, so that the fluorescence signal detecting device 30 obtains more accurate fluorescence information through the photographic detection, facilitating the quantitative analysis.

The PCR reaction conditions include the temperature, the time, and the cycle number.

The temperatures and the times are set as follows. Three temperature points of the denaturation, annealing, and extension are set on the basis of the three steps of the PCR principle. The three-temperature-point method is used in a standard reaction process. More specifically, the double-stranded DNA are denatured at 90° C. to 95° C.; and then the temperature is rapidly decreased to 40° C. to 60° C., at which primers are annealed and bound to target sequences; and then the temperature is rapidly increased to 70° C. to 75° C., at which primer strands extend along the templates under the action of Taq DNA polymerase. For a relatively short target gene (with a length of 100 bp to 300 bp), two-temperature-point method can be used. More specifically, except the denaturation temperature, the annealing temperature and the extension temperature are the same. Typically, the denaturation is at 94° C. and the annealing and the extension are at about 65° C. (at which the Taq DNA enzyme still has a relatively high catalytic activity).

The denaturation temperature and time are set as follows. A main reason causing the failure of the PCR is the inadequate dissociation resulted from a low denaturation temperature. Typically, 93° C. to 94° C. is adequate for the denaturation of the template DNA. The time should be prolonged if the temperature is below 93° C. However, the temperature cannot be too high because the high temperature environment will affects the activity of the enzyme. The PCR will fail if the target gene template or the PCR product cannot be fully denatured.

The annealing (renaturation) temperature and time are set as follows. The annealing temperature is a relatively important factor affecting the specificity of the PCR. By rapidly decreasing the temperature to 40° C. to 60° C., the primer can be bound to the template. Since the template DNA is much more complicated than the primer, the probability of the collision and the binding between the primer and the template is far higher than that between the complementary strands of the template DNA. The annealing temperature and time depend on a length of the primer, a composition and a concentration of bases, and a length of the target sequence. For a primer having twenty nucleotides and a G+C content of about 50%, it is suitable to select 55° C. as a starting point of the anneal temperature.

By selecting a relatively high renaturation temperature within an acceptable range, the nonspecific binding between the primer and the template can be significantly reduced, thereby increasing the specificity of the PCR reaction. The renaturation time is typically 30 sec to 60 sec, which is adequate for the full binding of the primer with the template. The extension temperature and time are set as follows, so that the Taq DNA polymerase has a biological activity: 70° C. to 80° C. for 150 nucleotides/S/enzyme molecule, 70° C. for 60 nucleotides/S/enzyme molecule, and 55° C. for 24 nucleotides/S/enzyme molecule; above 90° C., there is substantially no DNA synthesis.

Therefore, the extension temperature is generally selected between 70° C. to 75° C., and the commonly used temperature is 72° C. A too high extension temperature is unfavorable for the binding between the primer and the template. The extension time of the PCR can be determined according to a length of a fragment to be amplified. Generally, a 1 minute extension is adequate for a DNA fragment having a length smaller than 1 Kb. 3 min to 4 min is required for a target sequence having a length of 3 kb to 4 kb. 15 min is required for the amplification of 10 Kb. A too long extension time will cause nonspecifically amplified segments. The extension time is slightly longer for the amplification of a template with a lower concentration.

In an embodiment, the step of S320 of amplifying the nucleic acids in the plurality of microdroplets includes: firstly, placing the microdroplet container 60 on the heating substrate 240 of the temperature controlling device 20; secondly, increasing the temperature of the plurality of microdroplets to 95° C. by heating and then keep heating for 10 min to thermally activate enzymes in the plurality of microdroplets; thirdly, denaturing the plurality of microdroplets for 30 s after the thermal activation of the enzymes in the plurality of microdroplets; fourthly, decreasing the temperature of the plurality of microdroplets to 55° C. after the denaturation, and annealing and extending for 45 s. The above steps are cycled for 45 times. Finally, after the 45 cycles, the temperature is decreased to 4° C. to store the plurality of microdroplets for a long time.

The flexible circuit board 220 and the thermal conduction enhancing layer 250 used in the temperature controlling device 20 can uniformly distribute the temperature of the microdroplet container 60 and accelerate the heat conducting property of the semiconductor cooler. When the nucleic acid amplification of the plurality of microdroplets are performed at different temperature ranges, the temperature sensor 260 disposed at the surface of the thermal conduction enhancing layer 250 is connected to the second controller 210 to detect the temperature in real-time of the microdroplet container 60 and feed the temperature information to the second controller 210, to control the heating temperature of the plurality of microdroplets. The temperature ranges can be rapidly switched within a few seconds. The temperature can be increased and decreased instantaneously via the temperature controlling device 20, thereby shortening the temperature increasing and decreasing processes to achieve the high-low temperature cycling, reducing the detection time of the digital PCR detection apparatus 1, and increasing the detection efficiency.

In an embodiment, the fluorescence signal detecting device 30 photographically detects the plurality of microdroplets during the nucleic acid amplification of the plurality of microdroplets.

The fluorescence imaging for the plurality of microdroplets can be achieved by the fluorescence signal detecting device 30. A number of fluorescence images showing the plurality of microdroplets can be photographed at one time. An image processing technique can be used to automatically identify the fluorescence of the microdroplets from the images to obtain the fluorescence information of the microdroplets.

In an embodiment, 45 fluorescence images can be obtained for each microdroplet in the microdroplet container 60 via the photographing step proceeded by the fluorescence signal detecting device 30, and the images are used for the quantitative analysis.

In an embodiment, the step S330, the photographically detecting the plurality of microdroplets in real time during the amplification of the nucleic acids in the plurality of microdroplets, includes steps of:

firstly, increasing the temperature of the plurality of microdroplets to 95° C. by heating and then keep heating for 10 min;

increasing the temperature of the plurality of microdroplets to 95° C. by heating and then keep heating for 10 min to thermally activate enzymes in the plurality of microdroplets;

secondly, denaturing the plurality of microdroplets for 30 s after the thermal activation of the enzymes in the plurality of microdroplets;

thirdly, decreasing the temperature of the plurality of microdroplets to 55° C. after the denaturation, annealing and extending for 45 s, and taking the image of the plurality of microdroplets via the fluorescence signal detecting device 30, wherein the above steps are cycled for 45 times, thereby obtaining 45 fluorescence images of the plurality of microdroplets;

finally, after the 45 cycles, the temperature is decreased to 4° C. to store the plurality of microdroplets for long-term storage.

The light path passed through the focusing lens 346 obliquely irradiates the plurality of microdroplets in the microdroplet container 60 to cause the microdroplets containing the fluorescent substances to produce fluorescence. The fluorescence information of the microdroplets containing the fluorescent substances is collected by the fluorescence detecting assembly 330 and transmitted to a computer in the form of the fluorescence image to receive the quantitative analysis.

In the detection method, by using the fluorescence imaging, a number of fluorescence images showing the microdroplets are photographed at one time. Then, the image processing technique is used to automatically identify the fluorescence of the microdroplets from the images to obtain the fluorescence information of the microdroplets. Since the imaging scope of the detection method using the fluorescence imaging is relatively large, the requirements to the detection environment where the plurality of microdroplets are located at during the detection are relatively low.

In an embodiment, the nucleic acid sample to be detected is a DNA-containing sample to be detected. The plurality of microdroplets having a uniform size are generated by the microdroplet generating device 10. The nucleic acid amplification reactions for the plurality of microdroplets are carried out via the temperature controlling device 20; and the signals, such as the fluorescence signals, ultraviolet absorption signals, turbidity signals, and so on, of the reaction products are collected. The number of microdroplets in which an amplification of a target sequence is achieved can be analyzed by comparing a composition difference between the amplified and non-amplified microdroplets to finally achieve the quantitative analysis of the nucleic acid molecules. The images showing variations in fluorescence of the plurality of microdroplets are taken in real time during the heating process of the microdroplets. The Ct values of the plurality of microdroplets are acquired. In addition, the initial concentration of DNA is quantitatively analyzed according to the relationship between the Ct value and the initial copy number.

If the microdroplet contains the target DNA, an intensity of the fluorescence signal will reach a certain level after the amplification, being a positive result; while for the microdroplet containing no DNA, substantially no fluorescence signal can be detected, which is regarded as a negative result.

Assuming that the initial DNA copy number in the microdroplet in the digital PCR is x, according to mathematic statistics theories, the probability distribution function P of x=k (k=0, 1, 2, 3 . . . ) is in accordance with the Poisson probability model, wherein $\lambda$ is a mean molecule copy number contained in the microdroplet.

$$p(x = k) = \frac{\lambda^k}{k!} e^{-\lambda}$$

Therefore, for an expected value $\mu$ and a variance $\sigma^2$, according to the Poisson distribution model, the expected value $\mu$ is $\lambda$ and the variance $\sigma^2$ is $\lambda$. Therefore, the number of copies of the target DNA molecule contained in each microdroplet in the digital PCR is $\lambda$, and thus an quantitative detection of the nucleic acid can be achieved via the calculated $\lambda$.

Assuming that a total volume of the nucleic acid amplification reaction liquid to be detected is V (a volume of each microdroplet is v), a concentration c (copy/$\mu$L) of the nucleic acid amplification reaction liquid to be detected is:

$$c = \frac{n\lambda}{V} = \frac{\lambda}{V/n} = \frac{\lambda}{v}.$$

Thus, the quantitative detection of DNA can be achieved via the calculated $\lambda$.

Due to the reproducibility of the Ct value and the linear relationship between the Ct value and the initial concentration of DNA, no internal standard substance is required for the real-time fluorescence quantitative PCR. Once the cycle number of the PCR cycling reaches the Ct value, a real exponential amplification phase (i.e., the logarithmic phase) has just begun. At this time point, any slight error has not been amplified, so that the Ct value has an excellent reproducibility. That is, for the same DNA template, the Ct values obtained in the amplifications performed at different times or the Ct values obtained in different microdroplet containers at the same time are the same.

If the fluorescence curve corresponding to one microdroplet is an amplification curve, it can be determined that this microdroplet contains the target gene component. If the fluorescence curve corresponding to one microdroplet is a straight line, it can be determined that this microdroplet contains no target gene component.

The Ct value can be obtained from the acquired real-time fluorescence curve. The Ct value of each microdroplet can be obtained by calculating derivatives along the real-time fluorescence curve. The cycle number at an initial point of a fluorescence curve section having a constant slope is the Ct value.

In an embodiment, a plurality of microdroplets with a uniform volume can be generated via the microdroplet generating device 10. Each microdroplet has a size at a micrometer scale. The quantitative analysis is performed for the plurality of microdroplets according to their fluorescence information on the condition that the plurality of microdroplets have the uniform volume.

Referring to FIG. 15, the step S40 can include a digital PCR quantitative detection method including steps of:
S4110, acquiring real-time fluorescence images of all microdroplets, and acquiring real-time fluorescence curves of the microdroplets undergone the nucleic acid amplification according to the real-time fluorescence images;
S4120, acquiring Ct values of all of the microdroplets undergone the nucleic acid amplification from the real-time fluorescence curves;
S4130, acquiring initial nucleic acid copy numbers of all of the microdroplets undergone the nucleic acid amplification according to a relationship between the Ct value and the initial nucleic acid copy number of the microdroplet undergone the nucleic acid amplification;
S4140, acquiring a frequency distribution of the initial nucleic acid copy numbers according to the initial nucleic acid copy numbers of all of the microdroplets undergone the nucleic acid amplification; and
S4150, calculating the parameter $\lambda$ of a Poisson distribution according to the frequency distribution of the initial nucleic acid copy numbers.

The digital PCR quantitative detection method solves the problems of the false positive result and the false negative result. Hundreds of samples can be simultaneously detected by the high-throughput sequencing platform. Moreover, different kinds of fluorescence can be used to detect multiple sites, thereby increasing the detection speed and reducing the experimental cost. Through the microdropletization of the digital PCR detection apparatus, the fragment with a small amount to be detected is separated from the plentiful and complex background, the operating steps are significantly simplified, the preparation and detection times are effectively saved, the result is direct and reliable, the characteristic of stable implementation is achieved, and the sensitivity and the accuracy of the detection are increased and meet the requirements of precise quantification.

In an embodiment, the S4110 includes:
S4111, acquiring fluorescence intensity values of each microdroplet undergone the nucleic acid amplification according to the real-time fluorescence images;
S4113, acquiring the real-time fluorescence curve of the each microdroplet undergone the nucleic acid amplification according to the fluorescence intensity values of the each microdroplet undergone the nucleic acid amplification; and S4115, acquiring the real-time fluorescence curves of all of the microdroplets undergone the nucleic acid amplification according to the real-time fluorescence curve of every microdroplet undergone the nucleic acid amplification.

In an embodiment, the fluorescence images of the plurality of microdroplets are acquired, and an image tracking is performed. The locations of the microdroplets in each image are respectively located, and the fluorescence intensity of each microdroplet is acquired, to acquire the real-time fluorescence curve of each microdroplet. In the digital PCR detection apparatus, an actual scale corresponding to each pixel of the fluorescence image can be indicated in the imaging system. The number of pixels corresponding to the diameter of the microdroplet is extracted from the fluorescence image, so that how many micrometers the diameter is can be known, thereby obtaining the diameter of the microdroplet accordingly.

In an embodiment, when tracking each microdroplet, the NCAST image differential and clustering algorithm can be used to identify the location of the each microdroplet in the image taken in each temperature cycle, so that the fluorescence intensities of the microdroplets can be acquired.

In an embodiment, when a moving distance of the microdroplet caused by one temperature cycle is smaller than or equal to the diameter of the microdroplet, the following method is used to track the microdroplet. When tracking each microdroplet, the step of the image tracking for the each microdroplet includes:

firstly, identifying and acquiring a location of a center of each microdroplet from the image taken in each temperature cycle;

secondly, comparing the location of the center of each microdroplet currently identified with the location of the center of each microdroplet in the previous temperature cycle; and thirdly, if a distance between the location of the center of one microdroplet currently identified and the location of the center of one microdroplet in the previous temperature cycle is smaller than the diameter of the microdroplet, then indicating the two microdroplets as the same microdroplet.

In an embodiment, the fluorescence curve of each microdroplet is acquired according to the fluorescence intensity values of the each microdroplet in the temperature cycling. The fluorescence intensity of one microdroplet at a specific time point is achieved by summing the fluorescence intensity values of all portions of this microdroplet in each temperature cycle.

In an embodiment, the fluorescence intensity of each microdroplet at a specific time point is achieved by the portion-summing to avoid the interaction at border portions of adjacent microdroplets. The variations of the microdroplets in all temperature cycles and the fluorescence curve of each microdroplet can be obtained according to the fluorescence intensity values of the microdroplets in every temperature cycle. In an embodiment, each microdroplet undergoes 45 cycles and 45 fluorescence images are obtained in total. By locating each microdroplet in the 45 fluorescence images and acquiring 45 fluorescence intensity values of the each microdroplet, the fluorescence curve of the each microdroplet is obtained.

In an embodiment, the step S4120 includes:

S4121, calculating derivatives of the real-time fluorescence curve of each microdroplet undergone the PCR amplification to acquire slopes of the real-time fluorescence curve of the each microdroplet undergone the PCR amplification;

S4123, acquiring a constant slope value from the slopes of the real-time fluorescence curve of the each microdroplet undergone the PCR amplification according to the slopes of the real-time fluorescence curve of the each microdroplet undergone the PCR amplification;

S4125, acquiring an initial cycle number corresponding to the constant slope value, the initial cycle number being the Ct value of the each microdroplet undergone the PCR amplification;

S4127, acquiring Ct values of all of the microdroplets undergone the PCR amplification according to the Ct value of every microdroplet undergone the PCR amplification.

In an embodiment, the step S4120 further includes:

S4122, determining a default value of a fluorescence threshold of each microdroplet undergone the PCR amplification according to the real-time fluorescence curve of the each microdroplet undergone the PCR amplification;

S4124, acquiring a cycle number corresponding to the default value of the fluorescence threshold of the each microdroplet undergone the PCR amplification, the cycle number being the Ct value of the each microdroplet undergone the PCR amplification;

S4126, acquiring Ct values of all of the microdroplets undergone the PCR amplification according to the Ct value of every microdroplet undergone the PCR amplification.

C in the Ct value denotes the term "cycle", t in the Ct value denotes the term "threshold". The Ct value refers to the cycle number in each reactor when the fluorescence signal in the reactor reaches a preset threshold.

In an embodiment, the fluorescence signals of the first 15 cycles of the PCR reaction are used as a fluorescence baseline signal. The default value of the fluorescence threshold is set as 10 times of a standard deviation (SD) of the fluorescence signals of the 3rd to 15th cycle, i.e., threshold=10×$SD_{cycle\ 3-15}$. The corresponding cycle number, which is the Ct value, is acquired according to the default value of the fluorescence threshold.

In an embodiment, there is a linear relationship between the Ct value of each microdroplet in the S4130 and a logarithm of the initial DNA copy number of the each microdroplet.

In an embodiment, there is a linear relationship between the Ct value of one template (DNA) and a logarithm of the initial copy number of this template (DNA). The linear relationship is expressed as:

$$C_t = \frac{1}{lg(1+E_x)} \cdot lg(x_0) + \frac{lg\ N}{lg(1+E_x)}.$$

$x_0$ is the initial copy number of the template (DNA), $E_x$ is the efficiency of the amplification, and N is the amount of the amplified product when the fluorescence amplification signal reaching the threshold.

The larger the initial copy number, the smaller the Ct value. A standard curve can be obtained by using a standard substance with a known initial copy number, wherein the x-coordinate represents the logarithm of the initial copy number, and the y-coordinate represents the Ct value. Therefore, an initial copy number of a sample can be calculated from the standard curve as long as the Ct value of this sample is obtained.

$$lg(x_0) = lg\ N - Ct\ lg(1+E_x), E_x < 1$$

wherein $x_0$ is the initial copy number of the template (DNA).

The relationship between the Ct value and the initial concentration of DNA is that there is a linear relationship between the Ct value of each DNA template and a logarithm of the initial copy number of this DNA template. The larger the initial copy number, the smaller the Ct value.

In an embodiment, the S4140 includes:

S4141, acquiring a maximum value and a minimum value of the initial nucleic acid copy numbers of all of the microdroplets undergone the nucleic acid amplification according to the initial nucleic acid copy numbers of all of the microdroplets undergone the nucleic acid amplification;

S4143, determining the number of classes and the length of each class interval according to the maximum value and the minimum value, and acquiring a frequency distribution of the initial nucleic acid copy numbers.

The frequency refers to the number of data in a specific class interval. A sum of the frequencies in respective class intervals is equal to the total number of this set of data.

In an embodiment, in the step 4150, a maximum likelihood estimation method is used to calculate the parameter $\lambda$ of the Poisson distribution.

In an embodiment, for the droplet-type PCR, the initial copy number in a single droplet satisfies the Poisson distribution.

$$P(x=k) = \frac{\lambda^k}{k!}e^{-\lambda}$$

wherein $\lambda$ is a mean of the initial DNA copy numbers contained in the microdroplets. The mean of the initial copy numbers contained in the droplets is denoted by copies per droplet (CPD).

In an embodiment, the number $n_k$ of the microdroplets having an initial DNA copy number k (k=0, 1, 2, 3 . . . ) can be obtained according to the Ct value. In the maximum likelihood estimation, the following equation is satisfied:

$$\hat{\lambda} = \frac{\sum_{k=1}^{n}(n_k \times k)}{n} = \bar{x}$$

wherein $n_k$ is the frequency corresponding to the initial DNA copy number in the microdroplet; that is, $n_0$ is the number of microdroplets each having the initial DNA copy number k=0, $n_1$ is the number of microdroplets each having the initial DNA copy number k=1, $n_2$ is the number of microdroplets each having the initial DNA copy number k=2, $n_3$ is the number of microdroplets each having the initial DNA copy number k=3, and so on. By using this method, there is no need to provide the number of the negative or dark microdroplets. Moreover, the accuracy and the stability of the optimal parameter estimation using the complete frequency distribution data is much higher than the accuracy and the stability of the estimation using only one frequency point.

Referring to FIG. 16, in an embodiment, a digital PCR quantitative detection method includes steps of:

S4210, acquiring real-time fluorescence images of all microdroplets, and acquiring real-time fluorescence curves of the microdroplets undergone the nucleic acid amplification according to the real-time fluorescence images;

S4220, acquiring Ct values of all of the microdroplets undergone the nucleic acid amplification from the real-time fluorescence curves;

S4230, acquiring initial nucleic acid copy numbers of all of the microdroplets undergone the nucleic acid amplification according to the relationship between the Ct value and the initial nucleic acid copy number of the microdroplet undergone the nucleic acid amplification;

S4240, selecting a portion of the initial nucleic acid copy numbers from the initial nucleic acid copy numbers of all of the microdroplets undergone the nucleic acid amplification;

S4250, acquiring a frequency distribution of the portion of the initial nucleic acid copy numbers according to the portion of the initial nucleic acid copy numbers;

S4260, performing a point estimation of the Poisson distribution according to the frequency distribution of the portion of the initial nucleic acid copy numbers to acquire the parameter $\lambda$ of the Poisson distribution.

In an embodiment, the point estimation of the Poisson distribution is performed by using a least-squares method on the incomplete samples of DNA initial concentrations of all of the microdroplets.

The point estimation of the Poisson distribution can also be performed by using the expectation-maximization (EM) algorithm or the Markov chain Monte Carlo (MCMC) method. The Markov chain Monte Carlo (MCMC) method is one of the Bayesian methods.

In an embodiment, the step S4260 includes: searching $\lambda$ in an interval $[\lambda_{min}, \lambda_{max}]$ to minimize a sum of squared errors (err) of the frequencies of the portion of the initial nucleic acid copy numbers.

In an embodiment, when the initial concentration of DNA is relatively small, the number of the microdroplets each containing more than 4 copies is small (or can be ignored). For a system having 20,000 microdroplets, it is generally suggested that the concentration of the sample DNA is not more than 6 CPD. In a practical experiment, when k>4, the difference in the Ct values becomes small, so it is difficult to determine whether the initial copy number of one microdroplet is 4 or 5 according to the Ct value. Therefore, the point estimation of the Poisson distribution is performed by using incomplete samples $x_0, x_1, x_2, x_3$. Various algorithms can be used to perform the point estimation of the Poisson distribution based on the incomplete samples. One operable algorithm is the least-squares method.

In an embodiment, the interval $[\lambda_{min}, \lambda_{max}]$ is given, k is searched in the interval $[\lambda_{min}, \lambda_{max}]$, the sum of squared errors is calculated, and the appropriate value fork is selected to minimize the sum of squared errors.

$$err = \sum_{k=0}^{3}\left[\frac{n_k}{N} - P(x=k)\right]^2 = \sum_{k=0}^{3}\left[\frac{n_k}{N} - \frac{\lambda^k}{k!}e^{-\lambda}\right]^2$$

The initial DNA copy number contained in each microdrople is a random variable x. $n_k$ is the frequency and is corresponding to the initial DNA copy numbers of the portion of the microdroplets. N is a total number of the microdroplets.

In an embodiment, in S4260, the method for the point estimation of the Poisson distribution can also be the method of moments, the order statistics estimation, or the maximum likelihood estimation.

The method for the point estimation further includes:

The method of moments: the method of moments utilizes sample moments to estimate the corresponding parameter in a population.

Firstly, an equation involving a population moment of an interested parameter (i.e. an expected value of a power of a random variable under consideration) is derived. Secondly, a sample is selected and the population moment is estimated from this sample. Then, the sample moment is used to replace the (unknown) population moment, and the interested parameter is solved, thereby obtaining the estimated value of that parameter.

The order statistics estimation: the order statistics estimation is a method using a median of samples to estimate a mathematical expectation of the population. The order statistics estimation has advantages of simple calculation and insusceptibility to particular abnormal data. If one data value in a set of sample values is abnormal (for example, is too large or too small), this abnormal data may be due to the randomness of the population, or due to the outside interference (for example, carelessness of the operator or clerical error). When the reason is the latter, the estimation of $E(x)$ by using the mean value of samples is obviously affected. However, when the median of samples is used to estimate $E(x)$, it is not easy to affect the estimated value because the value of the median is not easy to be changed by one (even more) abnormal data.

The maximum likelihood estimation: the maximum likelihood (ML) estimation method is also known as maximum probability estimation or greatest likelihood estimation, and is a theoretical point estimation. The basic principal of the maximum likelihood estimation is that when observed values of n samples are randomly extracted from the model population, the most reasonable estimated parameter value should allow the probability of extracting these observed values of n samples from the model to be maximal, which is different from the least-squares method that aims to obtain the estimated value of the parameter that allow the model to optimally fit the sample data.

In practice, the digital PCR quantitative detection method can measure the DNA initial concentrations of the microdroplets in a high accuracy without depending on any standard curve. In the digital PCR detection apparatus 1, an actual size corresponding to each pixel of the fluorescence image can be indicated in the imaging system. The number of pixels corresponding to the diameter of the microdroplet is extracted from the fluorescence image, so that how many micrometers the diameter is can be known, thereby obtaining the diameter of the microdroplet accordingly.

The dynamic tracking of the microdroplets can be achieved by the digital PCR quantitative detection method, and the specific location of each microdroplet in the temperature cycling process of the microdroplets can be located, so that the whole process of the nucleic acid amplification can be monitored. Therefore, the problem of false positive results in the microdroplets can be solved by the digital PCR quantitative detection method. Moreover, a real absolute quantification can be achieved by processing the fluorescence curves of the microdroplets, and by statistically correcting without depending on the assumption of uniformity.

The dependency on the standard curve is avoided; the problem of uncertain quantitative result caused by the standard curve is solved; the restriction of the droplet-type digital PCR end-point detection method is removed; and the limitation of the parameter estimation for entire samples to be detected by using only one data of $p(x=0)$ is eliminated. The real-time fluorescence quantification PCR detection method increases the accuracy of the digital PCR quantitative detection.

By using the digital PCR quantitative detection method, there is no need to provide the number of the negative or empty microdroplets. Moreover, the accuracy and the stability of the optimal parameter estimation using multidimensional frequency distribution data is much higher than the accuracy and the stability of the estimation using only one data of $p(x=0)$.

Each fluorescence curve represents a varying process of useful information incorporating microdroplet sample information, so that the real-time monitoring can be achieved; and the algorithm can be set to eliminate the mutual influence between adjacent microdroplets.

The digital PCR quantitative detection method achieves high repeatability and sensitivity based on a nonobjective mathematic model and has a relatively wide dynamic range, and can achieve the monitoring by utilizing a small number of droplets. A small amount of data can be used to cover more information. Moreover, the digital PCR quantitative detection method avoids the errors of the previous Poisson distribution probability model, achieves the absolute quantification, and is more direct. All data are combined to avoid the random error. By acquiring the fluorescence curves of the microdroplet samples and monitoring the variations of the fluorescence luminance of the microdroplet samples in real time, the false positive result can be avoided, the mutual influence between adjacent droplets can be eliminated, and more accurate data source is provided for the subsequent quantitative analysis model.

Referring to FIG. 17, the Poisson distribution fitting is obtained according to the portion of the initial nucleic acid copy numbers, which are 0, 1, 2, and 3, wherein the x-coordinate is the mean of the initial copy numbers (i.e., the copies per droplet, CPD) contained in the microdroplets, and the y-coordinate is the standard deviation (Std Dev, STD) of the mean. The mean of the initial copy numbers contained in the microdroplets is denoted by the copies per droplet (CPD). It can be seen that the standard deviation of the mean, i.e. the standard deviation of CPD, based on the portion of the initial nucleic acid copy numbers is smaller than the standard deviation of the CPD obtained by other algorithms. Therefore, the mean of the initial copy numbers, i.e. the value of CPD, of the microdroplets obtained by the present algorithm is more accurate. The results obtained by performing the simulation 1000 times for 20000 droplets show that the estimation method using only a single point can cover only a limited concentration range and the estimation accuracy is dramatically decreased with the increase of the sample concentration, while for the incomplete Poisson distribution fitting algorithm (N=0, 1, 2, 3), the estimation accuracy has no obvious change with the increase of the sample concentration, so that the concentration of the nucleic acid amplification reaction liquid to be detected can be expanded for two times. For a relatively small number of droplets, the incomplete Poisson distribution fitting algorithm (portion-sampling Poisson distribution fitting algorithm) still has an excellent reliability.

The simulation results show that, for an experimental system having 200 droplets, the accuracy obtained by using the digital PCR quantitative detection method is superior to that obtained by using conventional single point estimation algorithm (uCount algorithm). For similar numbers of the microdroplets, the stability, the accuracy, and the available dynamic range of the Poisson fitting algorithm are much superior to those of the conventional single point estimation algorithm. To achieve the same detection accuracy, the microdroplet number required by the Poisson fitting algorithm is two orders of magnitude lower than the microdroplet number required by the conventional single point estimation algorithm. Consequently, the detection accuracy of the digital PCR detection apparatus 1 is increased, the detection range is broadened, and multiple types of nucleic acids can be detected by using a small number of droplets, thereby increasing the operation efficiency of the digital PCR detection apparatus 1.

In an embodiment, a plurality of microdroplets having a uniform volume are generated by the microdroplet generating device 10; however, their volumes may be changed due to some special reasons and become non-uniform, or a plurality of microdroplets having non-uniform volumes are generated by the microdroplet generating device 10 to perform medical clinical test.

Generally, the reaction units used in both the micropore-type and droplet-type digital PCR technologies have highly uniform volumes, and can be regarded as single-volume digital PCR technique. An upper limit of the quantification of the single-volume digital PCR mainly depends on the number and the volume of the reaction units, and a lower limit of the detection of the single-volume digital PCR is related to the total sample volume. The resolution and the dynamitic range of the single-volume digital PCR technique cannot be separately regulated. Although its dynamitic range can be broadened via the continuous dilution for the sample to be detected, its detection sensitivity cannot be increased. In addition, the continuous dilution increases usage amounts of reagents, and increases the risk of cross contamination, and has complex operation steps.

The multi-volume digital PCR (MVdPCR) can avoid the disadvantages caused by the continuous dilution while allows researchers to independently regulate the dynamitic range and the resolution.

The microdroplet container of the multi-volume digital PCR contains a plurality of reaction units having different volumes. The reaction unit having a small volume can be used to quantify a sample having a high concentration. The reaction unit having a large volume can achieve a high sensitivity detection via its sufficient volume. The multi-volume digital PCR can obtain the same dynamitic range as that of the single-volume digital PCR without necessarily having a large number of the reaction units. Therefore, an analysis can be achieved for more samples in the microdroplet container while the usage amounts of reagents can be effectively decreased.

In the digital PCR detection apparatus, an actual size corresponding to each pixel of the fluorescence image can be indicated in the imaging system. The number of pixels corresponding to the diameter of the microdroplet is extracted from the fluorescence image, so that how many micrometers the diameter is can be known, thereby obtaining the diameter of the microdroplet accordingly.

In an embodiment, the sample solution applied to the quantitative analysis method of the digital PCR detection apparatus is the nucleic acid amplification reaction liquid.

Referring to FIG. 18, in view of the above, a multi-volume digital PCR quantitative analysis method is provided, including:

S4310, acquiring volumes $v_1, v_2, \ldots, v_m$ of all microdroplets, numbers $n_1, n_2, \ldots, n_m$ of microdroplets respectively having the volumes $v_1, v_2, \ldots, v_m$, and numbers $b_1, b_2, \ldots, b_m$ of negative microdroplets in the microdroplets respectively having the volumes $v_1, v_2, \ldots, v_m$ after the nucleic acid amplification;

S4320, constructing a joint binomial distribution function $f(c)$ for a concentration c of the nucleic acid amplification reaction liquid according to the relevant parameters $v_1, v_2, \ldots, v_m, n_1, n_2, \ldots, n_m$, and $b_1, b_2, \ldots, b_m$ of all of the microdroplets after the nucleic acid amplification;

S4330, calculating the value of c allowing the joint binomial distribution function $f(c)$ to have an extremum according to the joint binomial distribution function $f(c)$;

S4340, converting the joint binomial distribution function $f(c)$ into another joint binomial distribution function F ($\Lambda$) of ln (c), and acquiring a standard deviation and a confidence interval of ln (c);

S4350, acquiring a standard deviation and a confidence interval of the concentration c of the nucleic acid amplification reaction liquid according to the standard deviation and the confidence interval of ln (c).

If the microdroplet contains the target DNA, an intensity of the fluorescence signal will reach a certain level after the amplification, being a positive result; while for the microdroplet containing no DNA, substantially no fluorescence signal can be detected, which is regarded as a negative result.

Assuming that the initial DNA copy number in the microdroplet in the digital PCR is x, according to mathematic statistics theories, the probability distribution function P of x=k (k=0, 1, 2, 3) is in accordance with the Poisson probability model, wherein $\lambda$ is a mean molecule copy number contained in the microdroplet.

$$p(x=k) = \frac{\lambda^k}{k!}e^{-\lambda}$$

Therefore, for an expected value $\mu$ and a variance $\sigma^2$, according to the Poisson distribution model, the expected value $\mu$ is $\lambda$ and the variance $\sigma^2$ is $\lambda$. Therefore, the number of copies of the target DNA molecule contained in each microdroplet in the digital PCR is $\lambda$, and thus an quantitative detection of the nucleic acid can be achieved via the calculated $\lambda$.

Assuming that a total volume of the nucleic acid amplification reaction liquid to be detected is V (a volume of each microdroplet is v), a concentration c (copy/µL) of the nucleic acid amplification reaction liquid to be detected is:

$$c = \frac{n\lambda}{V} = \frac{\lambda}{V/n} = \frac{\lambda}{v}.$$

Thus, the quantitative detection of DNA can be achieved via the calculated $\Lambda$.

Due to the reproducibility of the Ct value and the linear relationship between the Ct value and the initial concentration of DNA, no internal standard substance is required for the real-time fluorescence quantitative PCR. Once the cycle number of the PCR cycling reaches the Ct value, a real exponential amplification phase (i.e., the logarithmic phase) has just begun. At this time point, any slight error has not been amplified, so that the Ct value has an excellent reproducibility. That is, for the same DNA template, the Ct values obtained in the amplifications performed at different times or the Ct values obtained in different microdroplet containers at the same time are the same.

If the fluorescence curve corresponding to one microdroplet is an amplification curve, it can be determined that this microdroplet contains the target gene component. If the fluorescence curve corresponding to one microdroplet is a straight line, it can be determined that this microdroplet contains no target gene component.

The Ct value can be obtained from the acquired real-time fluorescence curve. The Ct value of each microdroplet can be obtained by calculating derivatives along the real-time fluorescence curve. The cycle number at an initial point of a fluorescence curve section having a constant slope is the Ct value.

In an embodiment, the S4310 includes:
S4311, forming a sample solution containing a target nucleic acid into a plurality of microdroplets, acquiring the different volumes $v_1, v_2, \ldots, v_m$ of the microdroplets, and acquiring the numbers $n_1, n_2, \ldots, n_m$ of the microdroplets respectively having the volumes $v_1, v_2, \ldots, v_m$;
S4313, performing a nucleic acid amplification on all of the microdroplets and photographically detecting all of the microdroplets to acquire fluorescence images of all of the microdroplets;
S4315, acquiring the numbers $b_1, b_2, \ldots, b_m$ of negative microdroplets respectively having the volumes $v_1, v_2, \ldots, v_m$ after the nucleic acid amplification of all of the microdroplets according to the fluorescence images of all of the microdroplets.

In an embodiment, the S4310 includes:
S4312, forming a sample solution containing a target nucleic acid into a plurality of microdroplets;
S4314, performing a nucleic acid amplification on the plurality of microdroplets, and photographically detecting the plurality of microdroplets to acquire the fluorescence images of all of the microdroplets undergone the nucleic acid amplification;
S4316, acquiring the volumes $v_1, v_2, \ldots, v_m$ of all of the microdroplets undergone the nucleic acid amplification, acquiring the numbers $n_1, n_2, \ldots, n_m$ of the microdroplets undergone the nucleic acid amplification and respectively having the volumes $v_1, v_2, \ldots, v_m$, and acquiring the numbers $b_1, b_2, \ldots, b_m$ of negative microdroplets undergone the nucleic acid amplification and respectively having the volumes $v_1, v_2, \ldots, v_m$, according to the fluorescence images.

In an embodiment, the fluorescence images of the plurality of microdroplets are acquired and an image tracking is performed. When acquiring the real-time fluorescence curve of each microdroplet, the locations of the microdroplets in each image are respectively located, and the fluorescence intensity of each microdroplet is acquired. In the digital PCR detection apparatus, an actual size corresponding to each pixel of the fluorescence image can be indicated in the imaging system. The number of pixels corresponding to the diameter of the microdroplet is extracted from the fluorescence image, so that how many micrometers the diameter is can be known, thereby obtaining the diameter of the microdroplet accordingly.

In an embodiment, when tracking each microdroplet, the NCAST image differential and clustering algorithm can be used to identify the location of the each microdroplet in the image taken in each temperature cycle, so that the fluorescence intensities of the plurality of microdroplets can be acquired.

In an embodiment, the fluorescence curve of each microdroplet is acquired according to the fluorescence intensity values of the each microdroplet in temperature cycling. Each fluorescence curve represents a varying process of useful information incorporating microdroplet sample information, so that the real-time monitoring can be achieved; and the algorithm can be set to eliminate the mutual influence between adjacent droplets. The fluorescence intensity value of one microdroplet at a specific time point is achieved by summing the fluorescence intensities of all portions of this microdroplet in each temperature cycle.

In an embodiment, the fluorescence intensity of each microdroplet at a specific time point is achieved by the portion-summing to avoid the interaction at border portions of adjacent microdroplets. The variations of the plurality of microdroplets in all cycles and the fluorescence curve of each microdroplet can be obtained according to the fluorescence intensity values of the plurality of microdroplets in each temperature cycle. In an embodiment, each microdroplet undergoes 45 cycles and 45 fluorescence images are obtained in total. The fluorescence curve of the each microdroplet can be obtained by locating each microdroplet in the 45 fluorescence images and acquiring 45 fluorescence intensity values of the each microdroplet.

In an embodiment, the joint binomial distribution function $f(c)$ of the concentration c of the nucleic acid amplification reaction liquid to be detected constructed in the S4320 is:

$$f(c) = p = \prod C_{n_i}^{b_i} e^{-cv_i b_i} (1 - e^{-cv_i})^{n_i - b_i}.$$

In the single-volume digital PCR, assuming the volume of each microdroplet is v and the concentration of the nucleic acid amplification reaction liquid to be detected is c, then a mean copy number of the DNA contained in each microdroplet is vc. k is the copy number of the molecule contained in each microdroplet. The probability distribution P of k derived from the Poisson distribution probability model is:

$$p = \frac{(cv)^k e^{-cv}}{k!}.$$

For the negative microdroplet containing no target DNA molecule, i.e., k=0, the above equation can be transformed into:

$$p_{(k=0)} = e^{-cv}.$$

In the single-volume digital PCR analysis, the probability of the negative microdroplet can be estimated according to the total number n of the microdroplets and the total number b of the negative microdroplets.

Therefore, the following can be derived:

$$c = \frac{-\ln(b/n)}{v}.$$

For the particular experimental result, the number b of the negative microdroplets and the total number n are already known. Therefore, the following binomial equation is constructed:

$$p = C_n^b p^b (1-p)^{n-b} = C_n^b e^{-cvb}(1-e^{-cv})^{n-b}.$$

According to the analysis process of the single-volume digital PCR, if the volumes of respective microdroplets are $v_1, v_2, \ldots, v_m$, and the numbers of the respective microdroplets having the volumes $v_1, v_2, \ldots, v_m$ are $n_1, n_2, \ldots, n_m$, then the following joint binomial distribution function of c is constructed:

$$f(c) = p = \prod C_{n_i}^{b_i} e^{-cv_i b_i}(1-e^{-cv_i})^{n_i-b_i}.$$

In an embodiment, the S4330 includes:
S4331, calculating a derivative of the joint binomial distribution function $f(c)$, thereby acquiring the derivative of the joint binomial distribution function $f(c)$;
S4332, acquiring a value of the concentration c of the nucleic acid amplification reaction liquid when the joint binomial distribution function $f(c)$ reaches the extremum by having the derivative of the joint binomial distribution function $f(c)$ being 0.

Generally, when a derivative of a function is 0, the value of the function is a maximum value or a minimum value. Since a binomial distribution function has only one extremum, a solution allowing the derivative of the function to be 0 is the most probable value of the concentration. The corresponding most probable value of c is acquired by allowing the joint binomial distribution function $f(c)$ reaches the maximum value.

In an embodiment, in the step S4340, the joint binomial distribution function $F(\Lambda)$ of ln (c) is:

$$F(\Lambda) = p = \prod C_{n_i}^{b_i} \theta e_i^{e^\Lambda b_i}(1-e_i^{e^\Lambda})^{n_i-b_i}.$$

Replacing c with ln (c) and having $\theta = e^{-\lambda}$ and $\Lambda = \ln(c)$, the joint binomial distribution function $f(c)$ is converted into:

$$F(\Lambda) = p = \prod C_{n_i}^{b_i} \theta e_i^{e^\Lambda b_i}(1-e_i^{e^\Lambda})^{n_i-b_i}.$$

The function P of ln (c) is more symmetrical than the function P of c. Therefore, the standard deviation σ of ln (c) is more statistically significant. A better accuracy is obtained for the analysis of the low concentration sample by reinforcing the constraint condition that the concentration is a positive value. When calculating the standard deviation σ of ln (c), the corresponding variable should be replaced to simplify the calculation.

In an embodiment, the S4340 includes:
S4341, taking a logarithm of the function $F(\Lambda)$ to acquire a function $L(\Lambda)$;
S4342, calculating a first derivative of the function $L(\Lambda)$ and having the first derivative of the function $L(\Lambda)$ being 0;
S4343, acquiring the standard deviation σ of ln (c);
S4344, acquiring the confidence interval of ln (c) according to the standard deviation σ of ln (c).

By taking the logarithm of the function $F(\Lambda)$, the function $F(\Lambda)$ is converted into:

$$L(\Lambda) = \ln F(\Lambda) = \sum_{i=1}^{m}\left[\ln C_{n_i}^{b_i} + b_i e^\Lambda \ln(\theta_i) + (n_i-b_i)\ln\left(1-\theta_i^{e^\Lambda}\right)\right].$$

By taking a natural logarithm of the function $F(\Lambda)$, the corresponding multiplication relation can be changed to independent addition relation, so that the corresponding derived function can be processed more easily.

By calculating the first derivative of the function $L(\Lambda)$, the following is acquired.

$$\frac{\partial L(\Lambda)}{\partial \Lambda} = \sum_{i=1}^{m}\left[b_i e^\Lambda \ln(\theta_i) - \frac{(n_i-b_i)e^\Lambda \theta_i^{e^\Lambda}}{1-\theta_i^{e^\Lambda}}\ln(\theta_i)\right]$$

By replacing ln ($\theta_i$) with $-v_i$, and denoting the number of the positive microdroplets each having the i-th volume with $t_i$, $b_i = n_i - t_i$, the equation in the step 4 is converted into:

$$\frac{\partial L(\Lambda)}{\partial \Lambda} = e^\Lambda \sum_{i=1}^{m}\left[-b_i v_i + \frac{(n_i-b_i)v_i \theta_i^{e^\Lambda}}{1-\theta_i^{e^\Lambda}}\right]$$

$$= e^\Lambda \sum_{i=1}^{m}\left[-n_i v_i + \frac{t_i v_i}{1-\theta_i^{e^\Lambda}} - \frac{t_i v_i \theta_i^{e^\Lambda}}{1-\theta_i^{e^\Lambda}} + \frac{t_i v_i \theta_i^{e^\Lambda}}{1-\theta_i^{e^\Lambda}}\right]$$

$$= e^\Lambda \sum_{i=1}^{m}\left[-n_i v_i + \frac{(n_i-b_i)v_i}{1-\theta_i^{e^\Lambda}}\right].$$

Having the formula $$\frac{\partial L(\Lambda)}{\partial \Lambda}$$

being zero, the following equation is to be solved.

$$\sum_{i=1}^{m} n_i v_i = \sum_{i=1}^{m}\left[\frac{(n_i-b_i)v_i}{1-e^{-v_i c}}\right]$$

In an embodiment, in the S4343, the standard deviation σ is acquired according to Fisher information I ($\Lambda$) of ln (c).
In an embodiment, in the S4343, the Fisher information I ($\Lambda$) of ln (c) is:

$$\frac{1}{\sigma^2} = I(\Lambda) = -\int \frac{\partial^2 L(\Lambda)}{\partial \Lambda^2} f(x;\theta)dx = E\left[-\frac{\partial^2 L(\Lambda)}{\partial \Lambda^2}\right].$$

The standard deviation σ can be acquired in combination with the Fisher information I(X) of ln (c). The corresponding Fisher information can be represented by the following equation wherein the symbol E[ ] denotes an expected value of a corresponding variable.

$$\frac{1}{\sigma^2} = I(\Lambda) = -\int \frac{\partial^2 L(\Lambda)}{\partial \Lambda^2} f(x;\theta)dx = E\left[-\frac{\partial^2 L(\Lambda)}{\partial \Lambda^2}\right]$$

In an embodiment, the standard deviation σ and the confidence interval of ln (c) are respectively:

$$\sigma = \frac{1}{\sqrt{c^2 \sum_{i=1}^{m}\left(\frac{n_i v_i^2}{(e^{-v_i c}-1)}\right)}};$$

$$CI = \ln(c) \pm Z\sigma.$$

According to the formula of $$\frac{\partial L(\Lambda)}{\partial \Lambda}$$

being zero, the following equation is to be solved.

$$\frac{\partial^2 L(\Lambda)}{\partial \Lambda^2} = e^\Lambda \sum_{i=1}^{m}\left(n_i v_i - \frac{(n_i - b_i)v_i}{1 - \theta_i^{e^\Lambda}}\right) - (e^\Lambda)^2 \sum_{i=1}^{m}\left(\frac{(n_i - b_i)v_i^2 \theta_i^{e^\Lambda}}{(1 - \theta_i^{e^\Lambda})^2}\right)$$

Substituting the formula $$\frac{\partial^2 L(\Lambda)}{\partial^2 \Lambda}$$

into the step 6, the following is acquired.

$$\frac{1}{\sigma^2} = -e^\Lambda \sum_{i=1}^{m}\left(n_i v_i - \frac{(n_i - E[b_i])v_i}{1 - \theta_i^{e^\Lambda}}\right) + (e^\Lambda)^2 \sum_{i=1}^{m}\left(\frac{(n_i - E[b_i])v_i^2 \theta_i^{e^\Lambda}}{(1 - \theta_i^{e^\Lambda})^2}\right)$$

Substituting the formula $$c = \frac{-\ln(b/n)}{v}$$

into the equation of step 8, the following can be acquired.

$$\frac{1}{\sigma^2} = -e^\Lambda \sum_{i=1}^{m}\left(n_i v_i - \frac{(n_i - E[b_i])v_i}{1 - \theta_i^{e^\Lambda}}\right) + (e^\Lambda)^2 \sum_{i=1}^{m}\left(\frac{(n_i - E[b_i])v_i^2 \theta_i^{e^\Lambda}}{(1 - \theta_i^{e^\Lambda})^2}\right)$$

$$= (e^\Lambda)^2 \sum_{i=1}^{m}\left(\frac{n_i v_i^2 \theta_i^{e^\Lambda}}{(1 - \theta_i^{e^\Lambda})}\right) = c^2 \sum_{i=1}^{m}\left(\frac{n_i v_i^2 e^{-v_i c}}{(1 - e^{-v_i c})}\right) = c^2 \sum_{i=1}^{m}\left(\frac{n_i v_i^2}{(e^{-v_i c}-1)}\right)$$

The standard deviation σ and confidence interval of ln (c) can be acquired according to the above equations:

$$\sigma = \frac{1}{\sqrt{c^2 \sum_{i=1}^{m}\left(\frac{n_i v_i^2}{(e^{-v_i c}-1)}\right)}};$$

$$CI = \ln(c) \pm Z\sigma;$$

wherein Z is the upper critical value of the standard normal distribution.

The concentration c of the nucleic acid amplification reaction liquid to be detected can be obtained from the acquired standard deviation σ and confidence interval of ln (c). A corresponding value can be obtained from the standard normal distribution table, thereby acquiring the confidence interval of ln (c), then acquiring the concentration c of the nucleic acid amplification reaction liquid to be detected, and further acquiring the initial DNA copy number contained in the nucleic acid amplification reaction liquid to be detected.

The confidence interval is an estimated interval of a population parameter constructed by the sample statistics. In statistics, a confidence interval (CI) of a probability sample is an interval estimation of a population parameter of this sample. The confidence interval shows the probability of a true value of the parameter falling around the measured result. The confidence interval indicates a reliability of a measured value of a measured parameter, i.e., the "probability" as mentioned above.

Generally, the quantitative result of the digital PCR is shown with the confidence interval in combination with the confidence level. It the digital PCR, the confidence interval shows the probability of a true concentration of the sample falling within a region around the measured result λ, and such probability is referred to as the confidence level. Two end points of the confidence interval are referred to as confidence limits.

Comparing with the single-volume digital PCR, the multi-volume digital PCR can achieve a dynamic detection range of 5 orders of magnitude by using less than 200 microdroplets, and its performance is comparable with the single-volume digital PCR having 12000 microdroplets, thereby saving the costs of the apparatus and the consumable materials. Moreover, the method can be used to correct the specific situation for the microdroplets having uniform volumes, so that the detection accuracy of the digital PCR detection apparatus 1 is increased.

The multi-volume digital PCR quantitative analysis method solves the problems of the false positive result and the false negative result. Hundreds of samples can be simultaneously detected by the high-throughput sequencing platform. Moreover, different kinds of fluorescence can be used to detect multiple sites, thereby increasing the detection speed and reducing the experimental cost. Through the microdropletization of the digital PCR detection apparatus, the fragment with a small amount to be detected is separated from the plentiful and complex background, the operating steps are significantly simplified, the preparation and detection times are effectively saved, the result is direct and reliable, the characteristic of stable implementation is achieved, and the sensitivity and the accuracy of the detection are increased and meet the requirements of precise quantification.

In practice, the multi-volume digital PCR quantitative analysis method can measure the DNA initial concentrations of the microdroplets in a high accuracy without depending on any standard curve. In the digital PCR detection apparatus 1, an actual size corresponding to each pixel of the fluorescence image can be indicated in the imaging system. The number of pixels corresponding to the diameter of the microdroplet is extracted from the fluorescence image, so that how many micrometers the diameter is can be known, thereby obtaining the diameter of the microdroplet accordingly.

The dynamic tracking of the microdroplets can be achieved by the digital PCR quantitative detection method, and the specific location of each microdroplet in the temperature cycling process of the microdroplets can be located, so that the whole process of the nucleic acid amplification can be monitored. Therefore, the problem of false positive results in the microdroplets can be solved by the digital PCR quantitative detection method. Moreover, a real absolute quantification can be achieved by processing the fluorescence curves of the microdroplets, and by statistically correcting without depending on the assumption of uniformity.

The dependency on the standard curve is avoided; the problem of uncertain quantitative result caused by the standard curve is solved; the restriction of the droplet-type digital PCR end-point detection method is removed; and the limitation of the parameter estimation for entire samples to be detected by using only one data of p(x=0) is eliminated. The real-time fluorescence quantification PCR detection method increases the accuracy of the digital PCR quantitative detection.

The digital PCR quantitative detection method achieves high repeatability and sensitivity based on a nonobjective mathematic model and has a relatively wide dynamic range, and can achieve the monitoring by utilizing a small number of droplets. A small amount of data can be used to cover more information. Moreover, the digital PCR quantitative detection method avoids the errors of the previous Poisson distribution probability model, achieves the absolute quantification, and is more direct. All data are combined to avoid the random error. By acquiring the fluorescence curves of the microdroplet samples and monitoring the variations of the fluorescence luminance of the microdroplet samples in real time, the false positive result can be avoided, the mutual influence between adjacent droplets can be eliminated, and more accurate data source is provided for the subsequent quantitative analysis model.

In an embodiment, the DNA to be detected is the human cytomegalovirus DNA.

The sample DNA to be detected as a template is added with corresponding primers and probe for the detection.

TaqMan® fluorescence probe is used in the real-time fluorescence quantification PCR detection method.

A detection kit for the quantification of the human cytomegalovirus nucleic acid is acquired. The detection kit includes the primers and the probe for the real-time fluorescence quantification detection of the human cytomegalovirus DNA.

A positive control with a concentration of $10^{\wedge}6$ copies/mL (non-standard concentration) in the kit is proportionally diluted to obtain the concentrations of $10^{\wedge}6$ copies/mL, $10^{\wedge}5$ copies/mL, $10^{\wedge}4$ copies/mL, and $0.5 \times 10^{\wedge}4$ copies/mL. Moreover, 5 sample concentrations are prepared, respectively being $2 \times 10^{\wedge}6$ copies/mL, $10^{\wedge}6$ copies/mL, $10^{\wedge}5$ copies/mL, $10^{\wedge}4$ copies/mL, and $0.5 \times 10^{\wedge}4$ copies/mL. The proportions of reagents in the sample to be detected are as follows: 1 µL sample (for $2 \times 10^{\wedge}6$ copies/mL, 2 µL sample is added), 1 µL DNA polymerase, and 20 µL buffer, 22 µL in total.

The samples respectively having the sample concentrations of $2 \times 10^{\wedge}6$ copies/mL, $10^{\wedge}6$ copies/mL, $10^{\wedge}5$ copies/mL, $10^{\wedge}4$ copies/mL, and $0.5 \times 10^{\wedge}4$ copies/mL are respectively detected by the digital PCR detection apparatus provided in the present application, a QX200 digital PCR detection apparatus, and a qPCR digital PCR detection apparatus. A table comparing association coefficients between the true values and the measured values of the initial copy numbers of the five nucleic acid amplification reaction liquids obtained via the apparatuses is shown as table 1.

Table comparing association coefficients between the true values and the measured values of the initial copy numbers of the five nucleic acid amplification reaction liquids

| Apparatus type | Present apparatus | QX200 digitial PCR | qPCR digitial PCR |
|---|---|---|---|
| $R^2$ | 0.9993 | 0.998 | 0.9923 |

The association coefficient R is a statistical index reflecting the degree of the association between variables and can be used to evaluate the linear relationship between two variables. It can be seen form table 1 that the association coefficient between the true values and the measured values of the initial copy numbers of the five nucleic acid amplification reaction liquids detected by the digital PCR detection apparatus provided in the present application is the largest and closest to 1. Thus, the digital PCR detection apparatus 1 provided in the present application has higher detection accuracy and precision.

The digital PCR detection apparatus 1 integrates the microdroplet generating device 10, the temperature controlling device 20, the fluorescence signal detecting device 30, and the quantitative analysis device 40. The controller 50 allows the operator to implement automatic operations via the integrated digital PCR detection apparatus 1, so that not only the working efficiency is increased, but also the advantages of rapid reaction, good repeatability, high sensitivity, excellent specificity, and clear result are achieved. An embodiment of a digital PCR detection method which is simple and has high efficiency is provided to solve the problems of heavy workload and low time efficiency of the conventional digital PCR detection method.

Figure 19:
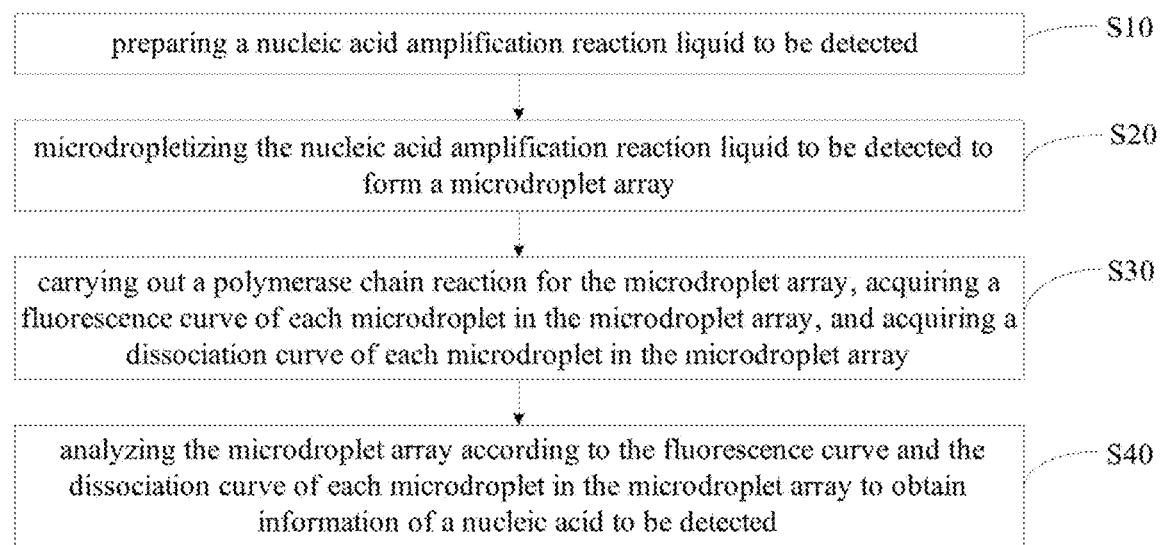
FIG. 19 is an overall flowchart of a digital PCR detection method provided in the present application.

Referring to FIG. 19, a digital PCR detection method is provided in the present application, which includes:
S10, preparing a nucleic acid amplification reaction liquid to be detected;
S20, microdropletizing the nucleic acid amplification reaction liquid to be detected to form a microdroplet array;
S30, carrying out a polymerase chain reaction for the microdroplet array, acquiring a fluorescence curve of each microdroplet in the microdroplet array, and acquiring a dissociation curve of each microdroplet in the microdroplet array; and
S40, analyzing the microdroplet array according to the fluorescence curve and the dissociation curve of each microdroplet in the microdroplet array to obtain information of a nucleic acid to be detected.

In the preparation of the nucleic acid amplification reaction liquid to be detected, a saturating fluorescent dye can be used to classify different types of variations, having high resolution and sensitivity and decreasing the detection cost of the digital PCR detection apparatus. Moreover, the digital PCR detection method allows both the polymerase chain reaction (PCR) of the microdroplet array and the dissociation curve analysis of the PCR products after the PCR amplification of the microdroplet array to be performed by the highly integrated digital PCR detection apparatus. The fluorescence curve of each microdroplet is acquired during the polymerase chain reaction of the microdroplet array. After the PCR amplification of the microdroplet array, the high-low temperature cycling is further performed once again to acquire the dissociation curve of each microdroplet in this cycle. Both the fluorescence curves and the dissociation curves of the microdroplet array can be obtained via the digital PCR detection method, so that the dissociation curve analysis of the PCR products can uninterruptedly follow the real-time monitoring of the entire PCR amplification process. The qualitative and quantitative analyses of the microdroplet array can be achieved according to the fluorescence curves and the dissociation curves of the microdroplet array. Therefore, the digital PCR detection can be performed comprehensively, conveniently, and effectively.

In an embodiment, the nucleic acid amplification reaction liquid of the step S10 includes a nucleic acid template to be detected, a reaction buffer solution, deoxyribonucleoside triphosphate, primers, a polymerase, a product marker, and so on. The thermostable DNA polymerase can be selected from FastStart Taq DNA polymerase, $E_x$ Taq, Z-Taq, AccuPrime Taq DNA polymerase, HS Taq DNA polymerase, and so on.

The nucleic acid amplification reaction liquid can be a nucleic acid amplification reaction liquid (also referred to as DNA amplification reaction liquid) with desoxyribonucleic acid (DNA) as the template, a reverse transcription nucleic acid amplification reaction liquid (also referred to as RNA reverse transcription reaction liquid) with complementary DNA (cDNA) or ribonucleic acid (RNA) as the template, or any other nucleic acid amplification reaction liquid such as a loop-mediated isothermal amplification (LAMP) reaction liquid. The characteristic of the DNA amplification reaction liquid is that the reaction liquid includes dNTP, a buffer solution, inorganic salt ions, a polymerase, primers, a DNA template to be detected, a dye, and any other component which are necessary for the DNA amplification. The dye in the reaction liquid can indicate the nucleic acid amplification, and can be a fluorescent dye, such as SYBR® Green, that is capable of binding to the DNA.

In an embodiment, a set of reagent(s) and solution(s) specifically for the digital PCR is prepared to reduce or avoid a potential contamination to the template DNA sample caused by an exogenous DNA. All of the apparatus and consumable materials should be sterilized at high temperature and dried at high temperature.

In an embodiment, in the preparation of the nucleic acid amplification reaction liquid to be detected, the SYBR® Green fluorescent dye is adopted to label the nucleic acid amplification reaction liquid. The SYBR® Green fluorescent dye is appropriate for the detections of various products as it is capable of binding with a double-stranded DNA, nonspecific with a template, and cost effective. For the dissociation curve analysis, the SYBR® Green is generally used as the fluorescent dye, because it is a non-specific dye and can bind to the double-stranded DNA as long as the amplification occurs, thereby significantly enhancing the fluorescence intensity. The dissociation curve is plotted to show the variation of the fluorescence intensity with the temperature. From the dissociation curve, whether the fragment emitting the fluorescence signal in the amplification is the target gene to be detected in the digital PCR detection can be decided. If the obtained dissociation curve has only a single narrow peak whose location corresponds to the anneal temperature, then the product is the specific product of the PCR amplification. If the peak is wide or the location of the peak is incorrect, then the product may be non-specific or there may be no corresponding product. If a minor peak is existed before the peak in the dissociation curve, the minor peak may correspond to a primer dimer, indicating that the primers may need to be re-designed. If the high resolution dissociation curve has a slight variation in the temperature or in the curve shape, then it is suggested that the single nucleotide may have a change. The type of the nucleotide sequence can be automatically identified via the large quantity of repeated analysis on the dissociation curves of the microdroplet array and the dense curve analyzing and matching processes.

Figure 20:
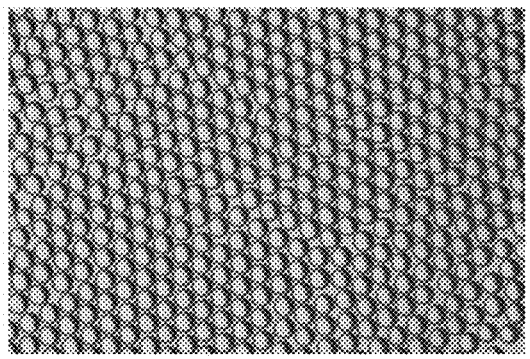
FIG. 20 is a graph showing a microdroplet array obtained in the digital PCR detection method provided in the present application.

Referring to FIG. 20, in an embodiment, in the step S20, the nucleic acid amplification reaction liquid to be detected is formed into the microdroplet array which includes a large number of microdroplets.

In an embodiment, the digital PCR detection apparatus 1 includes a microdroplet generating device 10, a temperature controlling device 20, a fluorescence signal detecting device 30, a quantitative analysis device 40, and a controller 50.

The microdroplet generating device 10 is configured to microdropletize the nucleic acid amplification reaction liquid into the microdroplet array. By forming the microdroplet array in a microdroplet container, multiple target sequences can be simultaneously detected. The temperature controlling device 20 is configured to perform a temperature cycling to achieve a nucleic acid amplification. The fluorescence signal detecting device 30 is disposed opposite to the temperature controlling device 20 to collect signals of the microdroplet array subjected to the nucleic acid amplification. The quantitative analysis device 40 communicates with the fluorescence signal detecting device 30 via a data cable to transmit fluorescence information of the microdroplet array, so as to perform a quantitative analysis. The controller 50 is respectively connected to the microdroplet generating device 10, the temperature controlling device 20, the fluorescence signal detecting device 30, and the quantitative analysis device 40 to control the microdroplet generating device 10, the temperature controlling device 20, the fluorescence signal detecting device 30, and the quantitative analysis device 40.

In operation of the digital PCR detection apparatus, the microdroplet generating device 10 can form the nucleic acid amplification reaction liquid to be detected into the microdroplet array including a large number of microdroplets. The temperature controlling device 20 can amplify nucleic acids in the microdroplet array. The fluorescence signal detecting device 30 takes images in real time, the images showing variations in fluorescence of the microdroplet array. The nucleic acid amplification reactions for the microdroplet array are carried out in the temperature controlling device 20; and the signals, such as the fluorescence signals, ultraviolet absorption signals, turbidity signals, and so on, of products in the microdroplet array after the nucleic acid amplification reactions are collected by the fluorescence signal detecting device 30. A number of droplets in which an amplification of the target sequence is achieved can be analyzed by using a composition difference between the amplified and non-amplified microdroplets, so that the qualitative and quantitative analysis of the nucleic acid molecules can be finally achieved. The detection result, obtained by monitoring the variation of the signals of the microdroplet array in real time, is direct, so that the problems of false positive results and false negative results in microdroplet array can be solved.

The microdroplet array is generated in the microdroplet container via the microdroplet generating device 10, settled onto a bottom plate of the microdroplet container, and disorderly stack together. During the downward settlement process, the microdroplet array generated by the microdroplet generating device 10 are aggregated at a central portion of the microdroplet container and gathered together. In this case, it is necessary to spread the microdroplets in the array onto the bottom plate of the microdroplet container before collecting the signals of the microdroplet array.

In an embodiment, a high-low temperature cycling is performed on the microdroplet array via the temperature controlling device 20 to spread the microdroplets in the array on the bottom plate of the microdroplet container before collecting the signals of the microdroplets in the array. The temperature of the microdroplet array is firstly increased and then decreased, and such temperature increasing and decreasing steps for the microdroplet array are cycled until the array of microdroplets are spread on the bottom plate of the microdroplet container. Finally, the array of microdroplets are spread in the microdroplet container, and the spread microdroplet array is subjected to the PCR amplification and the photographical detection.

In an embodiment, a plurality of microdroplets with a uniform volume can be generated via the microdroplet generating device 10. Each microdroplet has a size at the micrometer scale. The quantitative analysis is performed for the plurality of microdroplets according to their fluorescence information on the condition that the microdroplets have the uniform volume.

In an embodiment, the step S30 includes:
S310, setting temperature parameters, time parameters, and a number of cycles for the polymerase chain reaction;
S320, carrying out the polymerase chain reaction according to the temperature parameters and the time parameters to complete the number of cycles, and acquiring the fluorescence curve of each microdroplet in the cycles; and
S330, decreasing the temperature of the microdroplet array undergone the amplification amplified via the polymerase chain reaction, and then increasing the temperature with specific temperature intervals to acquire the dissociation curve of each microdroplet.

The PCR includes three basic reaction steps, i.e., the denaturation, annealing (renaturation), and extension. The denaturation of a template DNA is that after the template DNA is heated to 90° C. to 95° C. for a time period, double strands of the template DNA or the double-stranded DNA formed in the PCR amplification are dissociated to form single strands, which are capable of binding with the primers for the subsequent reaction. The annealing (renaturation) between the template DNA and the primers is that after the single strands are formed from the template DNA, the temperature is decreased to 50° C. to 60° C., at which the primers match and bind with complementary sequences of the single strands of the template DNA. In the extension of the primers, new semiconservative replication strands complementary with the template DNA are synthesized from the combination of the DNA template and the primers. The extension is at 70° C. to 75° C., under the action of the polymerase, using dNTP as a reactive material and the target sequence as the template. The extension is in accordance with principles of base pairing and semiconservative replication. The three processes, i.e., the denaturation, the annealing, and the extension, are cyclically repeated to obtain more "semiconservative replication strands", and such new strands are used as the templates for the next cycling process. It takes 2 min to 4 min to finish one cycle; therefore, the number of the target gene can be amplified millions of times within 2 hours to 3 hours.

The annealing temperature is a relatively important factor affecting the specificity of the PCR. By rapidly decreasing the temperature to 40° C. to 60° C. after the denaturation, the primer can be bound to the template. Since the template DNA is much more complicated than the primer, the probability of the collision and the binding between the primer and the template is far higher than that between the complementary strands of the template DNA. The temperature and the time of the annealing depend on a length of the primer, a composition and a concentration of bases, and a length of the target sequence.

In the step S310, the PCR is performed for the microdroplet array by cyclically repeating the denaturation, the annealing, and the extension steps for about 30 times to about 50 times in the presences of the primers, the DNA sample to be detected, and the thermostable DNA polymerase. The cycle number is generally set for the three processes, i.e., the denaturation, the anneal, and the extension, to be cycled for 30 times to 50 times. The temperature parameters are generally set within 40° C. to 95° C. The time parameters are determined according to each specific step.

In an embodiment, the step S320 includes:
S321, carrying out the polymerase chain reaction for the microdroplet array according to the temperature parameters and the time parameters to acquire a fluorescence image of the microdroplet array;
S322, orderly cycling according to the number of cycles, acquiring all fluorescence images of the microdroplet array in the polymerase chain reaction;
S323, acquiring the fluorescence information of every microdroplet in every cycle from all of the fluorescence images of the microdroplet array; and
S324, acquiring the fluorescence curve of every microdroplet according to the fluorescence information of every microdroplet in every cycle thereby acquiring the fluorescence curves of the microdroplet array.

In the step S321, the step S321 includes:
firstly, heating the microdroplet array to 95° C. and then keep heating for 4 min to thermally activate enzymes in the microdroplet array and denature the microdroplet array for 1 min after the enzymes in the microdroplet array are thermally activated;
secondly, decreasing the temperature of the microdroplet array to 55° C. after the denaturation, allowing the primers to bind with the DNA template to form a partial double-stranded structure, annealing (renaturing) for 1 min, while photographing the microdroplet array via the fluorescence signal detecting device 30 to acquire the fluorescence image of the microdroplet array in the first cycle;
thirdly, increasing the temperature of the microdroplet array to 70° C. to extend the strands for 7 min;
finally, cycling the above-mentioned three steps, i.e., the denaturation, the annealing (renaturation), and the extension, for 45 times, then decreasing the temperature to 4° C. to preserve the microdroplets.

In an embodiment, the temperature of the microdroplet array is increased and decreased via the temperature controlling device 20. The number of cycles is 45. Therefore, 45 fluorescence images can be obtained for each microdroplet through the 45 cycles. Each microdroplet undergoes 45 cycles and 45 fluorescence images are acquired. By locating each microdroplet in the 45 fluorescence images and acquiring 45 fluorescence intensity values of the each microdroplet, the fluorescence curve of the each microdroplet can be obtained.

In an embodiment, in the step S323, firstly, the fluorescence intensity values of each microdroplet undergone the PCR amplification are obtained according to every fluorescence image; secondly, the fluorescence curve of the each microdroplet undergone the PCR amplification is acquired according to the fluorescence intensity values of the each microdroplet undergone the PCR amplification; finally, the fluorescence curves of all microdroplets undergone the PCR amplification, i.e., the fluorescence curves of the microdroplet array, are acquired according to the fluorescence curve of every microdroplet undergone the PCR amplification.

Figure 21:
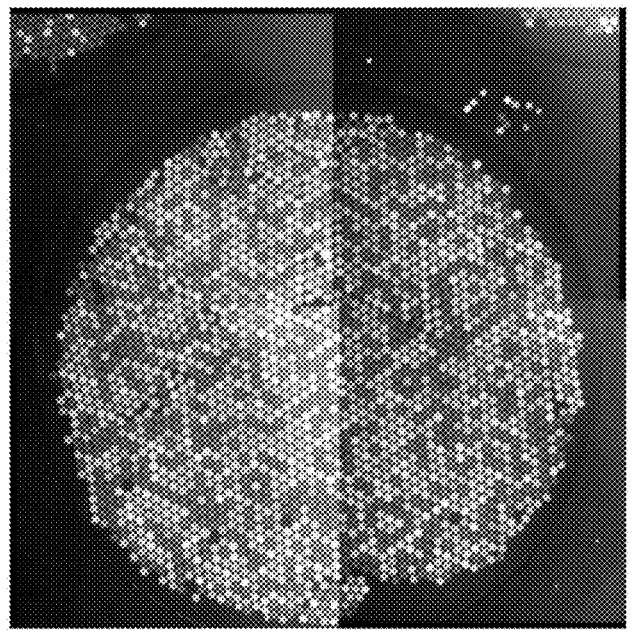
FIG. 21 is a fluorescence image of the microdroplet array obtained in the digital PCR detection method provided in the present application.

Referring to FIG. 21, in an embodiment, the fluorescence images of the microdroplet array are collected, and an image tracking is performed. When acquiring the fluorescence curves of the microdroplet array, the locations of the microdroplets in each image are respectively located, and the fluorescence intensity of each microdroplet is acquired. In the digital PCR detection apparatus, an actual size corresponding to each pixel of the fluorescence image can be indicated in the imaging system. The number of pixels corresponding to the diameter of the microdroplet is extracted from the fluorescence image, so that how many micrometers the diameter is can be known, thereby obtaining the diameter of the microdroplet accordingly.

In an embodiment, when tracking each microdroplet, the NCAST image differential and clustering algorithm can be used to identify the location of the each microdroplet in the image acquired in each temperature cycle, so that the fluorescence intensities of the microdroplet array can be acquired.

In an embodiment, when a moving distance of the microdroplet caused by one temperature cycle is smaller than or equal to the diameter of the microdroplet, the following method is used to track the microdroplet. When tracking each microdroplet, the step of the image tracking for the each microdroplet includes:
 firstly, identifying and acquiring a location of a center of each microdroplet from the image taken in each temperature cycle;
 secondly, comparing the location of the center of each microdroplet currently identified with the location of the center of each microdroplet in the previous temperature cycle; and
 thirdly, if a distance between the location of the center of one microdroplet currently identified and the location of the center of one microdroplet in the previous temperature cycle is smaller than the diameter of the microdroplet, then indicating the two microdroplets as the same microdroplet.

Figure 22:
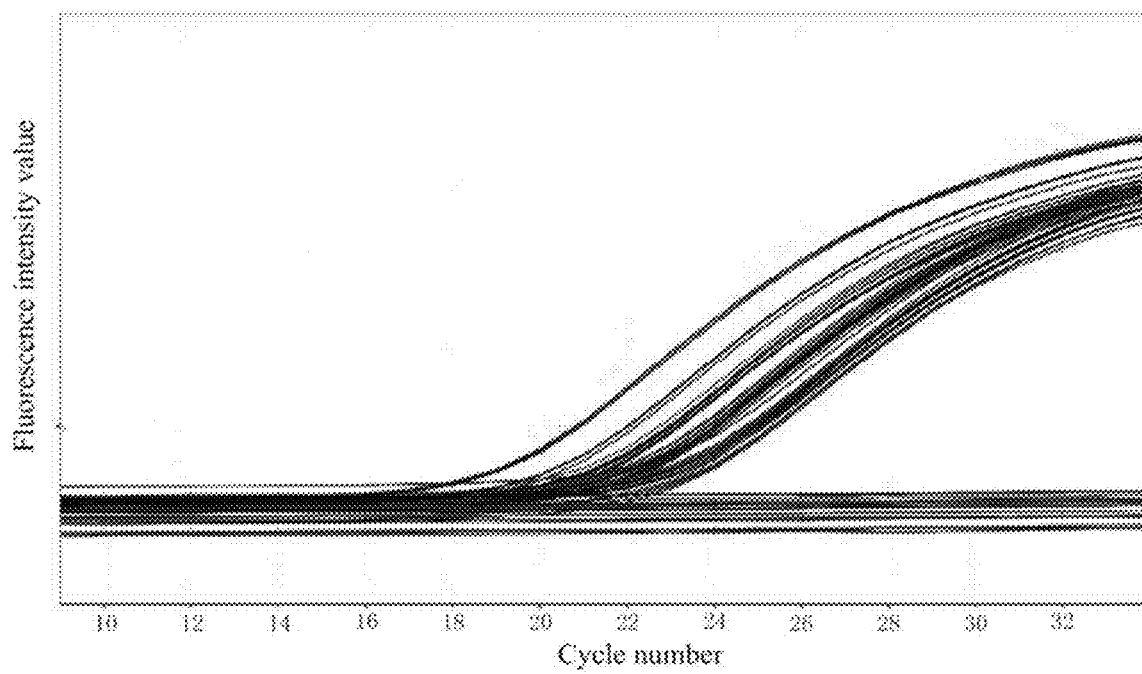
FIG. 22 is a graph showing real-time fluorescence curves obtained in the digital PCR detection method provided in the present application.

Referring to FIG. 22, in an embodiment, the fluorescence curve of each microdroplet is acquired according to the fluorescence intensity values of the each microdroplet in the temperature cycling. The fluorescence intensity of one microdroplet at a specific time point is achieved by summing the fluorescence intensity values of all portions of this microdroplet in each temperature cycle.

In an embodiment, the fluorescence intensity of each microdroplet at a specific time point is achieved by the portion-summing to avoid the interaction at border portions of adjacent microdroplets. The variations of the microdroplet array in all cycles and the fluorescence curve of each microdroplet can be obtained according to the fluorescence intensity values of the microdroplet array in each temperature cycle.

In an embodiment, the step S330 includes:
 S331, reducing the temperature of the microdroplet array amplified via the polymerase chain reaction to below 40° C.;
 S332, increasing the temperature of the microdroplet array whose temperature has been decreased to below 40° C. with the specific temperature intervals, and acquiring the fluorescence images of the microdroplet array corresponding to the temperature intervals;
 S333, acquiring the fluorescence information of each microdroplet corresponding to the temperature intervals from the fluorescence images of the microdroplet array corresponding to the temperature intervals; and
 S334, acquiring the dissociation curve of each microdroplet according to the fluorescence information of each microdroplet corresponding to the temperature intervals, thereby acquiring the dissociation curves of the microdroplet array.

After the PCR amplification reaction is finished, the temperature is increased stage by stage while monitoring the fluorescence signals in each stage to form the dissociation curves. Different types of DNA have different temperature dissociation curves. With the denaturation of the double-stranded DNA, the fluorescent dye is returned back to the free state, which weakens the fluorescence signal. The curve of the fluorescence signal varying with the temperature is plotted. For the method in which the amplification product is dyed, it needs to plot the dissociation curve, because the dye has a poor specificity. The dissociation curve is used to verify whether the amplification product is the target product. There is a characteristic peak at the dissociation temperature. This characteristic peak can be used to distinguish the specific product from the other products, such as a dimer of the primer or a non-specific product.

In the step S332, by performing the dissociation curve analysis for the PCR product after the PCR amplification, the dissociation curve analysis of the PCR product can uninterruptedly follow the PCR amplification. In the step S332, the temperature controlling device 20 is used to decrease the temperature to below 40° C. and then increase the temperature to 95° C. gradually with a temperature interval of 0.1° C. The fluorescence signal detecting device 30 takes the image once every 0.1° C. until the temperature is increased to 95° C. Then, the temperature of the microdroplet array is decreased to 4° C. after the image taking, and the microdroplet array is preserved.

In an embodiment, a method for processing the fluorescence image in the acquisition of the dissociation curve of each microdroplet is the same as the method for processing the fluorescence image in the acquisition of the fluorescence curve of each microdroplet In the step S333, the fluorescence intensity values corresponding to each microdroplet are acquired according to the fluorescence images taken with the interval of 0.1° C. A curve relating the temperature and the fluorescence intensity is plotted. The curve is converted through a first order differentiating to obtain graph showing a peak.

The dissociation curve refers to a curve showing a dissociation degree of the double helix structure of the DNA, and the dissociation degree increases with the temperature. The dissociation curve can be used to identify different reaction products such as the non-specific product. The temperature at which half of the DNA double helix structures are dissociated is referred to as the dissociation temperature (Tm). Different DNA sequences have different Tm values. That is to say, the dissociation curve of one type of DNA can be regarded as a fingerprint corresponding to this specific type of DNA. According to the graph showing the dissociation curve, the temperature corresponding to the peak of the curve is the Tm value of the double-stranded DNA molecule, whose genotype can be known according to the Tm value of the amplification product. The value of Tm of a DNA fragment depends on its length, G+C composition, sequence, complementarity of stands, concentration, and buffer components, such as salt, dye, and PCR enhancer.

A specific dissociation curve reflects the purity of the product in a specific microdroplet. If one dissociation curve has a single peak and the single peak is within a rational temperature range (generally from 80° C. to 90° C.), then it is considered normal. If the dissociation curve has double peaks, then a non-specific amplification may have been occurred. Whether the product is the target gene and the purity of the product can be assessed thereby.

The single-nucleotide polymorphism and the scanning mutagenesis can be examined by analyzing every high resolution dissociation curve of the microdroplet array.

In an embodiment, in the digital PCR detection process, the images of the microdroplet array are taken by the fluorescence signal detecting device 30.

The microdroplet container is irradiated at the oblique angle from the above of the microdroplet container. The fluorescence signal detecting device 30 is used to periodically and two-dimensionally scan the microdroplet array and to take the images in real-time. The microdroplet array in the microdroplet container are excited to generate fluorescence which is collected by an objective lens of the fluorescence signal detecting device 30, and entered into a camera. The camera produces the fluorescence image of the microdroplet array.

The fluorescence imaging for the microdroplet array can be achieved by the fluorescence signal detecting device 30. A number of fluorescence images showing the microdroplets can be photographed at one time. An image processing technique can be used to automatically identify the fluorescence of the microdroplets from the images to obtain the fluorescence information of the microdroplets.

The fluorescence information of the microdroplet array containing the fluorescent substances is collected by the fluorescence detection assembly of the fluorescence signal detecting device. The detected fluorescence information is transmitted to a computer in the form of the fluorescence image to have a quantitative analysis.

In an embodiment, the step S40 includes:
S410, acquiring an initial nucleic acid copy number of the microdroplet array according to the fluorescence curves of the microdroplet array; and
S420, acquiring nucleic acid information of the microdroplet array according to the dissociation curves of the microdroplet array.

In an embodiment, the step S410 includes:
S411, acquiring a Ct value corresponding to the fluorescence curve of each microdroplet according to the fluorescence curves of the microdroplet array;
S412, clustering the microdroplets based on the Ct value of the fluorescence curve of the each microdroplet to obtain clusters $x_1, x_2, \ldots, x_n$ ranked in an order from large to small of the Ct value;
S413, acquiring a microdroplet number $y_1, y_2, \ldots, y_n$ in each of the clusters $x_1, x_2, \ldots, x_n$;
S414, acquiring a frequency distribution which is microdroplet numbers $y_1, y_2, \ldots, y_n$ of the clusters $x_1, x_2, \ldots, x_n$ according to the microdroplet number $y_1, y_2, \ldots, y_n$ of each cluster; and
S415, calculating the initial nucleic acid copy number of the microdroplet array according to the frequency distribution.

In the step S411, once the cycle number of the PCR cycling reaches the Ct value, a real exponential amplification phase (i.e., the logarithmic phase) has just begun. At this time, any slight error has not been amplified, so that the Ct value has an excellent reproducibility. That is, for the same DNA template, the Ct values obtained in the amplifications performed at different times or the Ct values obtained in different microdroplet containers at the same time are the same. If the fluorescence curve corresponding to one microdroplet is an amplification curve, it can be determined that this microdroplet contains the target gene component. If the fluorescence curve corresponding to one microdroplet is a straight line, it can be determined that this microdroplet contains no target gene component.

The Ct value can be obtained from the acquired real-time fluorescence curve. The Ct value of each microdroplet can be obtained by calculating derivatives along the fluorescence curve. The cycle number at an initial point of a fluorescence curve section having a constant slope is the Ct value.

In an embodiment, in the step S411, firstly, the derivatives of the fluorescence curve of each microdroplet undergone the PCR amplification are calculated to acquire slopes of the fluorescence curve of the each microdroplet undergone the PCR amplification. Secondly, a constant slope value is acquired from the slopes of the fluorescence curve of the each microdroplet undergone the PCR amplification according to the slopes of the fluorescence curve of the each microdroplet undergone the PCR amplification. Thirdly, an initial cycle number corresponding to the constant slope value is acquired. The initial cycle number is the Ct value of the each microdroplet undergone the PCR amplification. Finally, Ct values of all microdroplets undergone the PCR amplification are acquired according to the Ct value of every microdroplet undergone the PCR amplification.

In an embodiment, in the step S411, firstly, a default value of a fluorescence threshold of each microdroplet undergone the PCR amplification is determined according to the fluorescence curve of each microdroplet undergone the PCR amplification. Secondly, a cycle number corresponding to the default value of the fluorescence threshold of the each microdroplet undergone the PCR amplification is acquired. The cycle number is the Ct value of the each microdroplet undergone the PCR amplification. Thirdly, Ct values of all microdroplets undergone the PCR amplification are acquired according to the Ct value of every microdroplet undergone the PCR amplification.

C in the Ct value denotes the term "cycle", t in the Ct value denotes the term "threshold". The Ct value refers to the cycle number in each reactor when the fluorescence signal in the reactor reaches a preset threshold.

In an embodiment, the fluorescence signals of the first 15 cycles of the PCR reaction are used as a fluorescence baseline signal. The default value of the fluorescence threshold is set as 10 times of a standard deviation (SD) of the fluorescence signals of the 3rd to 15th cycle, i.e., threshold=$10 \times SD_{cycle\ 3\text{-}15}$. The corresponding cycle number, which is the Ct value, is acquired according to the default threshold of the fluorescence threshold. The relationship between the Ct value and the initial concentration of DNA is that the larger the initial copy number, the smaller the Ct value.

In the step 412, the microdroplets are clustered according to the Ct value of the fluorescence curve of each microdroplet, the clusters being ranked in the order from large to small of the Ct value are the clusters $x_1, x_2, \ldots, x_n$. The dark microdroplets in the microdroplet array correspond to the cluster $x_1$; in other words, the microdroplets with the initial nucleic acid copy number of zero in the microdroplet array are clustered into the cluster $x_1$. Since the larger the initial nucleic acid copy number, the smaller the Ct value, the Ct value corresponding to the dark (negative) microdroplets is infinitely great, i.e., the Ct value corresponding to the cluster $x_1$ is infinitely great. Similarly, the initial nucleic acid copy number corresponds to the cluster $x_2$ is 1; the initial nucleic acid copy number corresponds to the cluster $x_3$ is 2; the initial nucleic acid copy number corresponds to the cluster $x_4$ is 3; the initial nucleic acid copy number corresponds to the cluster $x_5$ is 4, and so on.

In an embodiment, in the step S415, when the number $y_1$ of the microdroplets in the cluster $x_1$ is larger than or equal to a characteristic value m, a Poisson distribution is fitted according to the frequency distribution, and a parameter $\lambda$ of the Poisson distribution is acquired, thereby obtaining the initial nucleic acid copy number of the microdroplet array.

The characteristic value m is in a range from 0.5% to 10% of a total number of the microdroplets in the microdrop array.

In an embodiment, the characteristic value m is 0.5% of the total number of the microdroplets.

When the number $y_1$ of the microdroplets in the cluster $x_1$ is larger than or equal to the characteristic value m, (i.e., when the number $y_1$ of the dark microdroplets in the microdroplet array is larger than or equal to the characteristic value m,) the number of the dark microdroplets in the microdroplet array has a certain effect on the calculation of the overall initial nucleic acid copy number of the microdroplet array. So the frequency distribution of the microdroplet number $y_1, y_2, \ldots, y_n$ is fitted to a Poisson distribution to acquire the parameter $\lambda$ of the corresponding Poisson distribution.

Assuming that the initial DNA copy number in the microdroplet in the digital PCR is x, according to mathematic statistics theories, the probability distribution function P of $x=k$ ($k=0, 1, 2, 3$) is in accordance with the Poisson probability model, wherein $\lambda$ is a mean molecule copy number in the microdroplet.

$$p(x=k) = \frac{\lambda^k}{k!} e^{-\lambda}$$

Therefore, for an expected value $\mu$ and a variance $\sigma^2$, according to the Poisson distribution model, the expected value $\mu$ is $\lambda$ and the variance $\sigma^2$ is $\lambda$. Therefore, the number of copies of the target DNA molecule in each microdroplet in the digital PCR is $\lambda$, and thus an quantitative detection of the nucleic acid can be achieved via the calculated $\lambda$.

For the droplet-type PCR, the initial copy number in a single droplet satisfies the Poisson distribution:

$$P(x=k) = \frac{\lambda^k}{k!} e^{-\lambda};$$

wherein $\lambda$ is a mean of the initial DNA copy numbers contained in the microdroplets. The mean of the initial copy numbers contained in the microdroplets is denoted by copies per droplet (CPD).

Therefore, the initial nucleic acid copy number of the microdroplet array is equal to $\lambda$ multiplied by the number of the microdroplets in the microdroplet array.

Assuming that a total volume of the nucleic acid amplification reaction liquid to be detected is V (a volume of each microdroplet is v), a concentration c (copy/μL) of the nucleic acid amplification reaction liquid to be detected is:

$$c = \frac{n\lambda}{V} = \frac{\lambda}{V/n} = \frac{\lambda}{v}.$$

Thus, the quantitative detection of DNA can be achieved via the calculated $\lambda$.

In an embodiment, when the number $y_1$ of the microdroplets in the cluster $x_1$ is smaller than the characteristic value m, the step S415 includes:

S4151, giving values of the initial nucleic acid copy numbers corresponding to the cluster $x_2$ in sequence according to a part of the frequency distribution which is the microdroplet numbers $y_2, \ldots, y_n$ of the clusters $x_2, \ldots, x_n$, fitting Poisson distributions, and acquiring a parameter $\lambda_j$ (j=0, 1, 2 . . . ) corresponding to each Poisson distribution;

S4152, searching $\lambda_j$ in an interval $[\lambda_{min}, \lambda_{max}]$ to minimize a sum of squared errors (err) of the frequencies to acquire an optimal $\lambda$ ($\lambda_{optimal}$);

S4153, calculating the initial nucleic acid copy number of the microdroplet array according to the optimal $\lambda$ ($\lambda_{optimal}$).

When the number $y_1$ of the microdroplets in the cluster $x_1$ is smaller than the characteristic value m, the number of the dark microdroplets in the microdroplet array has no effect on the calculation of the overall initial nucleic acid copy number of the microdroplet array and can be ignored.

For a system having 20,000 microdroplets, it is generally suggested that the concentration of the sample DNA is not more than 6 CPD. In a practical experiment, when k>4, the difference in the Ct values becomes small, so it is difficult to determine whether the initial copy number of one microdroplet is 4 or 5 according to the Ct value. Therefore, the Poisson distribution can be fitted by using incomplete samples, i.e, the clusters $x_2, \ldots, x_n$.

In an embodiment, the interval $[\lambda_{min}, \lambda_{max}]$ is given, the searching is performed in the interval $[\lambda_{min}, \lambda_{max}]$, the sum of squared errors (err) is calculated, and the optimal $\lambda$ ($\lambda_{optimal}$) is selected to minimize the sum of squared errors.

In an embodiment, the parameter $\lambda$ is estimated by using a maximum likelihood estimation method to obtain the parameter $\lambda$ of the Possion distribution.

In an embodiment, the estimation method of the parameter $\lambda$ can be the method of moments, the order statistics estimation, or the maximum likelihood estimation.

By using the present method, there is no need to provide the number of the negative or dark microdroplets, and the accuracy and the stability are much higher than that obtained from the estimation by using only one frequency point.

In the step S4153, the initial nucleic acid copy number of the microdroplet array is the optimal $\lambda$ ($\lambda_{optimal}$) multiplied by the number of the microdroplets in the microdroplet array.

In an embodiment, a point estimation is performed to estimate the parameter $\lambda$ of the Poisson distribution by using a least-squares method according to the incomplete samples.

In practice, the digital PCR quantitative detection method can measure the initial nucleic acid copy number of the microdroplet array in a high accuracy without depending on any standard curve.

Moreover, the problem of false positive results in the microdroplet array can be solved via the real-time fluorescence curve. A real absolute quantification can be achieved by processing the fluorescence curves of the microdroplet array, and by statistically correcting without depending on the assumption of uniformity.

By using the digital PCR quantitative detection method, the dependency on a standard fluorescence curve is avoided, the problem of uncertain quantitative result caused by the standard fluorescence curve is solved, the restriction of the droplet-type digital PCR end-point detection method is removed, and the limitation of the parameter estimation for entire samples to be detected by using only one data of p(x=0) is eliminated. The digital PCR quantitative detection method has an increased accuracy.

By using the digital PCR quantitative detection method, there is no need to provide the number of the negative or empty microdroplets. Moreover, the accuracy and the stability of the optimal parameter estimation using multidimensional frequency distribution data is much higher than the accuracy and the stability of the estimation using only one data of p(x=0).

Each fluorescence curve represents a varying process of useful information incorporating microdroplet sample information, so that the real-time monitoring can be achieved; and the algorithm can be set to eliminate the mutual influence between adjacent droplets.

The digital PCR detection method achieves high repeatability and sensitivity based on a nonobjective mathematic model and has a relatively wide dynamic range, and can achieve the monitoring by utilizing a small number of droplets. A small amount of data can be used to cover more information. Moreover, the digital PCR quantitative detection method avoids the errors of the previous Poisson distribution probability model, achieves the absolute quantification, and is more direct. In addition, all data can be combined via the digital PCR quantitative detection method, thereby avoiding the random error. By acquiring the fluorescence curves of the microdroplet samples and monitoring the variations of the fluorescence luminance of the microdroplet samples in real time, the false positive result can be avoided, the mutual influence between adjacent droplets can be eliminated, and more accurate data source is provided for the subsequent quantitative analysis model.

Figure 23:
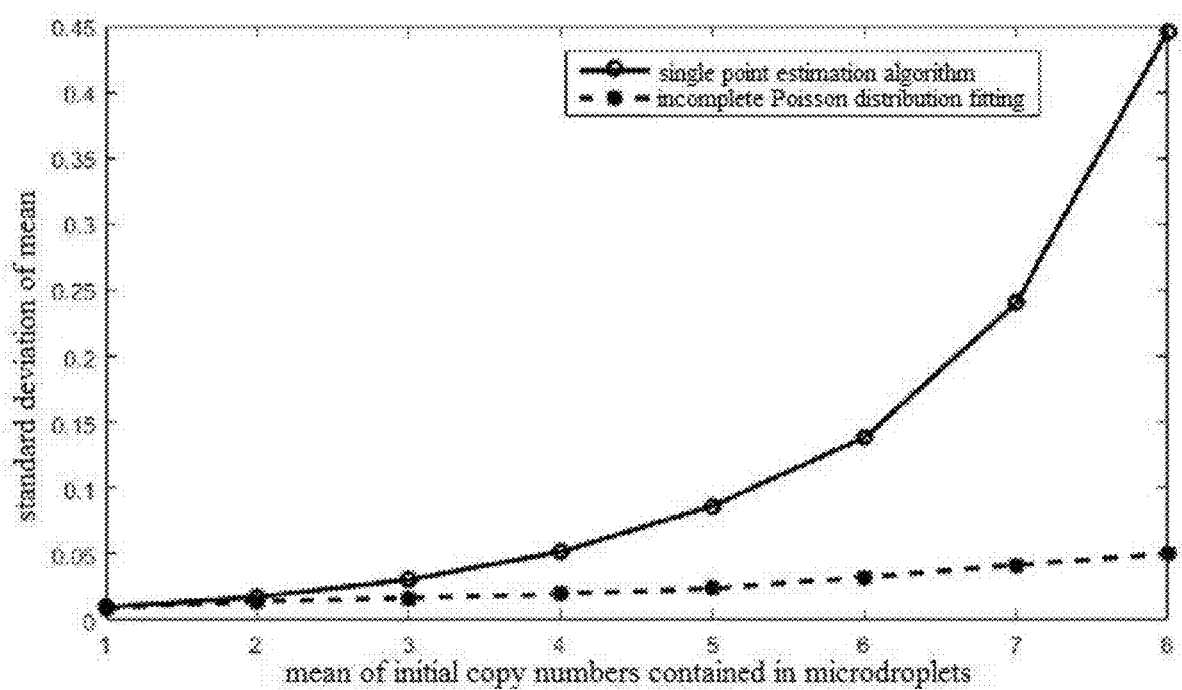
FIG. 23 is a graph comparing a standard deviation of CPD obtained by the digital PCR quantitative detection method using partial samples of the digital PCR detection method provided in the present application with a standard deviation of CPD obtained by another method.

Referring to FIG. 23, the Poisson distribution fitting is obtained according to portion of the initial nucleic acid copy numbers, which are 0, 1, 2, and 3, wherein the x-coordinate is the mean of the initial copy numbers (i.e., the copies per droplet, CPD) contained in the microdroplet, and the y-coordinate is the standard deviation (Std Dev, STD) of the mean. It can be seen that the standard deviation of the mean (i.e. the standard deviation of CPD) obtained based on the initial nucleic acid copy numbers is smaller than the standard deviation of the CPD obtained by other algorithms. Therefore, the mean of the initial copy numbers, i.e., the value of CPD, of the microdroplets obtained by the digital PCR detection method is more accurate. The results obtained by performing the simulation 1000 times for 20000 droplets show that the estimation method using only a single point can cover only a limited concentration range and the estimation accuracy is dramatically decreased with the increase of the sample concentration, while for the incomplete Poisson distribution fitting algorithm, the estimation accuracy has no obvious change with the increase of the sample concentration, so that the concentration of the nucleic acid amplification reaction liquid to be detected can be expanded for two times. For a relatively small number of droplets, the incomplete Poisson distribution fitting algorithm (portion-sampling Poisson distribution fitting algorithm) still has an excellent reliability.

The digital PCR quantitative detection method solves the problems of the false positive result and the false negative result. Hundreds of samples can be simultaneously detected by the high-throughput sequencing platform. Moreover, different kinds of fluorescence can be used to detect multiple sites, thereby increasing the detection speed and reducing the experimental cost. Through the microdropletization of the digital PCR detection apparatus, the fragment with a small amount to be detected is separated from the plentiful and complex background, the operating steps is significantly simplified, the preparation and detection times are effectively saved, the result is direct and reliable, the characteristic of stable implementation is achieved, and the sensitivity and the accuracy of the detection are increased and meet the requirements of precise quantification.

In an embodiment, the step S420 includes:
  S421, acquiring the dissociation temperature corresponding to the dissociation curve of each microdroplet according to the dissociation curves of the microdroplet array; and
  S422, classifying the microdroplet array according to the dissociation temperatures and acquiring the nucleic acid information of the microdroplet array, thereby acquiring the nucleic acid information of the nucleic acids to be detected.

Different DNA sequences have different Tm values. That is to say, the dissociation curve of one type of DNA can be regarded as a fingerprint corresponding to this specific type of DNA. According to the graph showing the dissociation curve, the temperature corresponding to the peak of the curve is the Tm value of the double-stranded DNA molecule, whose genotype can be known according to the Tm value of the amplification product. By classifying the same shaped dissociation curves into one class thereby differentiating the genes having the dissociation curves in different shapes, and comparing with the dissociation curve of the target gene, the non-specific false positive result can be avoided and the sequences different from that of the target gene can be excluded.

In an embodiment, when classifying the microdroplets in the array according to the dissociation curves, the algorithm such as decision tree, Bayesian, artificial neural network, k-nearest neighbor, support vector machine, and association rule-based classifying, Bagging, Boosting, and so on can be used.

In an embodiment, the digital PCR detection method further includes:
  S50, acquiring high resolution dissociation curves of the microdroplet array, classifying the microdroplet array, and acquiring the nucleic acid information, such as genotype information and mutation detection information, of the microdroplet array.

The specificity of the nucleic acid amplification of the microdroplet array can be obtained and whether the primer dimer is produced in the nucleic acid amplification can be determined according to the dissociation curves.

The high resolution dissociation curves of the microdroplet array can be acquired according to the variations in fluorescence signal values of the microdroplet array monitored in real time in the dsDNA dissociating process. The high resolution dissociation curve is a new gene analyzing technique based on the dissociation curves having different shapes due to different dissociation temperatures of single nucleotides. This technique has a very high sensitivity, can be used to detect the difference in single base, and has advantages of low cost, high throughput, rapid speed, accurate result, and no limitation by detecting sites. Thereby, the operation can be performed fully in a closed tube. The HRM analyzing technique plays an important role in mutation scanning, single-nucleotide polymorphism analysis, methylation study, genotyping, and sequence matching. The thermal stability of the double-stranded nucleotide is affected by its length and base composition. The sequence variation of dsDNA can lead to the change of the dissociation behavior during the temperature increasing process. Since the fluorescent dye used can only be incorporated and bound to dsDNA, the difference in the PCR products can be directly revealed by producing dissociation curves having different shapes by detecting the variation in fluorescence signal value in the dissociation process of dsDNA in real time by using the real-time PCR technique. Moreover, the tested groups can be genotyped or classified according to the dissociation curves having different shapes with the help of professional analysis software.

In an embodiment, in the step S20, the microdroplet generating method with the instantaneous accelerated motion or the periodical changing speed can be used to generate the microdroplet array.

In an embodiment, in the step S10, a saturating fluorescent dye is used in the nucleic acid amplification reaction liquid to be detected for analyzing the products of the polymerase chain reaction.

In an embodiment, when performing the qualitative classification analysis for a plurality of microdroplets, the high resolution dissociation curve analysis (or high resolution melting analysis, HRM) can be adopted. The saturating fluorescent dye, instead of a sequence-specific probe, can be used to analyze the products of the PCR reaction.

In an embodiment, the design of the primer is based on three basic principles. First, the primer and the template sequence should be fully complementary. Second, a stable primer dimer or hairpin structure should be avoided. Third, the primer should not be able to initiate a DNA polymerization at a non-target site of the template (i.e. mismatch). To satisfy these three basic principles, many factors should be considered, such as the length of the primer, the length of the product, the Tm value of the sequence, the internal stability of the double-stand formed by the primer and the template, the energy for forming the primer dimer or the hairpin structure, the initiating efficiency of the mismatched sites, the GC content of the primer and of the product, and so on. Moreover, for some special detection, the primer can be modified by, for example, incorporating a restriction enzyme site, introducing a mutation, etc.

The renaturation condition is optimal when the Tm value of the template sequence corresponding to the primer is at about 72° C. The Tm value can be calculated by various methods, for example, according to an equation $Tm=4(G+C)+2(A+T)$, or using the nearest neighbor method in Oligo software.

Figure 24:
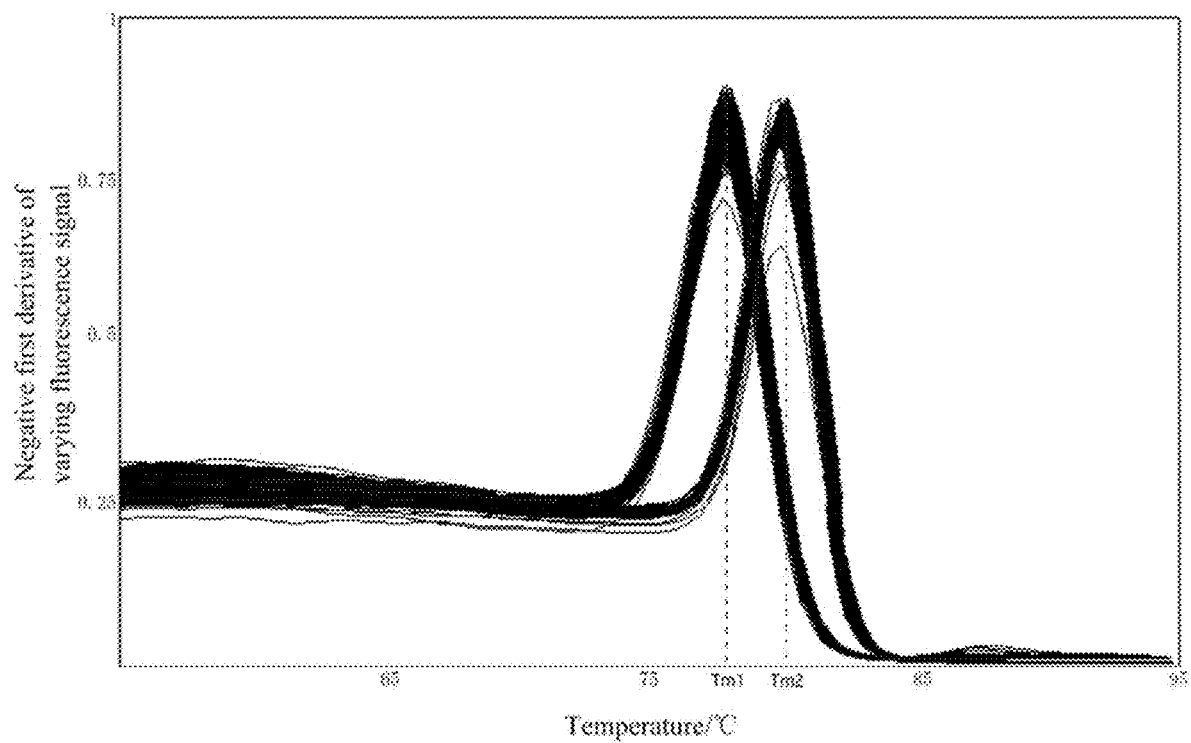
FIG. 24 is a graph showing dissociation curves obtained by the digital PCR detection method provided in the present application.

In an embodiment, referring to FIG. 24, the graph of dissociation curves of a microdroplet array are obtained by using the digital PCR detection method. The graph is plotted to show negative first derivatives of the fluorescence signals varying with the temperatures. The temperatures corresponding to the peaks of the curves are the dissociation temperatures (Tm) of the double-stranded DNA molecules.

The genotypes of the amplification products can be determined according to their Tm values. It can be seen that there are two dissociation temperatures, Tm1 and Tm2. The dissociation temperatures, Tm1 and Tm2, respectively correspond to two different types of DNA, which can be used to find the target DNA from the microdroplet array.

To solve the problems of repetitive detecting, heavy workload, and waste of time in conventional PCR detection technique, a nucleic acid detection microsphere, a preparation method, a kit, and a high-throughput nucleic acid detection method are provided for high-throughput, high sensitivity, and short-time nucleic acid detection and analysis.

Figure 25:
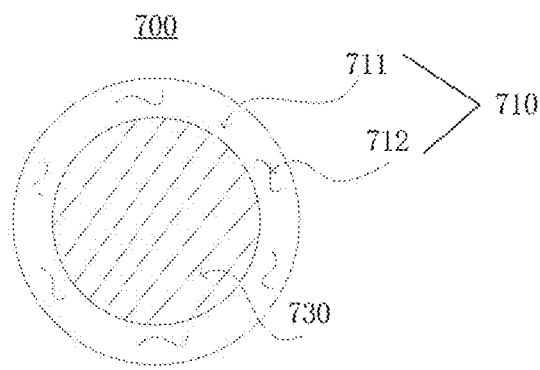
FIG. 25 is a schematic structural view of a nucleic acid detection microsphere provided in the present application.
Figure 26:
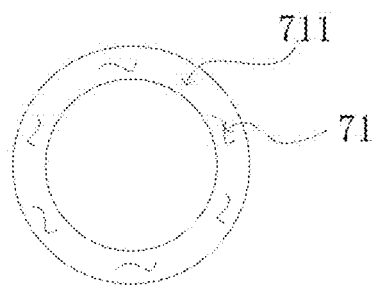
FIG. 26 is a schematic structural view of a coating layer provided in the present application.
Figure 27:
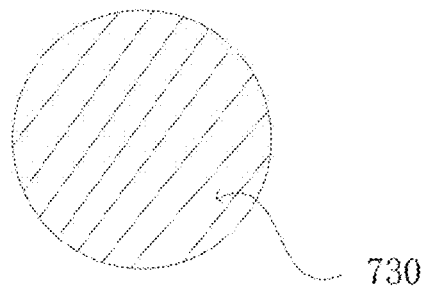
FIG. 27 is a schematic structural view of a core provided in the present application.

Referring to FIGS. 25 to 27, an embodiment of a nucleic acid detection microsphere 700 for high-throughput nucleic acid detection and analysis is provided in the present application. The nucleic acid detection microsphere 700 includes a core 730 and a coating layer 710. The core 730 is provided with fluorescence-coding information. The coating layer 710 is coated on the core 730. The coating layer 710 includes a matrix 711 and primers 712 dispersed in the matrix 711. The primers 712 are specifically corresponding to the core 730.

The core 730 is coated by the coating layer 710 to form the nucleic acid detection microsphere 700. The matrix 711 is a water-containing polymer gel formed in a hydrophobic oil. The water-containing polymer gel is non-flowable, and its shape and volume are substantially unchangeable. The water-containing polymer gel is in a gel state at room temperature and is molten at a temperature higher than the room temperature, thereby not affecting the diffusions and activities of the enzyme and the reaction liquid. Moreover, the target nucleic acid can be identified and qualitatively analyzed via the primers 712 dispersed in the matrix 711. The core 730 is a thermostable material and is provided with the fluorescence-coding information. The fluorescence-coding information is represented by a fluorescence-coding signal of the core 730, so that a special marking function can be achieved via the fluorescence-coding signal. In addition, each core 730 corresponds to one type of primers 712, and such correspondence is exclusive, so that the nucleic acid detection microsphere 700 can be marked via the core 730 so as to perform the tracking and the detection.

In the PCR detection, a plurality of multiple types of nucleic acid detection microspheres 700 are mixed with the nucleic acid amplification reaction liquid to be detected to form a nucleic acid detection liquid. The nucleic acid detection liquid can be formed into a plurality of microdroplets. The PCR reaction can be carried out in the plurality of microdroplets. In the process of the PCR reaction, the double-stranded DNA is denatured at 90° C. to 95° C., then cooled rapidly to 50° C. to 60° C., at which the primers are annealed and bound to target sequences, and then heated rapidly to 70° C. to 75° C., at which the strands of the primers extend along the template under the action of Taq DNA polymerase, and the nucleic acid is amplified in the appropriate temperature range. In the PCR temperature controlling process of the plurality of microdroplets, the coating layer 710 is molten and decomposed to release the primers 712 provided in the coating layer 710 into the corresponding microdroplet to react with the target nucleic acid molecule contained in the microdroplet. Finally, the core 730 can be located, tracked, and identified, and the target nucleic acid molecule can be identified via the primers 712 corresponding to the core 730, thereby achieving the high-throughput PCR detection.

In practical application, multiple types of nucleic acid detection microspheres 700 can be batch prepared, mixed in a certain proportion according to practical needs of the target nucleic acid detection, and further mixed with the nucleic acid amplification reaction liquid to be detected to form the nucleic acid detection liquid. Multiple types of target nucleic acids can be detected at one time by using the nucleic acid detection liquid, without repeating the detection for multiple times, reducing the workload and time, and increasing the sensitivity.

Figure 28:
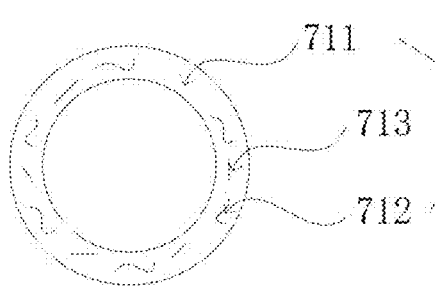
FIG. 28 is a schematic structural view of a coating layer provided in an embodiment of the present application.
Figure 29:
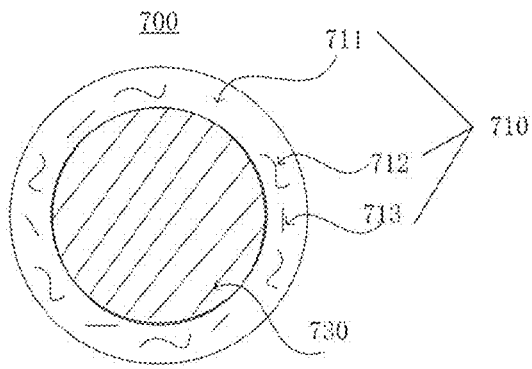
FIG. 29 is a schematic structural view of a nucleic acid detection microsphere provided in an embodiment of the present application.

Referring to FIGS. 28 to 29, in an embodiment, the coating layer 710 further includes the probe 713. The probe 713 and the primers 712 are dispersed in the matrix 711 and specifically correspond to the core 730.

The probe 713 can be a fluorescent probe configured for indicating the nucleic acid amplification, and can be an oligosaccharide nucleotide probe containing both a fluorescent group and a quenching group, such as TaqMan® fluorescent probe and so on. The target nucleic acid can be identified and qualitatively analyzed via the probe 713 dispersed in the matrix 711. In the PCR temperature controlling process of the plurality of microdroplets, the coating layer 710 is molten and decomposed to release the primers 712 and the probe 713 provided in the coating layer 710 into the corresponding microdroplet to react with the target nucleic acid molecule contained in the microdroplet. Finally, the core 730 can be located, tracked, and identified, and the target nucleic acid molecule can be identified via the primers 712 and the probe 713 corresponding to the core 730, thereby achieving the high-throughput PCR detection.

In an embodiment, different types of primers 712 can be provided. In batch detecting, multiple primers 712 can be in different types, so that different types of target nucleic acid molecules can be detected. Moreover, one type of primers 712 corresponds to one type of core 730; in other words, each type of primers 712 is represented by a code in the form of the core 730, so that the identification can be achieved by detecting the core 730.

In an embodiment, taking 100 nucleic acid detection microspheres 700 as an example, 100 nucleic acid detection microspheres 700 correspond to 100 different types of primers 712. That is, the 100 nucleic acid detection microspheres 700 correspond to 100 different types of cores 730. That is, the 100 different types of primers 712 correspond to 100 different types of cores 730. In the PCR temperature increasing process of the plurality of microdroplets containing the 100 nucleic acid detection microspheres 700, the coating layer 710 of each nucleic acid detection microsphere 700 is molten and decomposed to release the primers 712 from the coating layer 710 to the corresponding microdroplet to receive the PCR amplification. In this case, the primers 712 contained in a microdroplet containing only one core 730 can be identified via the core 730, and the target nucleic acid molecule in this microdroplet can be further identified via the primers 712, thereby achieving the PCR detection.

In an embodiment, the matrix is an agarose gel which is a gel prepared with agarose as a supporting medium. The agarose has a melting point between 62° C. to 65° C., can maintain in liquid state for several hours at 37° C. after being molten, and can be solidified into a gel at 30° C. In the PCR temperature controlling process of the plurality of microdroplets, the coating layer 710 is molten and decomposed to release the primers 712 and the probe 713 from the coating layer 710 to the corresponding microdroplet, so as to achieve the PCR reaction between the primers 712 and the target nucleic acid molecule contained in the microdroplet and to indicate whether the amplification is performed via a fluorescent dye or the probe 173.

In an embodiment, the core 730 is a solid sphere containing a fluorescent dye.

A material of the core 730 can be a thermostable material such as polyimide, polytetrafluoroethylene, polyphenylene sulfide, polyamide, etc. Moreover, the fluorescent dye capable of emitting a fluorescence signal is contained in the core 730. The cores 730 can be coded by different types of fluorescent dyes and by magnitudes of fluorescence intensities. Thereby, a large number of different types of cores 730 can be obtained. The cores 730 can be coded with the fluorescence signals, thereby coding the plurality of nucleic acid detection microspheres 700.

In an embodiment of the present application, two different types of fluorescent dyes are adopted. 10 different magnitudes of fluorescence signal intensities are adopted for each type of fluorescent dye. Therefore, 10×10=100 types of cores 730 with difference in fluorescence coding information can be obtained. Accordingly, 10×10=100 types of nucleic acid detection microspheres 700 with different markers can be obtained. Each type of nucleic acid detection microsphere 700 corresponds to one type of core 730; each type of core 730 corresponds to one type of primers 712; and each type of core 730 corresponds to one type of probe 713. The PCR detection can be performed to detect different types of target nucleic acids at one time by using the plurality of nucleic acid detection microspheres 700. The method has no need for repeating the detection, having the advantages of small workload, short detection time, high-throughput, and high sensitivity.

In an embodiment, the core 730 has a diameter of 10 micrometers to 100 micrometers. The coating layer has a thickness of 10 micrometers to 100 micrometers.

Generally, the nucleic acid detection microsphere 700 has a diameter of 20 micrometers to 150 micrometers, so that a sufficient number of microdroplets can be image captured. The core 730 can have a diameter of 10 micrometers to 100 micrometers. The coating layer can have a thickness of 10 micrometers to 100 micrometers. The nucleic acid detection microsphere 700 should not be too large or too small. The over small microsphere is not easy to be identified. The over large microsphere may block the outlet end of the microdroplet generating device during the generation of the plurality of microdroplets, thereby hindering the generation of the microdroplets. By setting such diameter range for the nucleic acid detection microsphere 700, the microdroplets can be identified by the fluorescence signal detecting device, as many microdroplets as possible can be captured conveniently, and it is not easy to block the outlet end of the microdroplet generating device to generate the microdroplets.

In an embodiment, a method for preparing the nucleic acid detection microsphere includes:
S110, providing a plurality of cores 730 and a primer solution; S120, providing a gel powder, adding the gel powder into double distilled water to obtain a gel powder solution, and heating the gel powder solution to a clear state, thereby obtaining a coating layer preparing liquid;
S130, mixing the plurality of cores 730, the primer solution, and the coating layer preparing liquid at a gel melting temperature, thereby obtaining a nucleic acid detection microsphere preparing liquid;
S140, microdropletizing the nucleic acid detection microsphere preparing liquid into a plurality of nucleic acid detection microsphere microdroplets at the gel melting temperature;

S150, cooling the plurality of nucleic acid detection microsphere microdroplets, and flow sorting to obtain a plurality of nucleic acid detection microspheres.

In the step S110, the plurality of cores 730 are same-type solid spheres containing fluorescent dyes. The nucleic acid detection microspheres 700 are prepared from the plurality of cores 730. So that, one type of nucleic acid detection microsphere 700 corresponds to only one type of core 730, and one type of primers 712 corresponds to only one type of core 730.

Moreover, the primer solution contains the primers 712. The primers 712 in powder form are diluted with sterilized ultrapure water. In an embodiment, the concentration of the primers in the primer solution is 100 µM, i.e., 100 µmol/L. Then, 100 µl of the primer solution with the concentration of 100 µM is added into 900 µl of the coating layer preparing liquid, so that the concentration of the primers is 10 µM (µmol/L).

In the step S120, the gel powder can be a material capable of forming the gel, such as an agar powder, ethylene glycol diacrylate, and so on. The coating layer preparing liquid can be an agar powder solution. In an embodiment, the agar powder at a mass percentage of 1.5% to 4.5% and 10 ml of double distilled water are provided. The agar powder is added into the double distilled water and dissolved at a high temperature until the solution is clear, thereby obtaining the coating layer preparing liquid which is the agar powder solution.

In the step S130, the type of the primers 712 contained in the primer solution are the same. The fluorescence type of the plurality of cores 730 are the same. The gel melting temperature is a temperature at which the gel is transformed into a liquid solution. The agarose has a melting temperature between 62° C. and 65° C. and is solidified into the gel at 30° C. Therefore, by adding the primers 712 and the plurality of cores 730 into the coating layer preparing liquid, i.e., the agar powder solution, at a high temperature environment, the nucleic acid detection microsphere preparing liquid is obtained.

In an embodiment, in the step S130, when adding the primers 712 and the cores 730 into the agarose solution, a concentration of the cores 730 is decided according to a size of the nucleic acid detection microsphere 700 to be generated.

Figure 30:
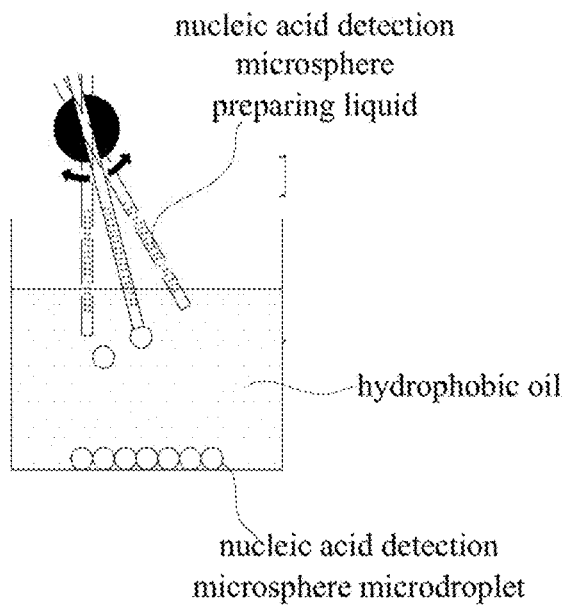
FIG. 30 is a schematic structural view of a microdroplet generating device provided in the present application.
Figure 31:
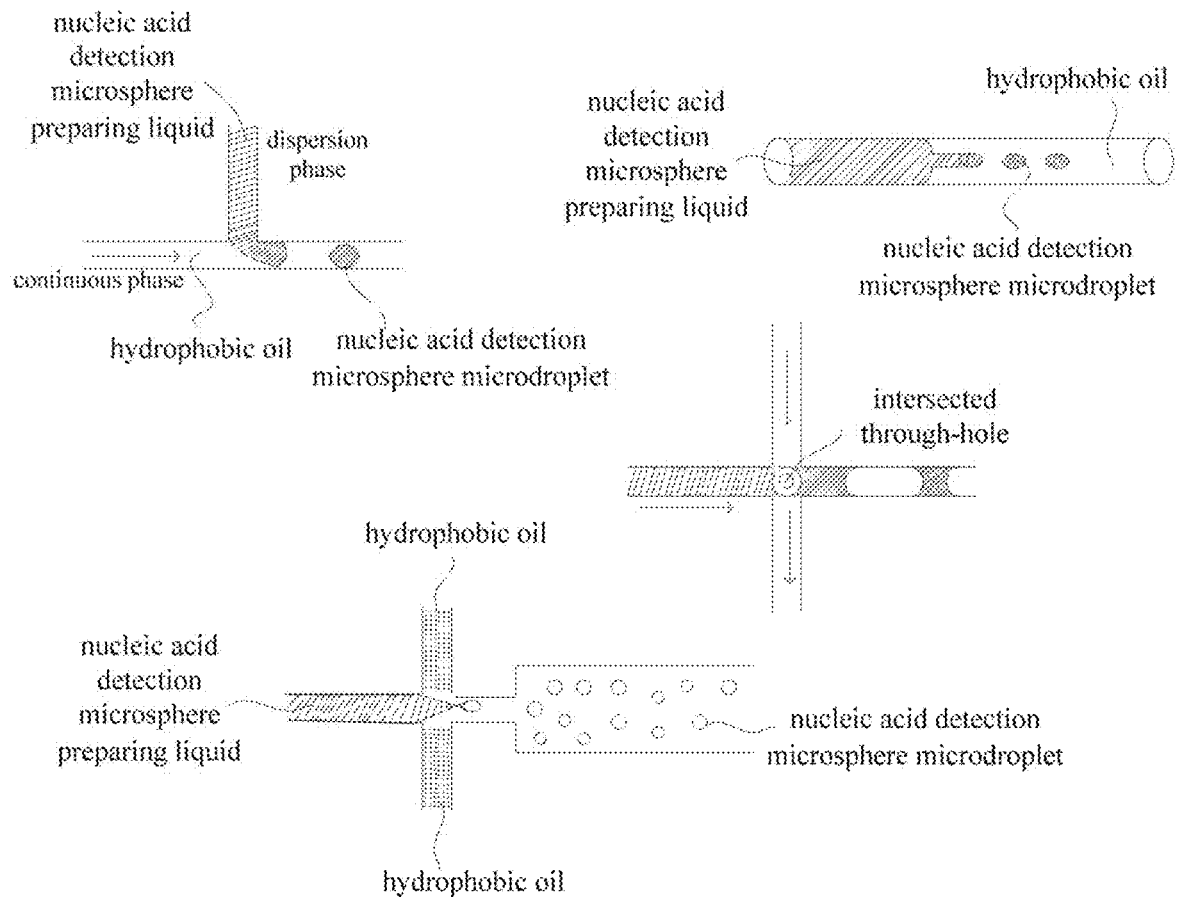
FIG. 31 is a schematic structural view of different types of micro-fluidic chips provided in the present application.

Referring to FIGS. 30 to 31, in the step S140, the plurality of nucleic acid detection microsphere microdroplets are formed in a hydrophobic oil via a microfluidic chip, a microfluidic generator, or the microdroplet generating device at the high temperature environment.

Referring to FIG. 30, in an embodiment, the step S140 includes:
S141, providing a liquid discharging nozzle having an outlet end, the liquid discharging nozzle containing the nucleic acid detection microsphere preparing liquid; and providing a container having an opening and containing the hydrophobic oil;
S412, inserting the outlet end of the liquid discharging nozzle below a liquid surface of the hydrophobic oil at the gel melting temperature;
S143, controlling the outlet end of the liquid discharging nozzle to move with a motion including an instantaneous accelerated motion or to move at a periodically changed speed below the liquid surface of the hydrophobic oil, so that the nucleic acid detection microsphere preparing liquid discharged from the outlet end of the liquid discharging nozzle is formed into the plurality of nucleic acid detection microsphere microdroplets below the liquid surface of the hydrophobic oil.

A microdroplet generating device is provided in the present application. The microdroplet generating device includes the liquid discharging nozzle, the fluid driving mechanism, and the motion controlling mechanism. The liquid discharging nozzle has the inlet end and the outlet end. The fluid driving mechanism drives the liquid discharging nozzle to draw the nucleic acid detection microsphere preparing liquid into the liquid discharging nozzle through the inlet end. The outlet end of the liquid discharging nozzle is inserted into the container containing the oil liquid. So that, the outlet end of the liquid discharging nozzle is inserted below the liquid surface of the oil liquid. In addition, the outlet end of the liquid discharging nozzle, driven by the motion controlling mechanism, is moved with the motion including the instantaneous accelerated motion or to move at the periodically changed speed below the liquid surface of the oil liquid. So that, the nucleic acid detection microsphere preparing liquid discharged from the outlet end of the liquid discharging nozzle is formed into the plurality of nucleic acid detection microsphere microdroplets below the liquid surface of the oil liquid. The oil liquid and the nucleic acid detection microsphere preparing liquid are immiscible with each other or have an interfacial reaction therebetween. The oil liquid can be a mineral oil (including n-tetradecane, etc.), a vegetable oil, a silicone oil, a perfluoroalkane oil, and so on.

In the step S150, the plurality of nucleic acid detection microsphere microdroplets are cooled to the normal temperature, i.e., around 30° C., to be solidified into the gel, and then flow sorted to obtain the plurality of nucleic acid detection microspheres 700. In the flow sorting, the plurality of nucleic acid detection microsphere microdroplets flowing at a high speed are irradiated with high energy lasers. As the plurality of nucleic acid detection microsphere microdroplets each may contain zero, one, or more cores 730, and the core 730 is a solid sphere containing the fluorescent dye, the sorting can be performed by measuring the intensities of generated scattered light and emitted fluorescence to obtain the nucleic acid detection microspheres 700 each containing only one core 730.

The cooled nucleic acid detection microspheres 700 are in the gel state, which are suitable for storage and transportation at normal temperature for the PCR detection.

In an embodiment, a method for preparing the nucleic acid detection microsphere includes:
S210, providing a primer solution, a probe solution, and a plurality of cores 730;
S220, providing a gel powder, adding the gel powder into double distilled water to obtain a gel powder solution, and heating the gel powder solution to a clear state, thereby obtaining a coating layer preparing liquid;
S230, mixing the plurality of cores 730, the primer solution, the probe solution, and the coating layer preparing liquid at a gel melting temperature, thereby obtaining a nucleic acid detection microsphere preparing liquid;
S240, microdropletizing the nucleic acid detection microsphere preparing liquid into a plurality of nucleic acid detection microsphere microdroplets at the gel melting temperature;
S250, cooling the plurality of nucleic acid detection microsphere microdroplets, and flow sorting to obtain a plurality of nucleic acid detection microspheres.

In the step S210, the probe solution contains the probe 173 configured to detect whether the nucleic acid is amplified. The probe can be an oligosaccharide nucleotide probe containing both a fluorescent group and a quenching group, such as TaqMan® fluorescent probe and so on. In the PCR temperature controlling process of the plurality of microdroplets, the coating layer 710 is molten and decomposed to release the primers 712 and the probe 713 from the coating layer 710 to the corresponding microdroplet to react with the target nucleic acid molecule contained in the microdroplet. Finally, the core 730 can be located, tracked, and identified, and the target nucleic acid molecule can be identified via the primers 712 and the probe 713 corresponding to the core 730, thereby achieving the high-throughput PCR detection.

The plurality of cores 730 are same-type solid spheres containing fluorescent dyes. The nucleic acid detection microspheres 700 are prepared from the plurality of cores 730. So that, one type of nucleic acid detection microsphere 700 corresponds to only one type of core 730, one type of primers 712 corresponds to only one type of core 730, and one type of probe 713 corresponds to only one type of primers 712.

In the step S220, a preparation method of the coating layer preparing liquid can be the same as that in the step S120.

In the step S240, a preparation method for forming the plurality of nucleic acid detection microsphere microdroplets can be the same as that in the step S140.

In the step S250, a method for obtaining the plurality of nucleic acid detection microspheres 700 can be the same as that in the step S150.

In an embodiment, in the step S250, the nucleic acid detection microspheres 700 each contains one single core.

In an embodiment, in the step S220, the gel powder is an agar powder or ethylene glycol diacrylate.

In an embodiment, a kit for the high-throughput nucleic acid detection and analysis is provided. The kit includes the nucleic acid detection microsphere and the nucleic acid reaction liquid in any one of above-described embodiments.

The nucleic acid reaction liquid includes an enzyme, dNTP, a fluorescent dye, ions, and any other component which are necessary for the PCR amplification. If the nucleic acid detection microsphere 700 contains the probe 713, the nucleic acid reaction liquid can contain no fluorescent dye.

The kit can be used for the storage and the transportation of the plurality of different types of the nucleic acid detection microspheres 700. The nucleic acid detection microspheres 700 can be preserved in glycerin.

In an embodiment, a set of reagent(s) and solution(s) specifically for the digital PCR is prepared to reduce or avoid a potential contamination to the template DNA sample caused by an exogenous DNA. All of the used apparatus and consumable materials should be sterilized and dried at a high temperature.

Figure 32:
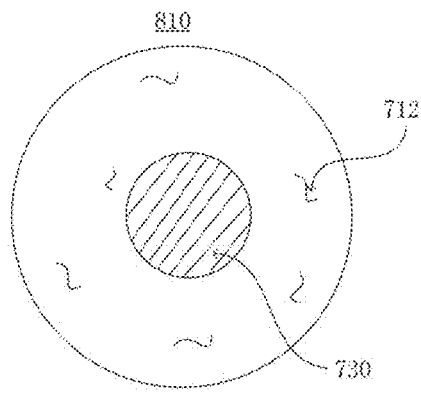
FIG. 32 is a schematic structural view of a first efficient microdroplet provided in the present application.

Referring to FIG. 32, in an embodiment, a high-throughput nucleic acid detection method includes:

S310, providing a nucleic acid amplification reaction liquid and a plurality of different types of nucleic acid detection microspheres 700, wherein the nucleic acid detection microsphere 700 includes a core 730 and a coating layer 710, the core 730 is provided with coding information, the coating layer 710 is coated on the core 730, the coating layer 710 includes a matrix 711 and primers 712 dispersed in the matrix 711, the primers 712 are specifically corresponding to the core 730, and the core 730 is a solid sphere containing a fluorescent dye;

S320, mixing the plurality of different types of nucleic acid detection microspheres 700 with the nucleic acid amplification reaction liquid, thereby obtaining a nucleic acid detection liquid;

S330, forming the nucleic acid detection liquid into a plurality of microdroplets 800; S340, amplifying nucleic acids in the plurality of microdroplets 800, thereby obtaining a plurality of amplified microdroplets 800;

S350, detecting the core 730 in each amplified microdroplet 800 and sorting out the amplified microdroplet 800 containing only one core 730, thereby obtaining a first efficient microdroplet 810;

S360, detecting a fluorescence signal of the core 730 of the first efficient microdroplet 810 according to the first efficient microdroplet 810, acquiring the primers 712 corresponding to the core 730, and acquiring reporting fluorescence signal after the nucleic acid amplification reaction to determine whether the first efficient microdroplet 810 contains a corresponding target nucleic acid molecule.

In the step S310, the nucleic acid amplification reaction liquid is a nucleic acid amplification reaction liquid with desoxyribonucleic acid as a template, a reverse transcription nucleic acid amplification reaction liquid with ribonucleic acid as a template, or a loop-mediated isothermal amplification reaction liquid. Moreover, the fluorescent dye is contained in the nucleic acid amplification reaction liquid. In an embodiment, the nucleic acid amplification reaction liquid includes a nucleic acid template, a reaction buffer solution, deoxyribonucleotide triphosphate, a polymerase, divalent metal cations, and so on. If the coating layer 710 contains no probe 713, the reaction buffer solution contains the fluorescent dye.

The nucleic acid amplification reaction liquid can be a nucleic acid amplification reaction liquid (also referred to as DNA amplification reaction liquid) with desoxyribonucleic acid (DNA) as a template, a reverse transcription nucleic acid amplification reaction liquid (also referred to as RNA reverse transcription reaction liquid) with ribonucleic acid (RNA) as a template, or any other nucleic acid amplification reaction liquid such as a loop-mediated isothermal amplification (LAMP) reaction liquid. The characteristic of the DNA amplification reaction liquid is that the reaction liquid includes dNTP, a reaction buffer solution, inorganic salt ions, a polymerase, a DNA template to be detected, and a fluorescent dye. The fluorescent dye can be capable of binding to the DNA, such as SYBR® Green.

In the PCR reaction system, the SYBR® Green fluorescent dye in an unbound state emits weak fluorescence; however, the fluorescence will be significantly enhanced and the fluorescence signal will be emitted once the dye is bound to the double-stranded DNA, thereby ensuring the complete synchronization between the enhance of the fluorescence signal and the produce of the PCR product. In this case, whether the corresponding target nucleic acid molecule is existed in the first efficient microdroplet 810 can be determined by detecting the fluorescence signal emitted by the SYBR® Green fluorescent dye to acquire the reporting fluorescence signal after the nucleic acid amplification reaction.

Sizes, shapes, and the contained primers 712 of the plurality of nucleic acid detection microspheres 700 in different types can be the same or different. Different types of the primers 712 can be contained in the plurality of nucleic acid detection microspheres 700 to detect different types of target nucleic acid molecules.

In the step S320, when mixing the multiple different types of nucleic acid detection microspheres 700 with the nucleic acid amplification reaction liquid to obtain the nucleic acid detection liquid, the concentration of the nucleic acid detection microspheres 700 in the nucleic acid detection liquid can be regulated to maximize the number of the microdroplets each containing only one core when generating the plurality of microdroplets 800. The distribution of the microspheres is in accordance with the Poisson distribution theoretical model. In this case, a probability of each microdroplet 800 containing one core 730 is calculated by $p(x=1)=\lambda e^{-\lambda}$, $p'(x=1)=e^{-\lambda}-\lambda e^{-\lambda}=0$. When $\lambda=1$, i.e., the probability reaches a maximal value when the average number of the microdroplets 800 each containing one core 730. In this case, the probability of each microdroplet 800 containing one core 730 is $p(x=1)=e^{-1}=0.368$.

Referring to FIG. 1, in the step S330, a high-throughput nucleic acid detection apparatus is provided in an embodiment of the present application. The high-throughput nucleic acid detection apparatus includes the microdroplet generating device, the temperature controlling device, the fluorescence signal detecting device, the analysis device, and the controller. The microdroplet generating device is configured to microdropletize a nucleic acid detection liquid into the plurality of microdroplets 800. The microdroplet generating device is connected to the temperature controlling device via a rail, so that the plurality of microdroplets can be transferred to the temperature controlling device to undergo a temperature cycling via the temperature controlling device to achieve the nucleic acid amplification. After the amplification of the plurality of microdroplets is finished, a fluorescence detection is performed for the plurality of microdroplets undergone the nucleic acid amplification via the fluorescence signal detecting device. The controller is respectively connected to the microdroplet generating device, the temperature controlling device, and the fluorescence signal detecting device to control the microdroplet generating device, the temperature controlling device, and the fluorescence signal detecting device.

The microdroplet generating device includes the liquid discharging nozzle, the fluid driving mechanism, and the motion controlling mechanism. The liquid discharging nozzle has the inlet end and the outlet end. The fluid driving mechanism drives the liquid discharging nozzle to draw the nucleic acid detection liquid into the liquid discharging nozzle through the inlet end. The outlet end of the liquid discharging nozzle is inserted into the container containing an oil liquid. So that, the outlet end of the liquid discharging nozzle is inserted below the liquid surface of the oil liquid. In addition, the outlet end of the liquid discharging nozzle, driven by the motion controlling mechanism, is moved with a motion including an instantaneous accelerated motion or moved at a periodically changed speed below the liquid surface of the oil liquid. So that, the nucleic acid detection liquid discharged from the outlet end of the liquid discharging nozzle is formed into the plurality of microdroplets 800 below the liquid surface of the oil liquid. The oil liquid and the nucleic acid detection liquid are immiscible with each other or have an interfacial reaction therebetween. The oil liquid can be a mineral oil (including n-tetradecane, etc.), a vegetable oil, a silicone oil, a perfluoroalkane oil, and so on.

Figure 33:
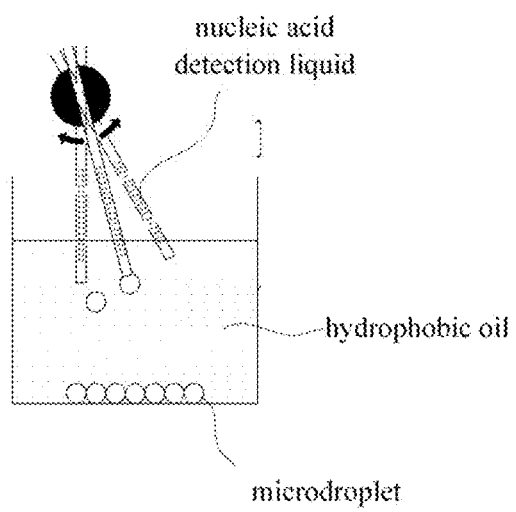
FIG. 33 is a schematic structural view of a microdroplet generating device provided in the present application.
Figure 34:
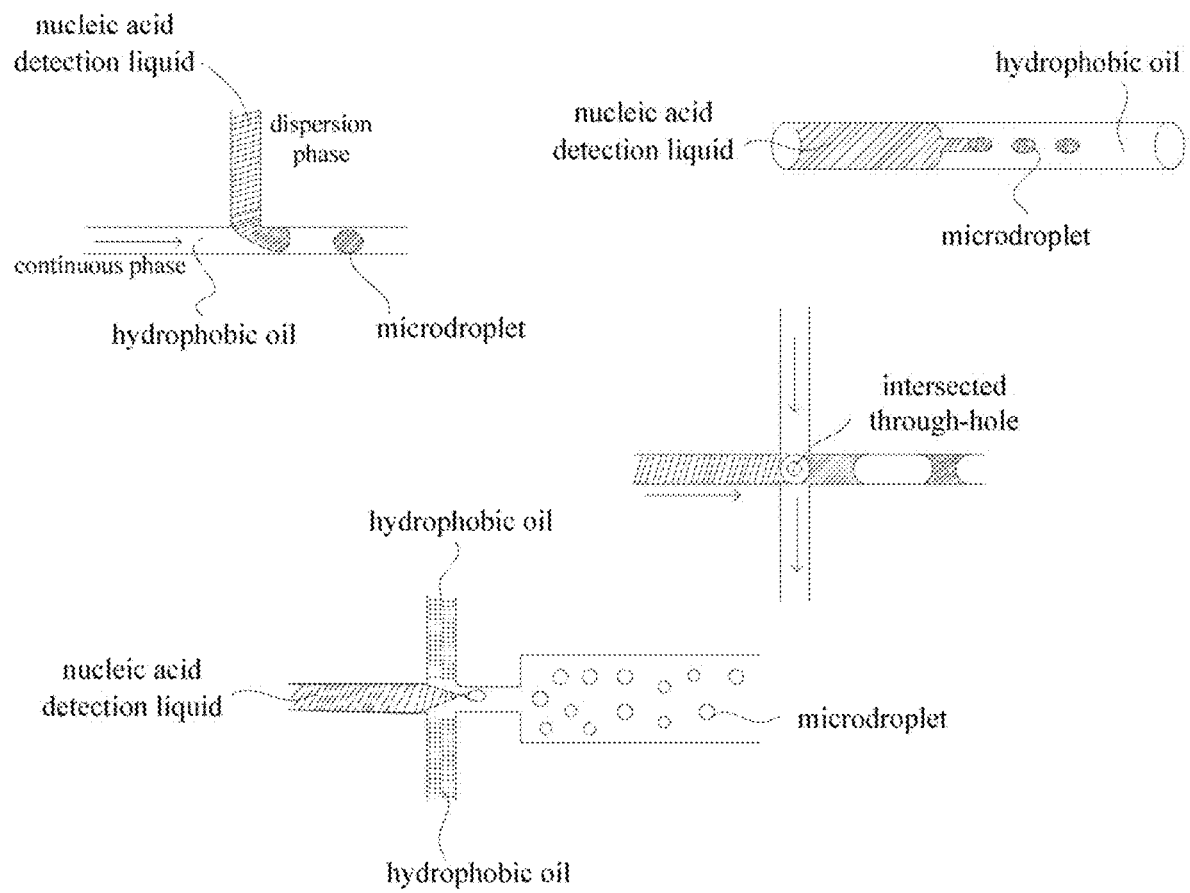
FIG. 34 is a schematic structural view of different types of micro-fluidic chips provided in the present application.

Referring to FIGS. 33-34, in an embodiment, in the step S330, the nucleic acid detection liquid are microdropletized into the plurality of microdroplets 800 by using a microfluidic chip, a microfluidic generator, or the microdroplet generating device. The generating of the plurality of microdroplets 800 is not limited to using the above-described device but can be any other device for generating the plurality of microdroplets 800.

Each microdroplet 800 may contain zero, one, or more nucleic acid detection microspheres 700. Moreover, each microdroplet 800 contains the nucleic acid amplification reaction liquid for the nucleic acid amplification.

In an embodiment, in the step S330, the plurality of microdroplets 800 formed by microdropletizing the nucleic acid detection liquid can have the same or different sizes.

In an embodiment, in the step S330, the microfluidic chip can be used to microdropletize the nucleic acid detection liquid.

When microdropletizing the nucleic acid detection liquid, each microdroplet 800 may contain zero, one, or more nucleic acid detection microspheres 700. When the temperature at which the nucleic acids in the plurality of microdroplets 800 are amplified is higher than the melting point of the agarose, the coating layer 710 is molten to release the primers 712. As such, the primers 712 and the nucleic acid in the microdroplet 800 are simultaneously subjected to the PCR amplification. The type of the primers 712 can be identified by identifying the corresponding core 730 in the microdroplet 800, thereby identifying the target nucleic acid molecule.

In an embodiment, in the step S350, the first efficient microdroplet 810 contains one core 730. The microdroplet 800 which contains zero or more than one core 730 is regarded as an inefficient microdroplet. The first efficient microdroplet 810 contains the fluorescent dye and the primers 712. If the fluorescent dye is bound to the double-stranded DNA in the process of the PCR amplification of the primers 712 and the nucleic acid in the first efficient microdroplet 810, the fluorescence is significantly enhanced and a relatively strong fluorescence signal can be emitted. The first efficient microdroplet 810 thereby has a relatively strong fluorescence signal, so that the type of the corresponding target nucleic acid molecule in the first efficient microdroplet 810 can be acquired according to the core 730 and the primers 720.

In an embodiment, the step S360 includes:
S361, providing a fluorescence signal detecting device including a fluorescence-code detecting channel and a fluorescent dye detecting channel, and identifying the fluorescence signal of the core 730 in the efficient microdroplet through the fluorescence-code detecting channel;

S362, acquiring the primers 712 corresponding to the core 730 according to the fluorescence signal of the core 730;

S363, detecting the reporting fluorescence signal after the nucleic acid amplification reaction in the first efficient microdroplet 810 through the fluorescent dye detecting channel, and determining whether the first efficient microdroplet 810 contains the corresponding target nucleic acid molecule.

The core 730 is a solid sphere containing the fluorescent dye. The cores 730 can be labeled by using different types of fluorescent dyes and magnitudes of intensities of the fluorescence. Each type of fluorescence corresponds to one type of core 730 and each type of core 730 corresponds to one type of primers 712. That is, each type of primers 712 has its corresponding representing code, i.e., the core 730.

In the step S360, the existence of the target nucleic acid molecule is detected by detecting the existence of the reporting fluorescence signal to achieve the qualitative detection. In the sorting process, the first efficient microdroplets 810 containing the cores 730 in the same type can be sorted into one group. Moreover, by detecting the existence of the reporting fluorescence signals, a ratio of the number of the microdroplets emitting no reporting fluorescence signal to a total number of the first efficient microdroplets 810 containing this type of cores 730 can be obtained, so that the concentration of the target nucleic acid molecules corresponding to this type of cores 730 can be calculated according to the Poisson distribution.

Figure 35:
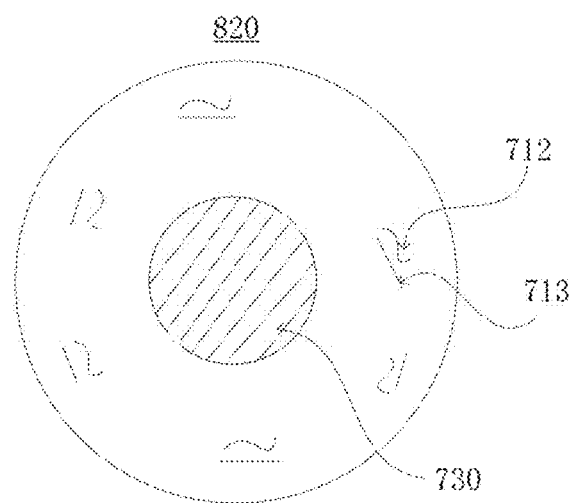
FIG. 35 is a schematic structural view of a second efficient microdroplet provided in the present application.

Referring to FIG. 35, in an embodiment, a high-throughput nucleic acid detection method includes:

S410, providing a nucleic acid amplification reaction liquid and a plurality of different types of nucleic acid detection microspheres 700, wherein the nucleic acid detection microsphere 700 includes a core 730 and a coating layer 710, the core 730 is provided with coding information, the coating layer 710 is coated on the core 730, the coating layer 710 includes a matrix 711, primers 712 and a probe 713, the primers 712 and the probe 713 are dispersed in the matrix 711, the primers 712 and the probe 713 are specifically corresponding to the core 730, and the core 730 is a solid sphere provided with fluorescence-coding information;

S420, mixing the plurality of different types of nucleic acid detection microspheres 700 with the nucleic acid amplification reaction liquid, thereby obtaining a nucleic acid detection liquid;

S430, forming the nucleic acid detection liquid into a plurality of microdroplets 800; S440, amplifying nucleic acids in the plurality of microdroplets 800, thereby obtaining a plurality of amplified microdroplets 800;

S450, detecting the core 730 in each amplified microdroplets 800 and sorting out the amplified microdroplet 800 containing only one core 730, thereby obtaining a second efficient microdroplet 820;

S460, detecting a fluorescence signal of the core 730 of the second efficient microdroplet 820 according to the second efficient microdroplet 820, acquiring the primers 712 and the probe 713 corresponding to the core 730, and acquiring the reporting fluorescence signal after the nucleic acid amplification reaction to determine whether the second efficient microdroplet 820 contains the corresponding target nucleic acid molecule.

When microdropletizing the nucleic acid detection liquid, each microdroplet 800 may contain zero, one, or more nucleic acid detection microspheres 700. When the temperature at which the nucleic acids in the plurality of microdroplets 800 are amplified is higher than the melting point of the agarose, the coating layer 710 is molten to release the primers 712 and the probe 713. As such, the primers 712, the probe 713, and the nucleic acid in the microdroplet 800 are simultaneously subjected to the PCR amplification. The types of the primers 712 and the probe 713 can be identified by identifying the corresponding core 730 in the microdroplet 800, thereby identifying the target nucleic acid molecule.

In the step S450, the second efficient microdroplet 820 contains one core 730. The microdroplet 800 which contains zero or more than one core 730 is regarded as an inefficient microdroplet. Moreover, the second efficient microdroplet 820 contains the probe 713 and the primers 712. When the second efficient microdroplet 820 contains the probe 713, the second efficient microdroplet 820 can contain no fluorescent dye. In this case, the probe 713 functions as a fluorescence marker. The probe 713 is bound to the double-stranded DNA in the process of the PCR amplification of the primers 712 and the nucleic acid in the second efficient microdroplet 820, so that the second efficient microdroplet 820 containing the corresponding target nucleic acid molecule can be identified.

The probe 713 is bound to the double-stranded DNA in the process of the PCR amplification of the primers 712 and the nucleic acid in the second efficient microdroplet 820, so that whether the second efficient microdroplet 820 contains the corresponding target nucleic acid molecule can be determined by identifying the probe 713. Therefore, the type of the corresponding target nucleic acid molecule in the first efficient microdroplet 810 can be acquired according to the core 730 and the primers 712.

In an embodiment, the method for microdropletizing the nucleic acid detection liquid in the step S430 is the same as that in the step S330.

Referring to FIG. 6, a fluorescence signal detecting device 30 is provided in an embodiment of the present application. The fluorescence signal detecting device 30 includes an exciting light source 340, a fluorescence detecting assembly 330, and a third controller 310. The exciting light source 340 is disposed above a detection area of the plurality of microdroplets 800, and irradiates the detection area of the plurality of microdroplets 800 at an oblique angle to form an oblique light path. The fluorescence detecting assembly 330 is disposed right above the detection area of the plurality of microdroplets 800 to capture a fluorescence image of the plurality of microdroplets 800. The third controller 310 is respectively connected to the exciting light source 340 and the fluorescence detecting assembly 330 to control the exciting light source 340 and the fluorescence detecting assembly 330. The fluorescence signal detecting device 30 can perform a multiple-fluorescence-channel imaging and a bright field and dark field imaging for the microdroplets. The multiple-fluorescence-channel imaging is used to detect the reaction signals of the microdroplets, and the bright field and dark field imaging is used to detect the dimensional information of the generated microdroplets and to monitor the status of the microdroplets during the reaction.

The exciting light source 340 includes different colored LED light sources 341, a collimator 342, a first light filter 343, a dichroic mirror 344, a fly's eye lens 345, and a focusing lens 346. The different colored LED light sources 341 can emit lights with different colors to irradiate the plurality of microdroplets 800. By selecting the different colored LED light sources 341, the irradiation can induce different fluorescence colors. The different colored LED light sources 341 can be operated in turn. The collimator 342, the first light filter 343, and the dichroic mirror 344 are arranged in sequence in right ahead of the light path emitted by each LED light source. The collimator 342 and the first light filter 343 are perpendicularly disposed (i.e. at an angle of 90°) with respect to the light path. The dichroic mirror 344 is disposed with respect to the light path with an angle of 0° to 45°. The fly's eye lens 345 and the focusing lens 346 are arranged in sequence in right ahead of the light path passed through the dichroic mirror 344. The fly's eye lens 345 and the focusing lens 346 are perpendicularly disposed (i.e. at an angle of 90°) with respect to the light path. The fluorescence excited from interiors of the plurality of microdroplets 800 pass through the second light filter 333 and is collected by an objective lens 332 located above the second light filter 333, and then is entered into a camera 331 which acquires the fluorescence image of the plurality of microdroplets.

The light path emitted by the exciting light source 340 obliquely irradiates the plurality of microdroplets 800 to cause the microdroplets 800 containing the fluorescent substances to produce fluorescence. The fluorescence information of the microdroplets containing the fluorescent substances is acquired by the fluorescence detecting assembly 330 and transmitted to an analysis device (computer) in the form of the fluorescence image to receive the analysis.

The second controller 310 is configured to control the switch between different light filters to form different fluorescence detecting channels. The fluorescence signal detecting device includes a fluorescence-code detecting channel, a fluorescent dye detecting channel, a fluorescent probe detecting channel, a microdroplet identifying channel, and a plurality of backup channels.

In an embodiment, when generating the plurality of microdroplets 800, ROX internal reference dye is added into the nucleic acid detection liquid. The ROX internal reference dye does not participate in the PCR reaction and can be used to acquire information such specific locations, profiles, and the number of the plurality of microdroplets 800. The microdroplet identifying channel is configured to identify the fluorescence emitted by the ROX internal reference dye, so as to locate each microdroplet 800 accurately. The fluorescence-code detecting channel is configured to identify the fluorescence signal and an intensity of the fluorescence signal of the core 730, so as to acquire the first efficient microdroplet 810 containing one single core 730. The fluorescent dye detecting channel or the fluorescent probe detecting channel is configured to identify the reporting fluorescence signal of the first efficient microdroplet 810 after the nucleic acid amplification reaction, so as to determine whether the primers 712 (or the primers 712 and the probe 713) and the target nucleic acid molecule have subjected to the PCR amplification according to the reporting fluorescence signal.

In the step S460, the existence of the target nucleic acid molecule is detected by detecting the existence of the reporting fluorescence signal, thereby achieving the qualitative detection. In the sorting process, the second efficient microdroplets 820 containing the cores 730 in the same type can be sorted into one group. Moreover, by detecting the existence of the reporting fluorescence signals, a ratio of the number of the microdroplets emitting no reporting fluorescence signal in the second efficient microdroplets 820 containing this type of cores 730 can be obtained, so that the concentration of the target nucleic acid molecules corresponding to this type of cores 730 in the same type can be calculated according to the Poisson distribution.

The first efficient microdroplets 810 can be sorted out from the plurality of microdroplets 800 by detecting the fluorescence signals of the cores 730 in the plurality of microdroplets 800 via the fluorescence-code detecting channel. The first efficient microdroplet 810 contains one single core 730. Therefore, the existence of the corresponding target nucleic acid molecule in the first efficient microdroplet 810 can be determined by detecting the first efficient microdroplet 810 via the fluorescent dye detecting channel to acquire the reporting fluorescence signal after the nucleic acid amplification reaction. If the corresponding target nucleic acid molecule is existed in the first efficient microdroplet 810, the type of the corresponding target nucleic acid molecule can be acquired according to the primers 712 corresponding to the core 730 in the first efficient microdroplet 810.

Similarly, the second efficient microdroplets 820 can be sorted out from the plurality of microdroplets 800 by detecting the fluorescence signals of the cores 730 in the plurality of microdroplets 800 via the fluorescence-code detecting channel. The second efficient microdroplet 820 contains one single core 730. Therefore, the existence of the corresponding target nucleic acid molecule in the second efficient microdroplet 820 can be determined by detecting the second efficient microdroplet 820 via the fluorescent probe detecting channel to acquire the reporting fluorescence signal after the nucleic acid amplification reaction. If the corresponding target nucleic acid molecule is existed in the second efficient microdroplet 820, the type of the corresponding target nucleic acid molecule can be acquired according to the primers 712 or the probe 713 corresponding to the core 730 in the second efficient microdroplet 820.

In an embodiment, the fluorescence signal detecting device includes a plurality of fluorescence-code detecting channels which can be configured to identify the cores 730 marked by multiple different types of fluorescence. More specifically, a first fluorescence-code detecting channel is for identifying fluorescence A and provided with 10 concentration gradients. Similarly, a second fluorescence-code detecting channel is for identifying fluorescence B and provided with 10 concentration gradients. Therefore, 10×10=100 types of cores 730 marked by different fluorescence and intensities can be identified by the fluorescence signal detecting device. That is, 100 different types of the primers 712 (or 100 different types of the primers 712 and the probes 713) can be marked by 100 types of fluorescence-marked cores 730. As such, a huge amount of different types of the cores 730 can be obtained to mark a huge amount of different types of nucleic acid detection microspheres 700

In an embodiment, the nucleic acid detection microsphere 700 is composed of the core 730 provided with the fluorescence-coding information and the coating layer 710 provided with the primers 712 and the probe 713. Multiple types of nucleic acid detection microspheres 700 are randomly distributed in and mixed with the nucleic acid amplification reaction liquid to acquire the nucleic acid detection liquid. The nucleic acid detection liquid is then microdropletized into the plurality of microdroplets 800. At a temperature above 60° C., the coating layer is molten to release the primers 712 and the probe 713 into the microdroplet 800, thereby forming a complete nucleic acid amplification reaction system. The core 730 remains in the microdroplet 800 and functions as a fluorescent marker for marking the microdroplet 800. If the microdroplet 800 contains the target nucleic acid molecule, then the fluorescent dye or the probe 713 can bind to the double-stranded DNA, thereby enhancing the fluorescence signal and producing the reporting fluorescence signal after the amplification.

The microdroplet 800 having only one core 730 provided with the fluorescence-coding information is sorted out as the efficient microdroplet to perform the subsequent analysis by detecting the cores 730 provided with the fluorescence-coding information in the plurality of microdroplets 800. The fluorescence signal of the core 730 in the efficient microdroplet can be detected based on the obtained efficient microdroplet (which is the first efficient microdroplet 810 or the second efficient microdroplet 820 in the above-described embodiments) to acquire the type of the corresponding primers 712 or probe 713. Then, the reporting fluorescence signal of the efficient microdroplet after the nucleic acid amplification reaction is acquired, and the existence of the corresponding target nucleic acid molecule in the efficient microdroplet is determined according to the reporting fluorescence signal. Therefore, the existence of multiple types of target nucleic acid molecules can be detected at one time by simultaneously adding the multiple types of nucleic acid detection microspheres 700 via the nucleic acid detection microsphere 700, the preparation method thereof, the kit, and the high-throughput nucleic acid detection method. Moreover, the concentration of each type of target nucleic acid can be acquired according to Poisson distribution.

Therefore, multiple types of target nucleic acids can be detected at one time in the detection of the target nucleic acids by mixing a large amount of different types of the nucleic acid detection microspheres 700 with the nucleic acid amplification reaction liquid to be detected. It is not necessary to repeat the detection for multiple times, consequently, the workload is small, the time is saved, and the sensitivity is high.

The technical features of the above-described embodiments can be arbitrarily combined. In order to make the description simple, not all possible combinations of the technical features in the above embodiments are described. However, as long as there is no contradiction in the combination of these technical features, the combinations should be in the scope of the present application.

What described above are only several implementations of the present application, and these embodiments are specific and detailed, but not intended to limit the scope of the present application. It should be understood by the skilled in the art that various modifications and improvements can be made without departing from the conception of the present application, and all fall within the protection scope of the present application. Therefore, the patent protection scope of the present application is defined by the appended claims It should be noted that the ordinal of components defined in this application, such as "first" and "second", is only used to distinguish the described component, and no order or technological meaning is intended. When a component is defined as "connected to" or "coupled to" the other component, it means that the component can be directly or indirectly connected or coupled to the other component. In the description of the present application, it is to be understood that terms such as "upper," "lower," "front," "rear," "left," "right," "vertical," "horizontal," "top," "bottom," "inner," "outer," "clockwise," "anticlockwise," should be construed to refer to the orientation as then described or as shown in the drawings under discussion. These relative terms are just for convenience of description rather than to indicate or imply that the referred device or component must be arranged in such a specific direction or to be operated or configured in specific direction. Therefore, the above mentioned terms shall not be interpreted as a limitation to the present application.

In the present application, unless specified or limited otherwise, a structure in which a first feature is "on" or "below" a second feature can include an embodiment in which the first feature is in direct contact with the second feature, and can also include an embodiment in which the first feature and the second feature are not in direct contact with each other, but are contacted via an additional feature disposed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present application, the relational terms such as first and second are used to differentiate an entity or operation from another entity or operation, and do not require or imply any actual relationship or sequence between these entities or operations. Moreover, the terms "include," "comprise," and any variation thereof are intended to cover a non-exclusive inclusion. Therefore, a process, method, object, or device, which includes a series of elements, not only includes such elements, but also includes other elements not specified expressly, or may further include inherent elements of the process, method, object, or device. If no more limitations are made, an element limited by "include a/an . . . " does not exclude other same elements existing in the process, the method, the article, or the device which includes the element.

The various embodiments of the present application are described progressively, where each embodiment is described by emphasizing its differences form some earlier embodiments. For portions of the various embodiments that are similar to each other, references can be made to each other. Various modifications to these embodiments are obvious to those skilled in the art, and the general principles defined herein may be implemented in other embodiments without departing from the spirit or scope of the present application. Therefore, the present application is not limited to the embodiments shown herein, but satisfies the broadest scope consistent with the principles and novel features disclosed herein.

What is claimed is:

1. A digital PCR quantitative detection method comprising steps of:
   preparing a microdroplet generating device, a temperature controlling device, a fluorescence signal detecting device, and a quantitative analysis device, respectively controlled by a controller;
   preparing a nucleic acid amplification reaction liquid to be detected;
   performing, automatically by the controller, steps of:
     microdropletizing the nucleic acid amplification reaction liquid to be detected to form an array of microdroplets via the microdroplet generating device;
     carrying out, over a plurality of cycles, a nucleic acid amplification reaction for the array of microdroplets via the temperature controlling device;
     performing a bright field and dark field imaging for the array of microdroplets and acquiring a fluorescence image of all microdroplets after each cycle in the nucleic acid amplification reaction via the fluorescence signal detecting device; and
     providing the fluorescence images to the quantitative analysis device, wherein the quantitative analysis device performs the steps of:
       acquiring real-time fluorescence curves of microdroplets that have undergone a nucleic acid amplification according to the fluorescence images;
       acquiring Ct values of all of the microdroplets that have undergone the nucleic acid amplification from the real-time fluorescence curves;
       acquiring initial nucleic acid copy numbers of all of the microdroplets that have undergone the nucleic acid amplification according to a relationship between the Ct values and the initial nucleic acid copy numbers of all of the microdroplets that have undergone the nucleic acid amplification;
       acquiring a frequency distribution of initial nucleic acid copy numbers according to the initial nucleic acid copy numbers of all of the microdroplets that have undergone the nucleic acid amplification by: acquiring a maximum value and a minimum value of the initial nucleic acid copy numbers of all of the microdroplets that have undergone the nucleic acid amplification; determining a number of classes and a length of each class interval according to the maximum value and the minimum value; and acquiring the frequency distribution of the initial nucleic acid copy numbers; and calculating a parameter λ of a Poisson distribution according to the frequency distribution of the initial nucleic acid copy numbers and taking the parameter λ as a number of copies of a target DNA molecule contained in each microdroplet.

2. The digital PCR quantitative detection method of claim 1, wherein the step of acquiring real-time fluorescence curves further comprises:

acquiring fluorescence intensity values of each microdroplet that has undergone the nucleic acid amplification according to the fluorescence images;

acquiring the real-time fluorescence curve of each microdroplet that has undergone the nucleic acid amplification according to the fluorescence intensity values of each microdroplet that has undergone the nucleic acid amplification; and acquiring the real-time fluorescence curves of all of the microdroplets that have undergone the nucleic acid amplification according to the real-time fluorescence curve of each microdroplet that has undergone the nucleic acid amplification.

3. The digital PCR quantitative detection method of claim 2, wherein the step of acquiring fluorescence intensity values further comprises image tracking each microdroplet by:

identifying and acquiring a location of a center of each microdroplet from a fluorescence image taken in each temperature cycle in the nucleic acid amplification reaction;

comparing a location of a center of each microdroplet currently identified with a location of a center of each microdroplet in a previous temperature cycle; and if a distance between a location of a center of one microdroplet currently identified and a location of a center of one microdroplet in the previous temperature cycle is smaller than a diameter of a microdroplet, then indicating the one microdroplet currently identified and the one microdroplet in the previous temperature cycle as the same microdroplet.

4. The digital PCR quantitative detection method of claim 1, wherein the step of acquiring Ct values of all of the microdroplets further comprises:

calculating derivatives of the real-time fluorescence curve of each microdroplet that has undergone the nucleic acid amplification to acquire slopes of the real-time fluorescence curve of each microdroplet that has undergone the nucleic acid amplification;

acquiring a constant slope value from the slopes of the real-time fluorescence curve of each microdroplet that has undergone the nucleic acid amplification;

acquiring an initial cycle number from each constant slope value, each initial cycle number being the corresponding Ct value of each microdroplet that has undergone the nucleic acid amplification; and acquiring Ct values of all of the microdroplets that have undergone the nucleic acid amplification according to the Ct value of each microdroplet that has undergone the nucleic acid amplification.

5. The digital PCR quantitative detection method of claim 1, wherein the step of acquiring Ct values of all of the microdroplets further comprises:

determining a default value of a fluorescence threshold of each microdroplet that has undergone the nucleic acid amplification according to the real-time fluorescence curve of each microdroplet that has undergone the nucleic acid amplification;

acquiring a cycle number for the default value of the fluorescence threshold of each microdroplet that has undergone the nucleic acid amplification, each cycle number being the corresponding Ct value of each microdroplet that has undergone the nucleic acid amplification; and acquiring Ct values of all of the microdroplets that have undergone the nucleic acid amplification according to the Ct value of each microdroplet that has undergone the nucleic acid amplification.

6. The digital PCR quantitative detection method of claim 1, wherein in the step of calculating the parameter λ, the parameter λ of the Poisson distribution is calculated by a maximum likelihood estimation method.

7. The digital PCR quantitative detection method of claim 1, wherein the step of acquiring the fluorescence image of all microdroplets after each cycle in the nucleic acid amplification reaction further comprises acquiring the fluorescence images by photographically detecting the microdroplets in real time during the nucleic acid amplification reaction by:

increasing a temperature of the microdroplets to 90° C. to 95° C.;

denaturing the microdroplets after a thermal activation of enzymes in the microdroplets;

decreasing the temperature of the microdroplets to 40° C. to 60° C. after the denaturing to perform annealing and extending, and then taking a fluorescence image of the microdroplets via the fluorescence signal detecting device, wherein the above steps of increasing the temperature, denaturing the microdroplets, decreasing the temperature to perform annealing and extending, and taking the fluorescence image are cycled for a plurality of times, thereby obtaining the fluorescence images of the microdroplets.

8. The digital PCR quantitative detection method of claim 1, wherein the microdroplet generating device is configured to microdropletize a nucleic acid amplification reaction liquid into a plurality of microdroplets;

the temperature controlling device is connected to the microdroplet generating device, so that the plurality of microdroplets is capable of being transferred to the temperature controlling device to undergo a temperature cycling to achieve a nucleic acid amplification;

the fluorescence signal detecting device is disposed opposite to the temperature controlling device to photographically detect the plurality of microdroplets after the nucleic acid amplification;

the quantitative analysis device comprises a computing device in communication with the fluorescence signal detecting device; and the controller is connected to the microdroplet generating device, the temperature controlling device, the fluorescence signal detecting device, and the quantitative analysis device, respectively, so as to control the microdroplet generating device, the temperature controlling device, the fluorescence signal detecting device, and the quantitative analysis device.

9. A digital PCR quantitative detection method comprising steps of:
preparing a microdroplet generating device, a temperature controlling device, a fluorescence signal detecting device, and a quantitative analysis device, respectively controlled by a controller;
preparing a nucleic acid amplification reaction liquid to be detected;
performing, automatically by the controller, steps of:
microdropletizing the nucleic acid amplification reaction liquid to be detected to form an array of microdroplets via the microdroplet generating device;
carrying out, over a plurality of cycles, a nucleic acid amplification reaction for the array of microdroplets via the temperature controlling device;
performing a bright field and dark field imaging for the array of microdroplets and acquiring a fluorescence image of all microdroplets after each cycle in the nucleic acid amplification reaction via the fluorescence signal detecting device; and
providing the fluorescence images to the quantitative analysis device, wherein the quantitative analysis device performs the steps of:
acquiring real-time fluorescence curves of microdroplets that have undergone a nucleic acid amplification according to the fluorescence images;
acquiring Ct values of all of the microdroplets that have undergone the nucleic acid amplification from the real-time fluorescence curves;
acquiring initial nucleic acid copy numbers of all of the microdroplets that have undergone the nucleic acid amplification according to a relationship between the Ct values and the initial nucleic acid copy numbers of all of the microdroplets that have undergone the nucleic acid amplification;
selecting a portion of initial nucleic acid copy numbers from the initial nucleic acid copy numbers of all of the microdroplets that have undergone the nucleic acid amplification;
acquiring a frequency distribution of the portion of the initial nucleic acid copy numbers; and
performing a point estimation of a Poisson distribution according to the frequency distribution of the portion of the initial nucleic acid copy numbers to acquire a parameter $\lambda$ of the Poisson distribution and taking the parameter $\lambda$ as a number of copies of a target DNA molecule contained in each microdroplet.

10. The digital PCR quantitative detection method of claim 9, wherein the step of performing the point estimation of the Poisson distribution further comprises searching $\lambda$ in an interval $[\lambda_{min}, \lambda_{max}]$ to minimize a sum of squared errors (err) of frequencies of the portion of the initial nucleic acid copy numbers.

11. The digital PCR quantitative detection method of claim 10, wherein in the step of performing the point estimation of the Poisson distribution, the sum of squared errors (err) is:

$$err = \sum_{k=0}^{3} \left[\frac{n_k}{N} - P(x=k)\right]^2 = \sum_{k=0}^{3} \left[\frac{n_k}{N} - \frac{\lambda^k}{k!}e^{-\lambda}\right]^2;$$

where a random variable x is an initial nucleic acid copy number contained in each microdroplet, $n_k$ is a frequency corresponding to the selected portion of the initial nucleic acid copy numbers of the microdroplets, and N is a total number of the microdroplets.

12. The digital PCR quantitative detection method of claim 9, wherein in the step of performing the point estimation of the Poisson distribution, a method for the point estimation of the Poisson distribution comprises a method of moments, an order statistics estimation, or a maximum likelihood estimation.

13. The digital PCR quantitative detection method of claim 9, wherein
the microdroplet generating device is configured to microdropletize a nucleic acid amplification reaction liquid into a plurality of microdroplets;
the temperature controlling device is connected to the microdroplet generating device, so that the plurality of microdroplets is capable of being transferred to the temperature controlling device to undergo a temperature cycling to achieve a nucleic acid amplification;
the fluorescence signal detecting device is disposed opposite to the temperature controlling device to photographically detect the plurality of microdroplets after the nucleic acid amplification;
the quantitative analysis device comprises a computing device in communication with the fluorescence signal detecting device; and
the controller is connected to the microdroplet generating device, the temperature controlling device, the fluorescence signal detecting device, and the quantitative analysis device, respectively, so as to control the microdroplet generating device, the temperature controlling device, the fluorescence signal detecting device, and the quantitative analysis device.

* * * * *